United States Patent
May

(10) Patent No.: US 8,129,986 B2
(45) Date of Patent: Mar. 6, 2012

(54) ANGLE SENSOR DEVICE

(75) Inventor: Lutz May, Geretsried (DE)

(73) Assignee: NCT Engineering GmbH, Unterhaching (DE)

( * ) Notice: Subject to any disclaimer, the term of this patent is extended or adjusted under 35 U.S.C. 154(b) by 534 days.

(21) Appl. No.: 11/994,198

(22) PCT Filed: Jul. 11, 2006

(86) PCT No.: PCT/EP2006/006785
§ 371 (c)(1),
(2), (4) Date: Apr. 17, 2008

(87) PCT Pub. No.: WO2007/006555
PCT Pub. Date: Jan. 18, 2007

(65) Prior Publication Data
US 2008/0204001 A1    Aug. 28, 2008

(30) Foreign Application Priority Data
Jul. 11, 2005   (EP) .................................... 05015024

(51) Int. Cl.
*G01B 7/30*    (2006.01)
(52) U.S. Cl. ................. 324/207.25; 324/207.2
(58) Field of Classification Search ................. 324/160, 324/163, 165, 173, 174, 178, 179, 207.2, 324/207.21, 207.24, 207.25
See application file for complete search history.

(56) References Cited

U.S. PATENT DOCUMENTS

| | | | | |
|---|---|---|---|---|
| 4,924,161 A | * | 5/1990 | Ueki et al. | 318/567 |
| 5,097,209 A | * | 3/1992 | Santos | 324/207.2 |
| 6,253,460 B1 | | 7/2001 | Schmitz | |
| 6,265,867 B1 | | 7/2001 | Fowler | |
| 6,448,761 B1 | | 9/2002 | Stumpe et al. | |
| 2001/0009366 A1 | * | 7/2001 | Kono et al. | 324/207.2 |
| 2002/0190709 A1 | * | 12/2002 | Frederick et al. | 324/207.2 |
| 2004/0025600 A1 | | 2/2004 | Viola et al. | |
| 2004/0104720 A1 | | 6/2004 | Ramirez | |

FOREIGN PATENT DOCUMENTS
WO    02/063262    8/2002

* cited by examiner

*Primary Examiner* — Bot Ledynh
(74) *Attorney, Agent, or Firm* — Fay Kaplun & Marcin, LLP

(57) ABSTRACT

An angle sensor device is for determining information of a movable object. The information includes angular position information and/or angular speed information. The angle sensor device includes (a) at least one magnetically encoded region arranged on the movable object, (b) at least one magnetic field detector, and (c) a unit. The at least one magnetic field detector is adapted to detect a signal generated by the at least one magnetically encoded region when the at least one magnetically encoded region moving with the movable object passes a surrounding area of the at least one magnetic field detector. The unit is adapted to determine the information based on the detected signal.

23 Claims, 41 Drawing Sheets

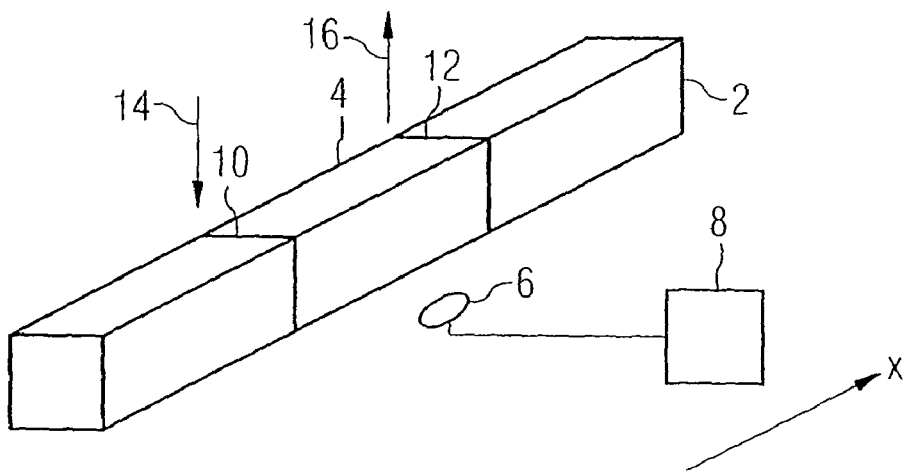
FIG 1
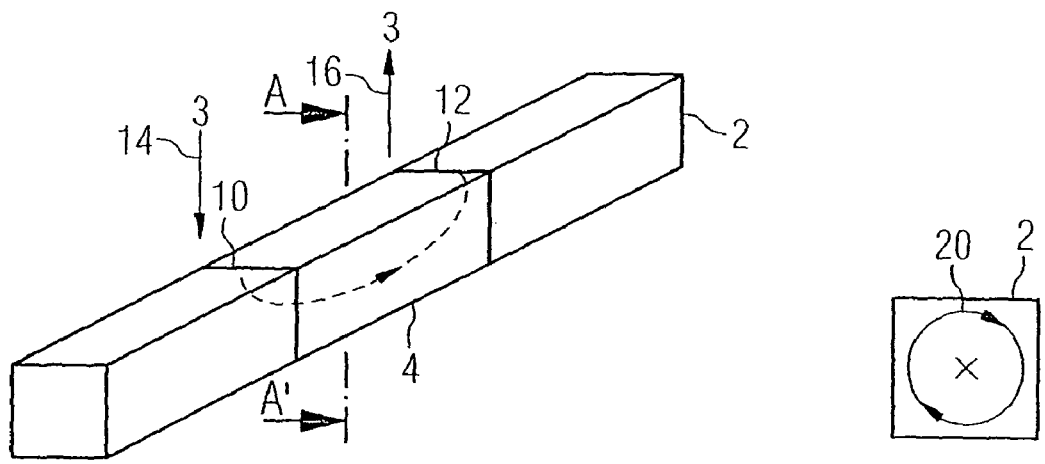
FIG 2A
FIG 2B

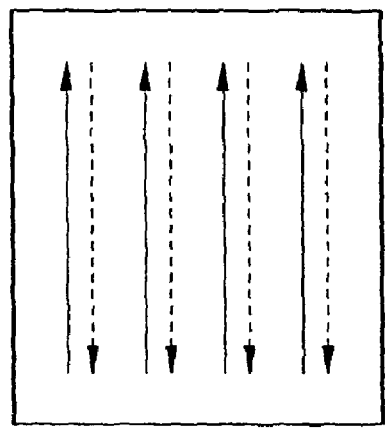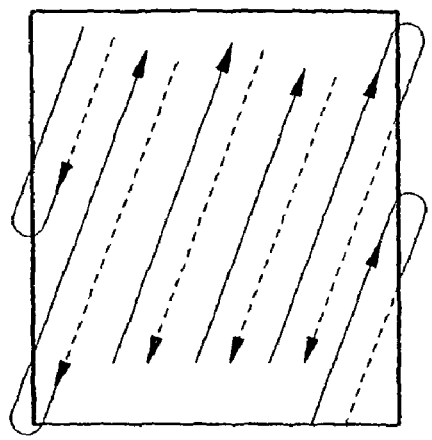
FIG 14
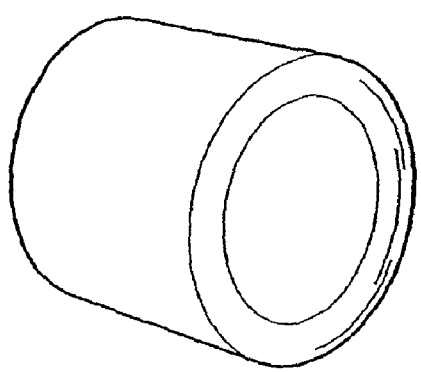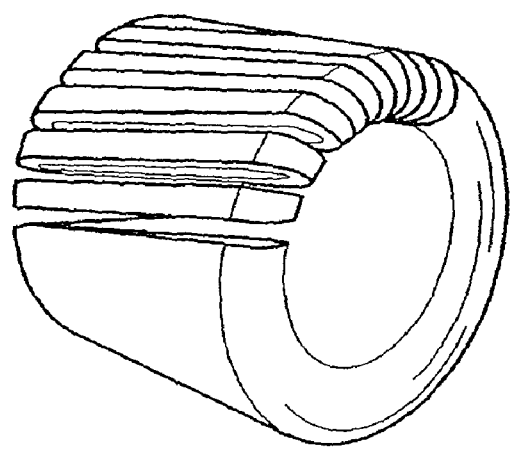
FIG 15  FIG 16

Externally Measurable Magnetic Field

Neutral Zone: The effects of the different magnetic field vectors cancel each other Neutrale Zone

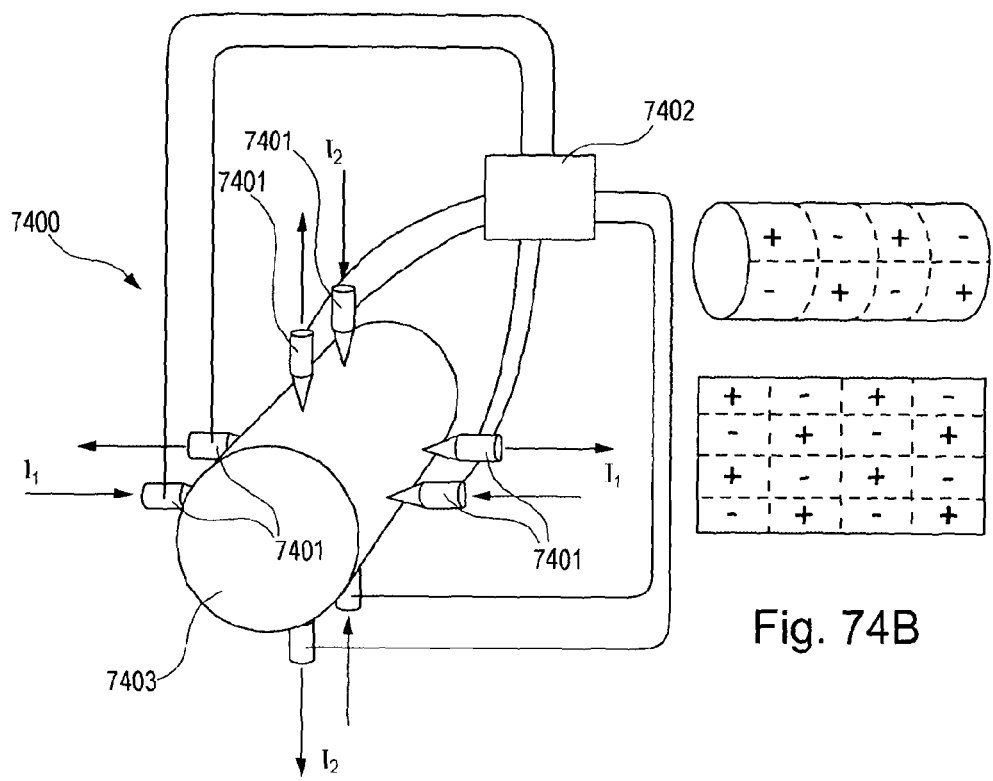
Fig. 74A
Fig. 74B
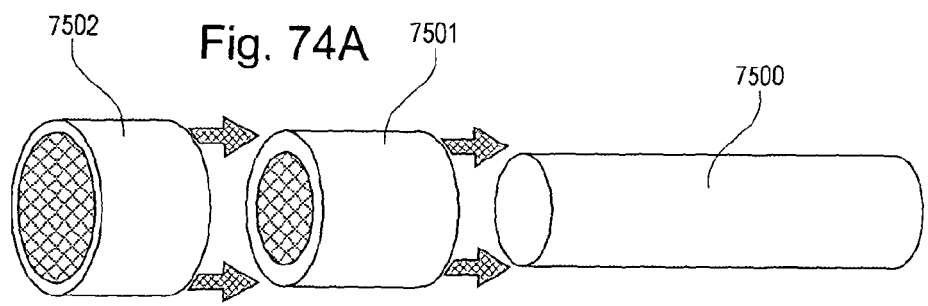
Fig. 75
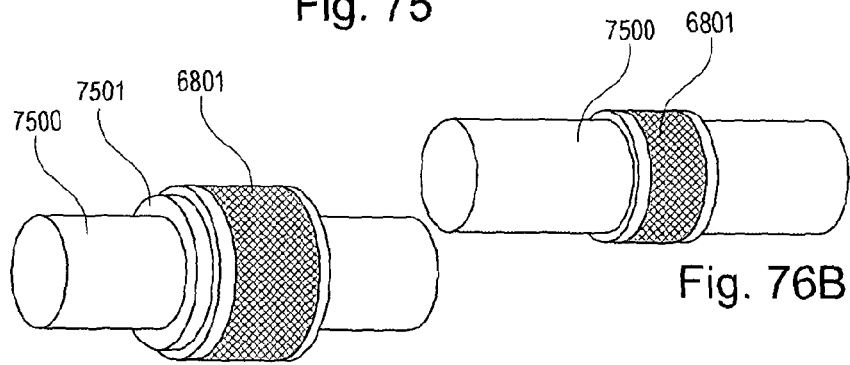
Fig. 76A
Fig. 76B

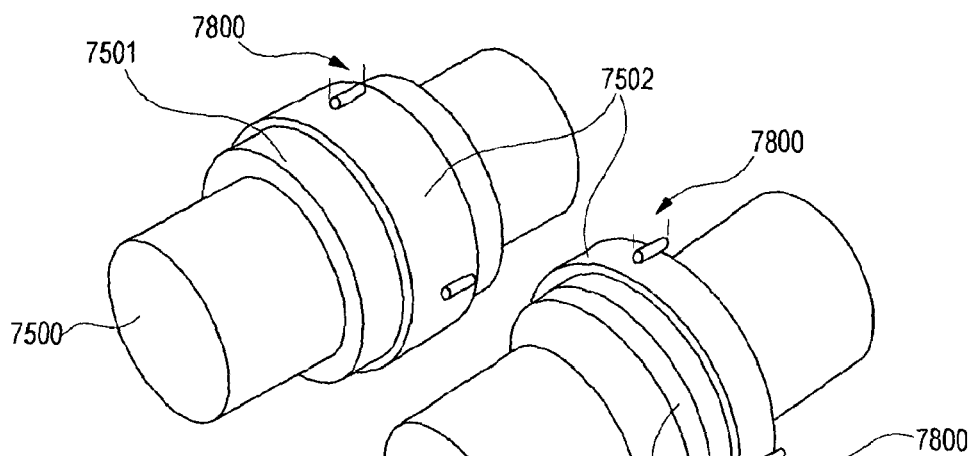
Fig. 77
Fig. 78
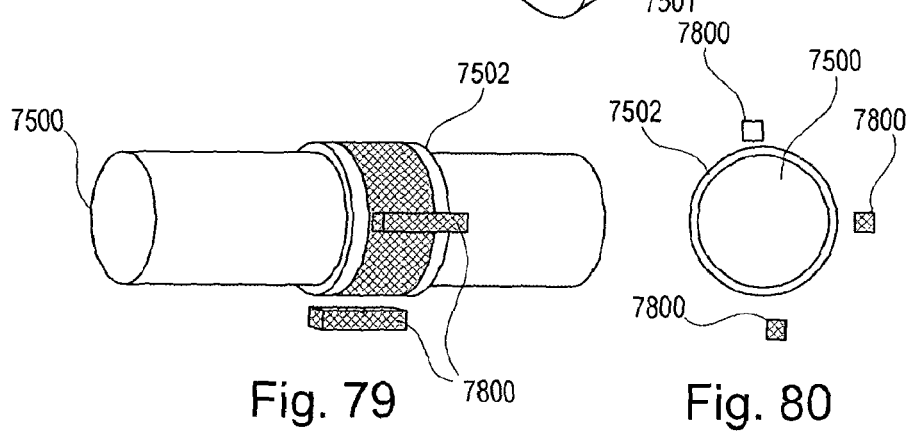
Fig. 79
Fig. 80
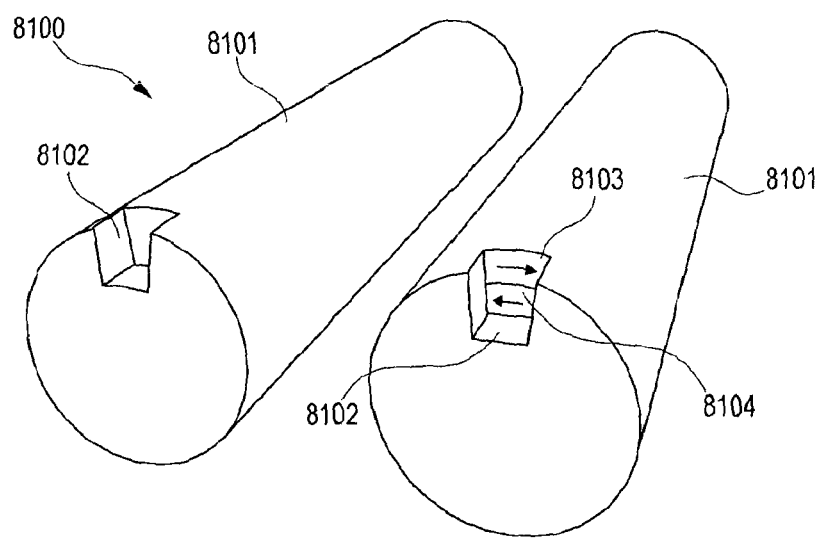
Fig. 81

ANGLE SENSOR DEVICE

FIELD OF THE INVENTION

The present invention relates to an angle sensor device, to a multi parameter sensor apparatus, to a method of determining angular position information, to a method of manufacturing an angle sensor device, to an object, to a method of manufacturing an object, to an apparatus for magnetizing a magnetizable element, and to a method of magnetizing a magnetizable element.

DESCRIPTION OF THE RELATED ART

Magnetic transducer technology finds application in the measurement of torque and position. It has been especially developed for the non-contacting measurement of torque in a shaft or any other part being subject to torque or linear motion. A rotating or reciprocating element can be provided with a magnetized region, i.e. a magnetic encoded region, and when the shaft is rotated or reciprocated, such a magnetic encoded region generates a characteristic signal in a magnetic field detector (like a magnetic coil) enabling to determine torque or position of the shaft.

Such kind of sensors are disclosed, for instance, in WO 02/063262.

SUMMARY OF THE INVENTION

It is an object of the present invention to provide an efficient magnetic sensor.

This object may be achieved by providing an angle sensor device, a multi parameter sensor apparatus, a method of determining angular position information, a method of manufacturing an angle sensor device, an object, a method of manufacturing an object, an apparatus for magnetizing a magnetizable element, and a method of magnetizing a magnetizable element according to the independent claims.

According to an exemplary embodiment of the invention, an angle sensor device is provided for determining angular position information and/or angular speed information of a movable object, the angle sensor device comprising at least one magnetically encoded region arranged on the movable object, at least one magnetic field detector, and an angular position and/or angular speed information determining unit, wherein the at least one magnetic field detector is adapted to detect a signal generated by the at least one magnetically encoded region when the at least one magnetically encoded region moving with the movable object passes a surrounding area of the at least one magnetic field detector, and wherein the angular position and/or angular speed information determining unit is adapted to determine angular position information and/or angular speed information of the movable object based on the detected signal.

According to another exemplary embodiment of the invention, a multi parameter sensor apparatus is provided capable of determining at least two parameters of a movable object, the multi parameter sensor apparatus comprising an angle sensor device having the above-mentioned features for determining angular position information and/or angular speed information of the movable object, and a further parameter determining unit, wherein the further parameter determining unit is adapted to determine at least one further parameter characterizing the movable object based on the detected signal.

According to another exemplary embodiment of the invention, a method of determining angular position information and/or angular speed information of a movable object is provided, the method comprising the steps of detecting, by means of at least one magnetic field detector, a signal generated by at least one magnetically encoded region when the at least one magnetically encoded region moving with the movable object passes a surrounding area of the at least one magnetic field detector, and determining angular position information and/or angular speed information of the movable object based on the detected signal.

According to another exemplary embodiment of the invention, a method of manufacturing an angle sensor device for determining angular position information and/or angular speed information of a movable object is provided, the method comprising the steps of arranging at least one magnetically encoded region on the movable object, providing at least one magnetic field detector, providing an angular position and/or angular speed information determining unit, adapting the at least one magnetic field detector to detect a signal generated by the at least one magnetically encoded region when the at least one magnetically encoded region moving with the movable object passes a surrounding area of the at least one magnetic field detector, and adapting the angular position and/or angular speed information determining unit to determine angular position information and/or angular speed information of the movable object based on the detected signal.

According to another exemplary embodiment of the invention, an object is provided, the object comprising at least one magnetically encoded region being arranged in an angularly asymmetric geometric manner along the circumference of the object and/or being arranged with an angularly varying magnetic strength along the circumference of the object.

According to another exemplary embodiment of the invention, a method of manufacturing an object is provided, the method comprising the step of arranging at least one magnetically encoded region in an angularly asymmetric geometric manner along the circumference of the object and/or with an angularly varying magnetic strength along the circumference of the object.

According to another exemplary embodiment of the invention, an apparatus for magnetizing a magnetizable element to generate magnetically encoded regions is provided, the apparatus comprising electric connection elements for electrically contacting at least two different portions of the magnetizable element, and an electric signal supply unit connected to the electric connection elements and adapted for applying at least two different electric signals to the at least two different portions so as to generate at least two different magnetically encoded regions in the at least two different portions of the magnetizable element.

According to another exemplary embodiment of the invention, a method for magnetizing a magnetizable element to generate magnetically encoded regions is provided, the method comprising the steps of electrically connecting at least two different portions of the magnetizable element to an electric signal supply unit, and applying, by means of the electric signal supply unit, at least two different electric signals to the at least two different portions so as to generate at least two different magnetically encoded regions in the at least two different portions of the magnetizable element.

One embodiment of the invention is related to an angle sensor device which is capable of detecting angular information of a movable, for instance rotating, object which has, for instance at a circumferential portion thereof, one or more magnetically encoded regions passing, during the rotation, one or more magnetic field detectors. When passing one of such magnetic field detectors, a magnetic signal is generated, for instance induced, in the respective magnetic field detector which may allow, if desired in combination with other magnetic detection signals, to derive a relative or even absolute angular information concerning the rotating object.

The angle sensor device may also detect angular speed information, for instance by measuring the angular position in a time dependent manner. The derivative of the angle is indicative of the angular speed. Thus, also speed information may be determined by means of the angle sensor device.

Preferably, an asymmetric configuration of the magnetically encoded region is realized, so that, during rotation of the object, the time sequence of the signals allows to determine an angular position of the rotating object. The asymmetric arrangement of the magnetically encoded regions results in an asymmetry of the detected signal. For instance, such an asymmetrical configuration of a magnetically encoded region can be obtained by asymmetrically magnetizing a corresponding portion of a magnetizable object, or by asymmetrically locating magnetically encoded portions along the circumference of the movable object.

According to another embodiment of the invention, a multi parameter sensing technology is provided which allows to magnetically detect a plurality of information concerning a movable object simultaneously. For instance, apart from angular information, velocity and/or torque information can also be sensed, and may, if desired, be combined. For instance, the product of velocity and torque of a rotating object may be indicative of the power applied to the moving object.

According to another embodiment of the invention, a scheme for magnetizing a magnetizable element to generate magnetically encoded regions is provided, wherein a plurality of different electrically connection elements are connected to different portions on the surface of an object to be magnetized. Then, for each of the portions, an individual magnetizing scheme may be applied separately, for instance an electric current or an electric voltage. Consequently, different surface regions of the object to be magnetized are provided with magnetically encoded regions which differ concerning magnetic field strength, polarity, and so on. This allows to create a user-defined magnetized surface structure of the magnetized object so that desired magnetic field signal patterns can be flexibly generated.

In the following, further exemplary embodiments of the angle sensor device will be described. However, these embodiments also apply for the multi parameter sensor apparatus, for the method of determining angular position information, for the method of manufacturing an angle sensor device, for the object, for the method of manufacturing an object, for the apparatus for magnetizing a magnetizable object, and for the method of magnetizing the magnetizable object.

The at least one magnetically encoded region may be arranged in an angularly asymmetric geometric manner along the circumference of the movable object. By providing a magnetic encoded region only along a portion of the circumference of the movable object, a magnetic signal may be detected by the magnetic field device(s) which signal differs in time when the object rotates. Thus, the time dependent signal pattern allows to derive angular information due to the asymmetrical geometrical arrangement.

Additionally or alternatively, the at least one magnetically encoded region may be arranged with an angularly varying magnetic strength along the circumference of the movable object. In other words, already during programming or generating the magnetic encoded region(s), an asymmetry of the magnetic properties along the circumference may be realized.

For instance, a magnetically encoded region generating electric current may be applied with different strength of different polarities along the circumference of the object.

Furthermore, the at least one magnetically encoded region may be arranged with an angularly varying magnetic polarity along the circumference of the movable object. For instance, a positive voltage or current can be applied to one portion of the surface of the movable object to form the magnetically encoded region, and another polarity of this voltage or current for magnetizing another portion may be applied to this other portion. By taking this measure, a characteristic pattern can be generated along the circumference of the angle sensor which allows to generate a magnetic field sensor signal at the positions of the magnetic field detectors which is indicative of the present angular position of the movable object. Such magnetic field detectors may be arranged along a circumference of the movable object having attached thereto or provided integrally with the magnetically encoded regions.

The angular position and/or angular speed information determining unit may be adapted to determine an absolute angular position information of the movable object based on the detected magnetic signal. This may be achieved by positioning the magnetically encoded regions along the circumference of the object in such a manner that the generated signal of one magnetic field detecting device or of a plurality of magnetic field detecting devices in combination is unique for a particular angular position. This allows for an unambiguous assignment of signal and angular position.

The angle sensor device may further comprise the movable object. The magnetically encoded regions may be provided in an interior of the movable object, may be provided in a surface region or the movable object or may be directly attached onto a surface of the movable object in a detachable or irreversible manner.

The movable object may be at least one of the group consisting of a round shaft, a tube, a disk, a ring, and a none-round object, for instance having a rectangular cross-section. However, these geometrical configurations are only exemplary.

The movable object may be one of the group consisting of an engine shaft, a reciprocable work cylinder, and a push-pull-rod. In all of these applications, the magnetization of such a position, torque, shear force and/or angular sensor is highly advantageous, since it allows to manufacture a highly accurate and reliable force, position, torque, shear force and/or angular position sensor with low costs. Particularly, mining and drilling equipment may be provided with the systems of the invention, and may be used for monitoring the drilling angle, drilling direction and drilling forces. A further exemplary application of the invention is the recognition and the analysis of engine knocking.

The angle sensor device may comprise a plurality of magnetic field detectors, for instance two, three, four or more magnetic field detectors arranged symmetrically or asymmetrically along the circumference of the object.

Particularly, the angular position and/or angular speed information determining unit may be adapted to determine angular position information of the movable object based on a simultaneous analysis of the magnetic signals detected by the plurality of magnetic field detectors. Thus, by combining a plurality of signals, it may be possible to remove artefacts from a detection result, and the combination of the simultaneous sensing signals of the various magnetic field detecting devices may allow to measure the absolute angular position of the moving object. Particularly, the combination of different signal patterns at a particular point of time may be indicative for a unique angular position allowing to derive the absolute angle position at this particular moment.

A plurality of magnetically encoded regions may be arranged along a circumference of the movable object. This allows to identify the present angular position of the angle sensor device.

The angle sensor device may further comprise a control unit adapted to control a motion of the movable object based on the angular position information which is provided to the control unit by the angular position and/or angular speed information determining unit. Such a control unit may control or regulate the motion, particularly the rotation, of the movable object based on the presently derived angular position information of the angle sensor device. Thus, a feedback mechanism is provided which allows to flexibly adjust, for instance a drive signal, for the movable object in order to compensate for deviations from a target position of the movable object.

The at least one magnetically encoded region of the angle sensor device may be a permanent magnetic region. The term "permanent magnetic region" refers to a magnetized material which has a remaining magnetization also in the absence of an external magnetic field. Thus, "permanent magnetic materials" include ferromagnetic materials, ferrimagnetic materials, or the like. The material of such a magnetic region may be a 3d-ferromagnetic material like iron, nickel or cobalt, or may be a rare earth material (4f-magnetism).

The at least one magnetically encoded region may be a longitudinally magnetized region of the movable object. Thus, the magnetizing direction of the magnetically encoded region(s) may be oriented along the extension direction of the movable object. A method of manufacturing such a longitudinally magnetized region is disclosed, in a different context, in WO 02/063262 A1, and uses a separate magnetizing coil.

Alternatively, the at least one magnetically encoded region is a circumferentially magnetized region of the movable object. Such a circumferentially magnetized portion may particularly be adapted such that the at least one magnetically encoded region is formed by a first magnetic flow region oriented in a first direction and by a second magnetic flow region oriented in a second direction, wherein the first direction is opposite to the second direction.

Thus, the magnetically encoded region may be realized as two hollow-cylinder-like structures which are oriented concentrically, wherein the magnetizing directions of the two concentrically arranged magnetic flow regions are preferably essentially perpendicular to one another. Such a magnetic structure can be manufactured by the PCME method described below in detail, that is to say by directly applying a magnetizing electrical current to the movable object made of a magnetizable material. To produce the two opposing magnetizing flow portions, current pulses may be applied to the shaft.

Referring to the described embodiment, in a cross-sectional view of the movable object, there may be a first circular magnetic flow having the first direction and a first radius and the second circular magnetic flow having the second direction and a second radius, wherein the first radius may be larger than the second radius.

Particularly, the at least one magnetically encoded region may be manufactured in accordance with the manufacturing steps of applying a first current pulse to a magnetizable element, wherein the first current pulse is applied such that there is a first current flow in a first direction along a longitudinal axis of the magnetizable element, wherein the first current pulse is such that the application of the current pulse generates the magnetically encoded region in the magnetizable element. Furthermore, a second current pulse may be applied to the magnetizable element, wherein the second current pulse may be applied such that there is a second current flow in a second direction along the longitudinal axis of the magnetizable element.

Each of the first and second current pulses may have a raising edge and a falling edge, wherein the raising edge may be steeper than the falling edge (see FIG. 30, 35).

Particularly, the first direction may be opposite to the second direction.

The magnetizable element may have a circumferential surface surrounding a core region of the magnetizable element. Furthermore, the first current pulse may be introduced into the magnetizable element at a first location at the circumferential surface such that there is a first current flow in the first direction in the core region of the magnetizable element. The first current pulse may be discharged from the magnetizable element at a second location at the circumferential surface. The second location may be at a distance in the first direction from the first location.

Particularly, the second current pulse may be introduced into the magnetizable element at the second location at the circumferential surface such that there is the second current flow in the second direction in the core region of the magnetizable element, wherein the second current pulse may be discharged from the magnetizable element at the circumferential surface.

The first current pulse may be free from being applied to the magnetizable element at an end face of the magnetizable element.

The at least one magnetically encoded region may be a magnetic element attached to the surface of the movable object. Thus, an external element can be attached to the surface of the movable object in order to form a magnetically encoded region. Such a magnetic element can be attached to the movable object by adhering (for instance using glue), or may alternatively be fixed on the movable shaft using the magnetic forces of the magnetic element.

Instead of attaching a magnetic object to the surface of the movable object, it is also possible to use materials with different magnetic properties (one material has a higher, and the other one a lower permeability, for instance). The magnetic object can be attached from the outside of the shaft/cylinder or can be placed inside of the cylinder.

Any of the magnetic field detectors may comprise a coil having a coil axis oriented essentially parallel to an extension of the movable object. Further, any of the magnetic field detectors may be realized as a coil having a coil axis oriented essentially perpendicular to an extension of the movable object. A coil being oriented with any other angle between coil axis and extension of the movable object is possible as well. Alternatively to a coil in which the moving magnetically encoded region may induce an induction voltage by modulating the magnetic flow through the coil, a Hall-effect probe may be used as a magnetic field detector making use of the Hall-effect. Alternatively, a Giant Magnetic Resonance magnetic field sensor or a Magnetic Resonance magnetic field sensor may be used as a magnetic field detector. However, any other magnetic field detector may be used to detect (qualitatively or quantitatively) the presence or absence of one of the magnetically encoded regions in a sufficient close vicinity to the respective magnetic field detector.

In the following, an exemplary embodiment of the multi parameter sensor apparatus will be described. However, this embodiment also applies for the angle sensor device, for the method of determining angular position information, for the method of manufacturing an angle sensor device, for the object, for the method of manufacturing an object, for the apparatus for magnetizing a magnetizable element, and for the method of magnetizing a magnetizable element.

The at least one further parameter may be selected from the group consisting of a position of the movable object (for instance when reciprocating), a torque applied to the movable object, a force applied to the movable object, a shear force applied to the movable object, a velocity of the movable object, and a power of the movable object. However, these examples are not the only possible parameters to be sensed in addition to sensing the relative or absolute angular position of the movable object. Furthermore, a plurality of simultaneously detectable parameters can be further processed, for instance to derive other parameters. For example, the product of an estimated velocity and of an estimated torque are indicative of the power applied to a rotating object.

In the following, further exemplary embodiments of the method of manufacturing an angle sensor device will be described. However, these embodiments also apply for the angle sensor device, for the multi parameter sensor apparatus, for the method of determining angular position information, for the object, for the method of manufacturing an object, for the apparatus for magnetizing a magnetizable element, and for the method for magnetizing a magnetizable element.

The method may further include the step of forming the at least one magnetically encoded region with an angularly varying magnetic strength along the circumference of the movable object. In other words, the asymmetry which is used for the angular position estimation can already be generated during forming the magnetically encoded regions. By asymmetrically magnetizing different portions of the circumference of the movable object, the magnetic strength and thus the intensity of the magnetic field detection signal measured by the magnetic field detecting devices can be varied characteristically to be indicative of the present angular position.

The at least one magnetically encoded region may be formed by asymmetrically arranging the movable object with respect to at least one magnetizing object and by applying a magnetizing signal to the at least one magnetizing object. For instance, a plurality of different electrical contacts via which a magnetizing signal may be conveyed to the movable object may be arranged discontinuously or asymmetrically along the circumference of the magnetizable object. When a magnetizing signal is then applied to the magnetizing objects, the asymmetry of the arrangement has the consequence that the magnetic field distribution is also varied along the circumference.

The at least one magnetically encoded region may be formed by asymmetrically enclosing the at least one magnetizing object by the movable object and by applying the magnetizing signal to the at least one magnetizing object. For instance, the movable object may be realized as a hollow tube, and a lead to which a magnetizing current can be applied may be located off-centred with respect to the symmetry axis of the hollow tube. Then, the distance between the magnetizing lead and the different surface portions of the hollow tube differs, so that the magnetizing magnetic field strength differs along the circumference of the hollow tube, and thus an asymmetrical configuration of the magnetically encoded region is realized.

Furthermore, the at least one magnetically encoded region may be formed by asymmetrically contacting the movable body by the at least one magnetizing object and by applying the magnetizing signal to the at least one magnetizing object. For instance, four electrically conducting contacts may be brought in contact with the circumference of the, for instance, cylinder-shaped movable object. When the arrangement of the four contacts is discontinuous or not symmetrical along the circumference, then the generated magnetic field and thus the magnetic field characteristics of the magnetically encoded region differs along the circumference of the movable object, thus providing a detectable signal which depends unambiguously from the angular position of the movable object.

The at least one magnetically encoded region may be formed by asymmetrically removing material from the at least one magnetically encoded region. For instance, grooves, recesses or indentations may be formed in a surface of the movable object in order to generate an angular dependent signal.

Furthermore, the at least one magnetically encoded region may be formed by asymmetrically adding material to the at least one magnetically encoded region. For instance, a protrusion of magnetic material may be applied on a part of the surface of the magnetizable object so as to add material to the surface of the movable object causing an angular dependent magnetic detection signal.

In the following, exemplary embodiments of the apparatus for magnetizing a magnetizable element will be described. However, these embodiments also apply for the angle sensor device, for the multi parameter sensor apparatus, for the method of determining angular position information, for the object, for the method of manufacturing an object, for the method of manufacturing an angle sensor device, and for the method of magnetizing a magnetizable element.

The electric connection elements may be connected to form groups of electric connection elements, wherein each group of electric connection elements may be assigned to a respective one of the at least two different portions, wherein at least one of the electric connection elements or a group of electric connection elements may be adapted to guide a respective electric signal from the electric signal supply unit to the respective portion, and at least one of the electric connection elements of a group of electric connection elements may be adapted to guide a respective electric signal from the respective portion to the electric signal supply unit.

By taking this measure, different portions of the magnetizable element may be individually magnetized substantially free from an interference with the magnetizing properties of adjacent portions. The magnetization of different portions may be performed simultaneously or subsequently. Thus, even complicated patterns of magnetic field properties may be generated on the surface of the object to be magnetized.

Particularly, the magnetically encoded regions may be generated with a varying magnetic strength in the at least two portions of the movable object and/or with a varying magnetic polarity in the at least two portions of the movable object.

The apparatus may be adapted for magnetizing a tube-like magnetizable element in such a manner that, in a planar projection of the surface of the magnetizable element, the magnetic strength and/or the polarity of the magnetically encoded regions may form a chessboard-like structure. Thus, different regions with different polarities and different strengths may be provided adjacent to another. For instance, the "black" fields of the chessboard may be formed by portions having a positive polarity, and "white" fields of the chessboard may be formed by portions having a negative polarity.

The above and other aspects, objects, features and advantages of the present invention will become apparent from the following description and the appended claim, taken in conjunction with the accompanying drawings in which like parts or elements are denoted by like reference numbers.

BRIEF DESCRIPTION OF THE DRAWINGS

The accompanying drawings, which are included to provide a further understanding of the invention and constitute a part of the specification illustrate embodiments of the invention.

In the drawings:

FIG. 1 shows a torque sensor with a sensor element according to an exemplary embodiment of the present invention for explaining a method of manufacturing a torque sensor according to an exemplary embodiment of the present invention.

FIG. 2a shows an exemplary embodiment of a sensor element of a torque sensor according to the present invention for further explaining a principle of the present invention and an aspect of an exemplary embodiment of a manufacturing method of the present invention.

FIG. 2b shows a cross-sectional view along AA' of FIG. 2a.

FIG. 3b shows a cross-sectional representation along BB' of FIG. 3a.

FIG. 10b shows the sensor element of FIG. 10a after the application of current surges by means of the electrode system of FIG. 10a.

FIG. 14 shows another schematic diagram for illustrating that when no mechanical stress is applied to the sensor element according to an exemplary embodiment of the present invention, magnetic flux lines are running in its original paths.

FIG. 15 is another schematic diagram for further explaining a principle of an exemplary embodiment of the present invention.

FIG. 16 is another schematic diagram for further explaining the principle of an exemplary embodiment of the present invention.

FIG. 74A illustrates an apparatus for magnetizing a magnetizable object according to an exemplary embodiment of the invention.

FIG. 74B illustrates a chessboard-like structure of a surface of the magnetizable object magnetized in accordance with FIG. 74A.

FIG. 75 illustrates a method of manufacturing an angular sensor device according to an exemplary embodiment of the invention.

FIG. 76A illustrates an angle sensor device according to an exemplary embodiment of the invention.

FIG. 76B illustrates an angular sensor device according to an exemplary embodiment of the invention.

FIG. 77 illustrates an angular sensor device according to an exemplary embodiment of the invention.

FIG. 78 illustrates an angle sensor device according to an exemplary embodiment of the invention.

FIG. 79 illustrates another angle sensor device according to an exemplary embodiment of the invention.

FIG. 80 illustrates a cross-sectional view of the configuration of FIG. 79.

FIG. 81 illustrates an object having a magnetically encoded region thereon according to an exemplary embodiment of the invention.

DETAILED DESCRIPTION OF EXEMPLARY EMBODIMENTS OF THE INVENTION

Figure 3A:
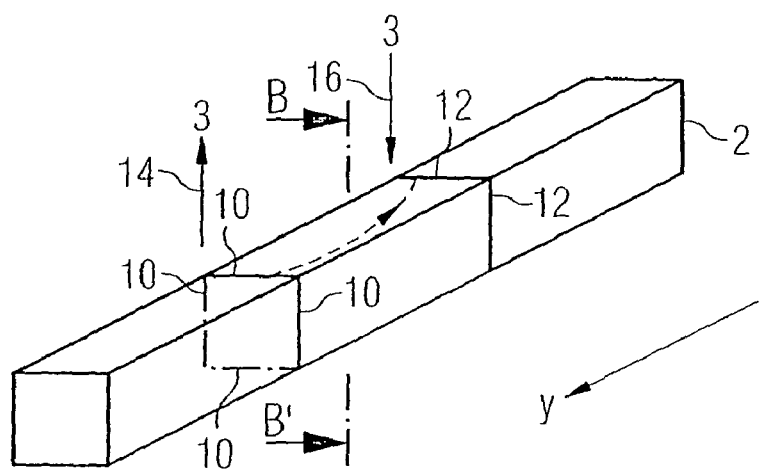
FIG. 3a shows another exemplary embodiment of a sensor element of a torque sensor according to the present invention for further explaining a principle of the present invention and an exemplary embodiment of a method of manufacturing a torque sensor according to the present invention.

It is disclosed a sensor having a sensor element such as a shaft wherein the sensor element may be manufactured in accordance with the following manufacturing steps
applying a first current pulse to the sensor element;
wherein the first current pulse is applied such that there is a first current flow in a first direction along a longitudinal axis of the sensor element;
wherein the first current pulse is such that the application of the current pulse generates a magnetically encoded region in the sensor element.

It is disclosed that a further second current pulse may be applied to the sensor element. The second current pulse may be applied such that there is a second current flow in a direction along the longitudinal axis of the sensor element.

It is disclosed that the directions of the first and second current pulses may be opposite to each other. Also, each of the first and second current pulses may have a raising edge and a falling edge. For example, the raising edge is steeper than the falling edge.

It is believed that the application of a current pulse may cause a magnetic field structure in the sensor element such that in a cross-sectional view of the sensor element, there is a first circular magnetic flow having a first direction and a second magnetic flow having a second direction. The radius of the first magnetic flow may be larger than the radius of the second magnetic flow. In shafts having a non-circular cross-section, the magnetic flow is not necessarily circular but may have a form essentially corresponding to and being adapted to the cross-section of the respective sensor element.

It is believed that if no torque is applied to a sensor element, there is no magnetic field or essentially no magnetic field detectable at the outside. When a torque or force is applied to the sensor element, there is a magnetic field emanated from the sensor element which can be detected by means of suitable coils. This will be described in further detail in the following.

A torque sensor may have a circumferential surface surrounding a core region of the sensor element. The first current pulse is introduced into the sensor element at a first location at the circumferential surface such that there is a first current flow in the first direction in the core region of the sensor element. The first current pulse is discharged from the sensor element at a second location at the circumferential surface. The second location is at a distance in the first direction from the first location. The second current pulse may be introduced into the sensor element at the second location or adjacent to the second location at the circumferential surface such that there is the second current flow in the second direction in the core region or adjacent to the core region in the sensor element. The second current pulse may be discharged from the sensor element at the first location or adjacent to the first location at the circumferential surface.

As already indicated above, the sensor element may be a shaft. The core region of such shaft may extend inside the shaft along its longitudinal extension such that the core region surrounds a center of the shaft. The circumferential surface of the shaft is the outside surface of the shaft. The first and second locations are respective circumferential regions at the outside of the shaft. There may be a limited number of contact portions which constitute such regions. Real contact regions may be provided, for example, by providing electrode regions made of brass rings as electrodes. Also, a core of a conductor may be looped around the shaft to provide for a good electric contact between a conductor such as a cable without isolation and the shaft.

The first current pulse and also the second current pulse may be not applied to the sensor element at an end face of the sensor element. The first current pulse may have a maximum between 40 and 1400 Ampere or between 60 and 800 Ampere or between 75 and 600 Ampere or between 80 and 500 Ampere. The current pulse may have a maximum such that an appropriate encoding is caused to the sensor element. However, due to different materials which may be used and different forms of the sensor element and different dimensions of the sensor element, a maximum of the current pulse may be adjusted in accordance with these parameters. The second pulse may have a similar maximum or may have a maximum approximately 10, 20, 30, 40 or 50% smaller than the first maximum. However, the second pulse may also have a higher maximum such as 10, 20, 40, 50, 60 or 80% higher than the first maximum.

A duration of those pulses may be the same. However, it is possible that the first pulse has a significant longer duration than the second pulse. However, it is also possible that the second pulse has a longer duration than the first pulse.

The first and/or second current pulses may have a first duration from the start of the pulse to the maximum and may have a second duration from the maximum to essentially the end of the pulse. The first duration may be significantly longer than the second duration. For example, the first duration may be smaller than 300 ms wherein the second duration may be larger than 300 ms. However, it is also possible that the first duration is smaller than 200 ms whereas the second duration is larger than 400 ms. Also, the first duration may be between 20 to 150 ms wherein the second duration may be between 180 to 700 ms.

As already indicated above, it is possible to apply a plurality of first current pulses but also a plurality of second current pulses. The sensor element may be made of steel whereas the steel may comprise nickel. The sensor material used for the primary sensor or for the sensor element may be 50NiCr13 or X4CrNi13-4 or X5CrNiCuNb16-4 or X20CrNi17-4 or X46Cr13 or X20Cr13 or 14NiCr14 or S155 as set forth in DIN 1.2721 or 1.4313 or 1.4542 or 1.2787 or 1.4034 or 1,4021 or 1.5752 or 1.6928.

The first current pulse may be applied by means of an electrode system having at least a first electrode and a second electrode. The first electrode is located at the first location or adjacent to the first location and the second electrode is located at the second location or adjacent to the second location.

Each of the first and second electrodes may have a plurality of electrode pins. The plurality of electrode pins of each of the first and second electrodes may be arranged circumferentially around the sensor element such that the sensor element is contacted by the electrode pins of the first and second electrodes at a plurality of contact points at an outer circumferential surface of the shaft at the first and second locations.

As indicated above, instead of electrode pins laminar or two-dimensional electrode surfaces may be applied. For example, electrode surfaces are adapted to surfaces of the shaft such that a good contact between the electrodes and the shaft material may be ensured.

At least one of the first current pulse and at least one of the second current pulse may be applied to the sensor element such that the sensor element has a magnetically encoded region such that in a direction essentially perpendicular to a surface of the sensor element, the magnetically encoded region of the sensor element has a magnetic field structure such that there is a first magnetic flow in a first direction and a second magnetic flow in a second direction. The first direction may be opposite to the second direction.

In a cross-sectional view of the sensor element, there may be a first circular magnetic flow having the first direction and a first radius and a second circular magnetic flow having the second direction and a second radius. The first radius may be larger than the second radius.

Furthermore, the sensor elements may have a first pinning zone adjacent to the first location and a second pinning zone adjacent to the second location.

The pinning zones may be manufactured in accordance with the following manufacturing method. According to this method, for forming the first pinning zone, at the first location or adjacent to the first location, a third current pulse is applied on the circumferential surface of the sensor element such that there is a third current flow in the second direction. The third current flow is discharged from the sensor element at a third location which is displaced from the first location in the second direction.

For forming the second pinning zone, at the second location or adjacent to the second location, a forth current pulse may be applied on the circumferential surface to the sensor element such that there is a forth current flow in the first direction. The forth current flow is discharged at a forth location which is displaced from the second location in the first direction.

A torque sensor may be provided comprising a first sensor element with a magnetically encoded region wherein the first sensor element has a surface. In a direction essentially perpendicular to the surface of the first sensor element, the magnetically encoded region of the first sensor element may have a magnetic field structure such that there is a first magnetic flow in a first direction and a second magnetic flow in a second direction. The first and second directions may be opposite to each other.

The torque sensor may further comprise a second sensor element with at least one magnetic field detector. The second sensor element may be adapted for detecting variations in the magnetically encoded region. More precisely, the second sensor element may be adapted for detecting variations in a magnetic field emitted from the magnetically encoded region of the first sensor element.

The magnetically encoded region may extend longitudinally along a section of the first sensor element, but does not extend from one end face of the first sensor element to the other end face of the first sensor element. In other words, the magnetically encoded region does not extend along all of the first sensor element but only along a section thereof.

The first sensor element may have variations in the material of the first sensor element caused by at least one current pulse or surge applied to the first sensor element for altering the magnetically encoded region or for generating the magnetically encoded region. Such variations in the material may be caused, for example, by differing contact resistances between electrode systems for applying the current pulses and the surface of the respective sensor element. Such variations may, for example, be burn marks or color variations or signs of an annealing.

The variations may be at an outer surface of the sensor element and not at the end faces of the first sensor element since the current pulses are applied to outer surface of the sensor element but not to the end faces thereof.

A shaft for a magnetic sensor may be provided having, in a cross-section thereof, at least two circular magnetic loops running in opposite direction. Such shaft is believed to be manufactured in accordance with the above-described manufacturing method.

Furthermore, a shaft may be provided having at least two circular magnetic loops which are arranged concentrically.

A shaft for a torque sensor may be provided which is manufactured in accordance with the following manufacturing steps where firstly a first current pulse is applied to the shaft. The first current pulse is applied to the shaft such that there is a first current flow in a first direction along a longitudinal axis of the shaft. The first current pulse is such that the application of the current pulse generates a magnetically encoded region in the shaft. This may be made by using an electrode system as described above and by applying current pulses as described above.

An electrode system may be provided for applying current surges to a sensor element for a torque sensor, the electrode system having at least a first electrode and a second electrode wherein the first electrode is adapted for location at a first location on an outer surface of the sensor element. A second electrode is adapted for location at a second location on the outer surface of the sensor element. The first and second electrodes are adapted for applying and discharging at least one current pulse at the first and second locations such that current flows within a core region of the sensor element are caused. The at least one current pulse is such that a magnetically encoded region is generated at a section of the sensor element.

The electrode system may comprise at least two groups of electrodes, each comprising a plurality of electrode pins. The electrode pins of each electrode are arranged in a circle such that the sensor element is contacted by the electrode pins of the electrode at a plurality of contact points at an outer surface of the sensor element.

The outer surface of the sensor element does not include the end faces of the sensor element.

FIG. 1 shows an exemplary embodiment of a torque sensor according to the present invention. The torque sensor comprises a first sensor element or shaft 2 having a rectangular cross-section. The first sensor element 2 extends essentially along the direction indicated with X. In a middle portion of the first sensor element 2, there is the encoded region 4. The first location is indicated by reference numeral 10 and indicates one end of the encoded region and the second location is indicated by reference numeral 12 which indicates another end of the encoded region or the region to be magnetically encoded 4. Arrows 14 and 16 indicate the application of a current pulse. As indicated in FIG. 1, a first current pulse is applied to the first sensor element 2 at an outer region adjacent or close to the first location 10. For example, as will be described in further detail later on, the current is introduced into the first sensor element 2 at a plurality of points or regions close to the first location and for example surrounding the outer surface of the first sensor element 2 along the first location 10. As indicated with arrow 16, the current pulse is discharged from the first sensor element 2 close or adjacent or at the second location 12 for example at a plurality or locations along the end of the region 4 to be encoded. As already indicated before, a plurality of current pulses may be applied in succession they may have alternating directions from location 10 to location 12 or from location 12 to location 10.

Reference numeral 6 indicates a second sensor element which is for example a coil connected to a controller electronic 8. The controller electronic 8 may be adapted to further process a signal output by the second sensor element 6 such that an output signal may output from the control circuit corresponding to a torque applied to the first sensor element 2. The control circuit 8 may be an analog or digital circuit. The second sensor element 6 is adapted to detect a magnetic field emitted by the encoded region 4 of the first sensor element.

It is believed that, as already indicated above, if there is no stress or force applied to the first sensor element 2, there is essentially no field detected by the second sensor element 6. However, in case a stress or a force is applied to the secondary sensor element 2, there is a variation in the magnetic field emitted by the encoded region such that an increase of a magnetic field from the presence of almost no field is detected by the second sensor element 6.

It has to be noted that according to other exemplary embodiments of the present invention, even if there is no stress applied to the first sensor element, it may be possible that there is a magnetic field detectable outside or adjacent to the encoded region 4 of the first sensor element 2. However, it is to be noted that a stress applied to the first sensor element 2 causes a variation of the magnetic field emitted by the encoded region 4.

In the following, with reference to FIGS. 2a, 2b, 3a, 3b and 4, a method of manufacturing a torque sensor according to an exemplary embodiment of the present invention will be described. In particular, the method relates to the magnetization of the magnetically encoded region 4 of the first sensor element 2.

As may be taken from FIG. 2a, a current I is applied to an end region of a region 4 to be magnetically encoded. This end region as already indicated above is indicated with reference numeral 10 and may be a circumferential region on the outer surface of the first sensor element 2. The current I is discharged from the first sensor element 2 at another end area of the magnetically encoded region (or of the region to be magnetically encoded) which is indicated by reference numeral 12 and also referred to a second location. The current is taken from the first sensor element at an outer surface thereof, for example circumferentially in regions close or adjacent to location 12. As indicated by the dashed line between locations 10 and 12, the current I introduced at or along location 10 into the first sensor element flows through a core region or parallel to a core region to location 12. In other words, the current I flows through the region 4 to be encoded in the first sensor element 2.

FIG. 2b shows a cross-sectional view along AA'. In the schematic representation of FIG. 2b, the current flow is indicated into the plane of the FIG. 2b as a cross. Here, the current flow is indicated in a center portion of the cross-section of the first sensor element 2. It is believed that this introduction of a current pulse having a form as described above or in the following and having a maximum as described above or in the following causes a magnetic flow structure 20 in the cross-sectional view with a magnetic flow direction into one direction here into the clockwise direction. The magnetic flow structure 20 depicted in FIG. 2b is depicted essentially circular. However, the magnetic flow structure 20 may be adapted to the actual cross-section of the first sensor element 2 and may be, for example, more elliptical.

Figure 3B:
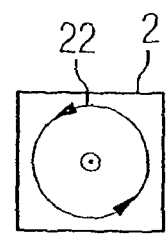

FIGS. 3a and 3b show a step of the method according to an exemplary embodiment of the present invention which may be applied after the step depicted in FIGS. 2a and 2b. FIG. 3a shows a first sensor element according to an exemplary embodiment of the present invention with the application of a second current pulse and FIG. 3b shows a cross-sectional view along BB' of the first sensor element 2.

As may be taken from FIG. 3a, in comparison to FIG. 2a, in FIG. 3a, the current I indicated by arrow 16 is introduced into the sensor element 2 at or adjacent to location 12 and is discharged or taken from the sensor element 2 at or adjacent to the location 10. In other words, the current is discharged in FIG. 3a at a location where it was introduced in FIG. 2a and vice versa. Thus, the introduction and discharging of the current I into the first sensor element 2 in FIG. 3a may cause a current through the region 4 to be magnetically encoded opposite to the respective current flow in FIG. 2a.

The current is indicated in FIG. 3b in a core region of the sensor element 2. As may be taken from a comparison of FIGS. 2b and 3b, the magnetic flow structure 22 has a direction opposite to the current flow structure 20 in FIG. 2b.

Figure 4:
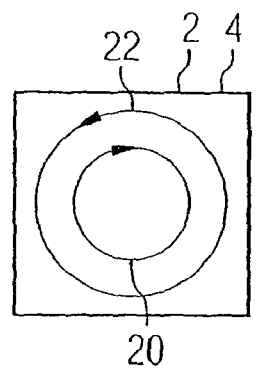
FIG. 4 shows a cross-sectional representation of the sensor element of the torque sensor of FIGS. 2a and 3a manufactured in accordance with a method according to an exemplary embodiment of the present invention.

As indicated before, the steps depicted in FIGS. 2a, 2b and 3a and 3b may be applied individually or may be applied in succession of each other. When firstly, the step depicted in FIGS. 2a and 2b is performed and then the step depicted in FIGS. 3a and 3b, a magnetic flow structure as depicted in the cross-sectional view through the encoded region 4 depicted in FIG. 4 may be caused. As may be taken from FIG. 4, the two current flow structures 20 and 22 are encoded into the encoded region together. Thus, in a direction essentially perpendicular to a surface of the first sensor element 2, in a direction to the core of the sensor element 2, there is a first magnetic flow having a first direction and then underlying there is a second magnetic flow having a second direction. As indicated in FIG. 4, the flow directions may be opposite to each other.

Thus, if there is no torque applied to the first torque sensor element 2, the two magnetic flow structures 20 and 22 may cancel each other such that there is essentially no magnetic field at the outside of the encoded region. However, in case a stress or force is applied to the first sensor element 2, the magnetic field structures 20 and 22 cease to cancel each other such that there is a magnetic field occurring at the outside of the encoded region which may then be detected by means of the secondary sensor element 6. This will be described in further detail in the following.

Figure 5:
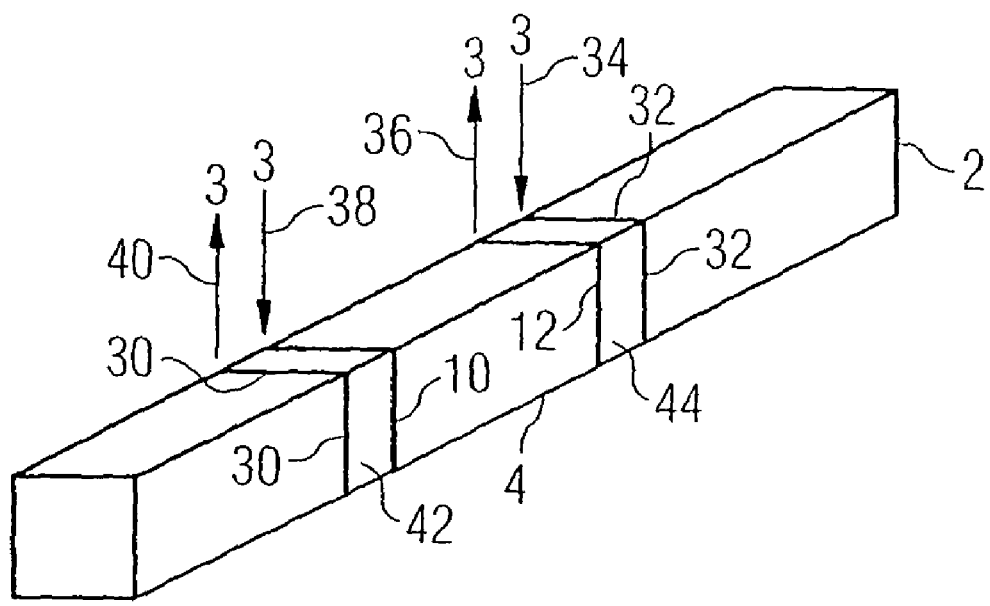
FIG. 5 shows another exemplary embodiment of a sensor element of a torque sensor according to the present invention for further explaining an exemplary embodiment of a manufacturing method of manufacturing a torque sensor according to the present invention.

FIG. 5 shows another exemplary of a first sensor element 2 according to an exemplary embodiment of the present invention as may be used in a torque sensor according to an exemplary embodiment which is manufactured according to a manufacturing method according to an exemplary embodiment of the present invention. As may be taken from FIG. 5, the first sensor element 2 has an encoded region 4 which is for example encoded in accordance with the steps and arrangements depicted in FIGS. 2a, 2b, 3a, 3b and 4.

Adjacent to locations 10 and 12, there are provided pinning regions 42 and 44. These regions 42 and 44 are provided for avoiding a fraying of the encoded region 4. In other words, the pinning regions 42 and 44 may allow for a more definite beginning and end of the encoded region 4.

In short, the first pinning region 42 may be adapted by introducing a current 38 close or adjacent to the first location 10 into the first sensor element 2 in the same manner as described, for example, with reference to FIG. 2a. However, the current I is discharged from the first sensor element 2 at a first location 30 which is at a distance from the end of the encoded region close or at location 10. This further location is indicated by reference numeral 30. The introduction of this further current pulse I is indicated by arrow 38 and the discharging thereof is indicated by arrow 40. The current pulses may have the same form shaping maximum as described above.

For generating the second pinning region 44, a current is introduced into the first sensor element 2 at a location 32 which is at a distance from the end of the encoded region 4 close or adjacent to location 12. The current is then discharged from the first sensor element 2 at or close to the location 12. The introduction of the current pulse I is indicated by arrows 34 and 36.

The pinning regions 42 and 44 for example are such that the magnetic flow structures of these pinning regions 42 and 44 are opposite to the respective adjacent magnetic flow structures in the adjacent encoded region 4. As may be taken from FIG. 5, the pinning regions can be coded to the first sensor element 2 after the coding or the complete coding of the encoded region 4.

Figure 6:
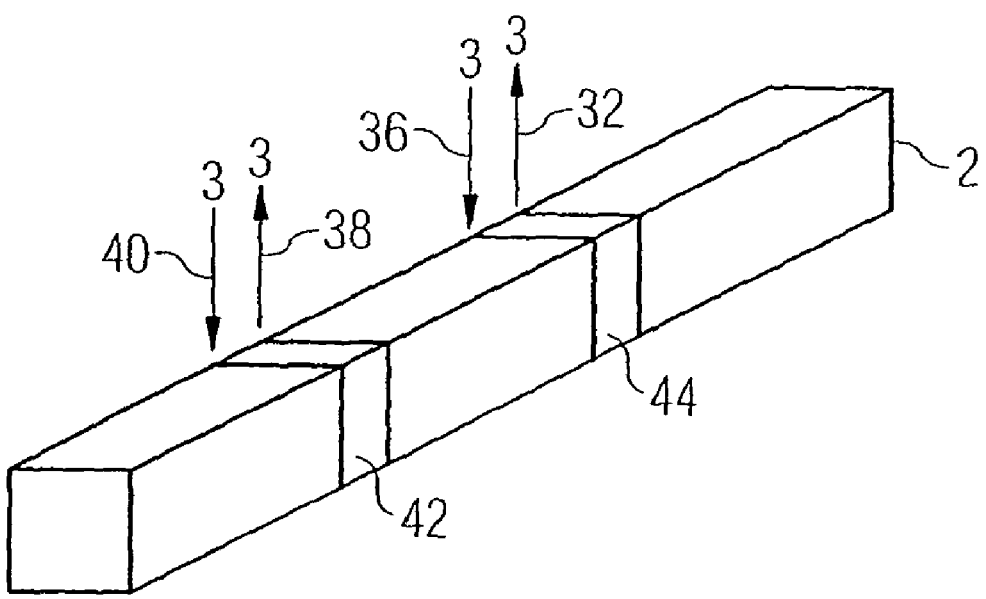
FIG. 6 shows another exemplary embodiment of a sensor element of a torque sensor according to the present invention for further explaining an exemplary embodiment of a manufacturing method for a torque sensor according to the present invention.

FIG. 6 shows another exemplary embodiment of the present invention where there is no encoding region 4. In other words, according to an exemplary embodiment of the present invention, the pinning regions may be coded into the first sensor element 2 before the actual coding of the magnetically encoded region 4.

Figure 7:
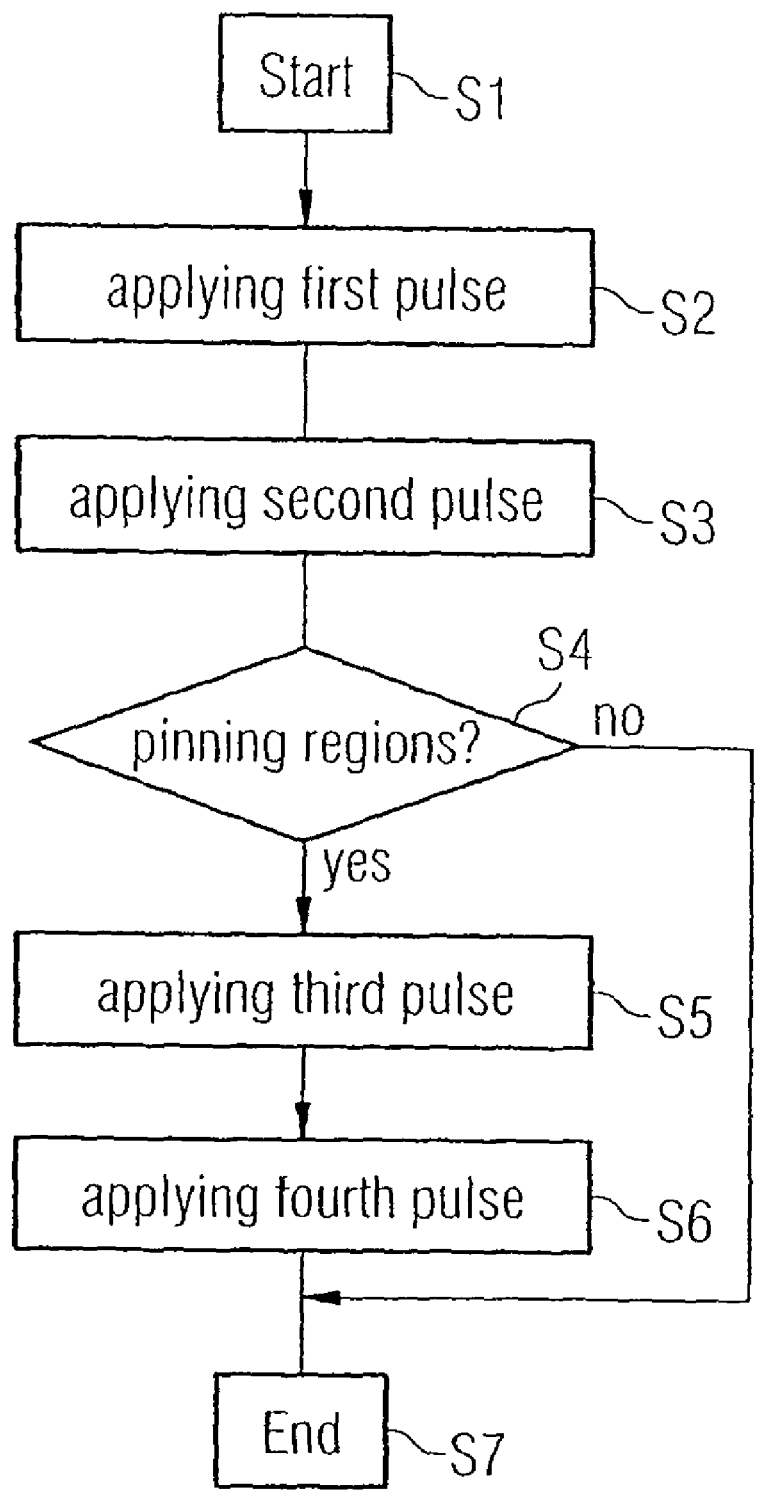
FIG. 7 shows a flow-chart for further explaining an exemplary embodiment of a method of manufacturing a torque sensor according to the present invention.

FIG. 7 shows a simplified flow-chart of a method of manufacturing a first sensor element 2 for a torque sensor according to an exemplary embodiment of the present invention.

After the start in step S1, the method continues to step S2 where a first pulse is applied as described as reference to FIGS. 2a and 2b. Then, after step S2, the method continues to step S3 where a second pulse is applied as described with reference to FIGS. 3a and 3b.

Then, the method continues to step S4 where it is decided whether the pinning regions are to be coded to the first sensor element 2 or not. If it is decided in step S4 that there will be no pinning regions, the method continues directly to step S7 where it ends.

If it is decided in step S4 that the pinning regions are to be coded to the first sensor element 2, the method continues to step S5 where a third pulse is applied to the pinning region 42 in the direction indicated by arrows 38 and 40 and to pinning region 44 indicated by the arrows 34 and 36. Then, the method continues to step S6 where force pulses applied to the respective pinning regions 42 and 44. To the pinning region 42, a force pulse is applied having a direction opposite to the direction indicated by arrows 38 and 40. Also, to the pinning region 44, a force pulse is applied to the pinning region having a direction opposite to the arrows 34 and 36. Then, the method continues to step S7 where it ends.

In other words, for example two pulses are applied for encoding of the magnetically encoded region 4. Those current pulses for example have an opposite direction. Furthermore, two pulses respectively having respective directions are applied to the pinning region 42 and to the pinning region 44.

Figure 8:
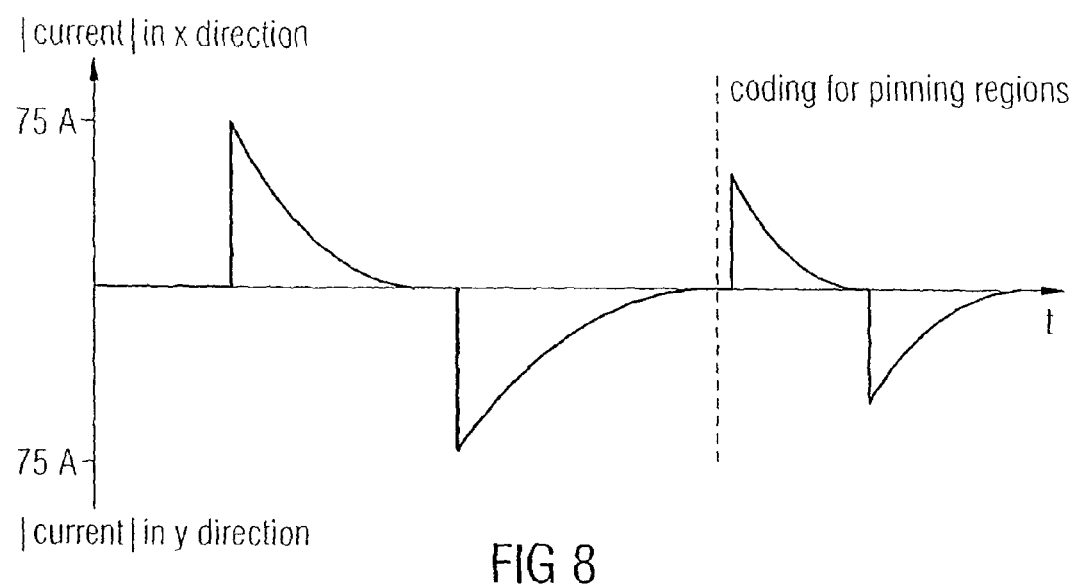
FIG. 8 shows a current versus time diagram for further explaining a method according to an exemplary embodiment of the present invention.

FIG. 8 shows a current versus time diagram of the pulses applied to the magnetically encoded region 4 and to the pinning regions. The positive direction of the y-axis of the diagram in FIG. 8 indicates a current flow into the x-direction and the negative direction of the y-axis of FIG. 8 indicates a current flow in the y-direction.

As may be taken from FIG. 8 for coding the magnetically encoded region 4, firstly a current pulse is applied having a direction into the x-direction. As may be taken from FIG. 8, the raising edge of the pulse is very sharp whereas the falling edge has a relatively long direction in comparison to the direction of the raising edge. As depicted in FIG. 8, the pulse may have a maximum of approximately 75 Ampere. In other applications, the pulse may be not as sharp as depicted in FIG. 8. However, the raising edge should be steeper or should have a shorter duration than the falling edge.

Then, a second pulse is applied to the encoded region 4 having an opposite direction. The pulse may have the same form as the first pulse. However, a maximum of the second pulse may also differ from the maximum of the first pulse. Although the immediate shape of the pulse may be different.

The programming scheme of FIG. 8 is particularly appropriate for a shaft which is magnetized for the first time.

Then, for coding the pinning regions, pulses similar to the first and second pulse may be applied to the pinning regions as described with reference to FIGS. 5 and 6. Such pulses may be applied to the pinning regions simultaneously but also successfully for each pinning region. As depicted in FIG. 8, the pulses may have essentially the same form as the first and second pulses. However, a maximum may be smaller.

Figure 9:
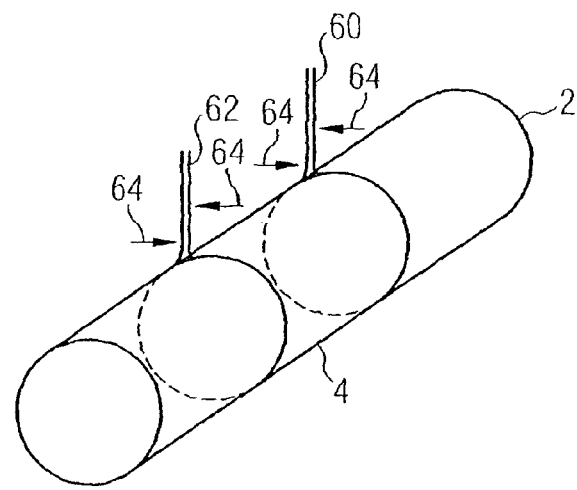
FIG. 9 shows another exemplary embodiment of a sensor element of a torque sensor according to the present invention with an electrode system according to an exemplary embodiment of the present invention.

FIG. 9 shows another exemplary embodiment of a first sensor element of a torque sensor according to an exemplary embodiment of the present invention showing an electrode arrangement for applying the current pulses for coding the magnetically encoded region 4. As may be taken from FIG. 9, a conductor without an isolation may be looped around the first sensor element 2 which is may be taken from FIG. 9 may be a circular shaft having a circular cross-section. For ensuring a close fit of the conductor on the outer surface of the first sensor element 2, the conductor may be clamped as shown by arrows 64.

Figure 10A:
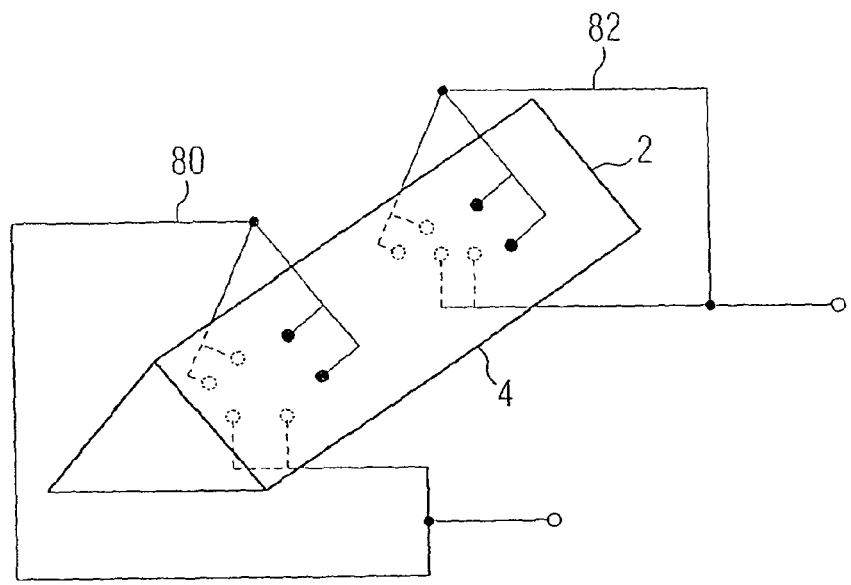
FIG. 10a shows another exemplary embodiment of a torque sensor according to the present invention with an electrode system according to an exemplary embodiment of the present invention.
Figure 10B:
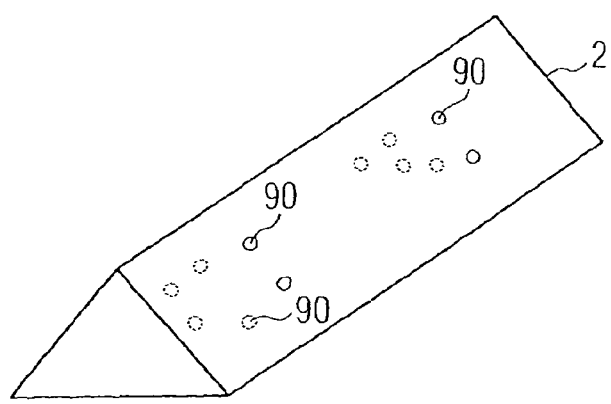

FIG. 10a shows another exemplary embodiment of a first sensor element according to an exemplary embodiment of the present invention. Furthermore, FIG. 10a shows another exemplary embodiment of an electrode system according to an exemplary embodiment of the present invention. The electrode system 80 and 82 depicted in FIG. 10a contacts the first sensor element 2 which has a triangular cross-section with two contact points at each phase of the triangular first sensor element at each side of the region 4 which is to be encoded as magnetically encoded region. Overall, there are six contact points at each side of the region 4. The individual contact points may be connected to each other and then connected to one individual contact points.

If there is only a limited number of contact points between the electrode system and the first sensor element 2 and if the current pulses applied are very high, differing contact resistances between the contacts of the electrode systems and the material of the first sensor element 2 may cause burn marks at the first sensor element 2 at contact point to the electrode systems. These burn marks 90 may be color changes, may be welding spots, may be annealed areas or may simply be burn marks.

According to an exemplary embodiment of the present invention, the number of contact points is increased or even a contact surface is provided such that such burn marks 90 may be avoided.

Figure 11:
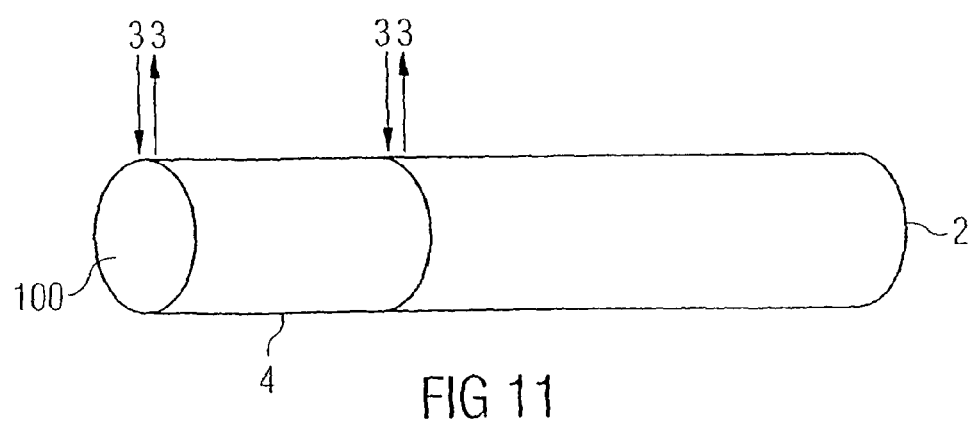
FIG. 11 shows another exemplary embodiment of a torque sensor element for a torque sensor according to the present invention.

FIG. 11 shows another exemplary embodiment of a first sensor element 2 which is a shall having a circular cross-section according to an exemplary embodiment of the present invention. As may be taken from FIG. 11, the magnetically encoded region is at an end region of the first sensor element 2. According to an exemplary embodiment of the present invention, the magnetically encoded region 4 is not extend over the full length of the first sensor element 2. As may be taken from FIG. 11, it may be located at one end thereof. However, it has to be noted that according to an exemplary embodiment of the present invention, the current pulses are applied from an outer circumferential surface of the first sensor element 2 and not from the end face 100 of the first sensor element 2.

In the following, the so-called PCME ("Pulse-Current-Modulated Encoding") Sensing Technology will be described in detail, which can, according to a exemplary embodiment of the invention, be implemented to magnetize a magnetizable object which is then partially demagnetized according to the invention. In the following, the PCME technology will partly described in the context of torque sensing. However, this concept may implemented in the context of position sensing as well.

In this description, there are a number of acronyms used as otherwise some explanations and descriptions may be difficult to read. While the acronyms "ASIC", "IC", and "PCB" are already market standard definitions, there are many terms that are particularly related to the magnetostriction based NCT sensing technology. It should be noted that in this description, when there is a reference to NCT technology or to PCME, it is referred to exemplary embodiments of the present invention.

Table 1 shows a list of abbreviations used in the following description of the PCME technology.

TABLE 1

List of abbreviations

| Acronym | Description | Category |
|---|---|---|
| ASIC | Application Specific IC | Electronics |
| DF | Dual Field | Primary Sensor |
| EMF | Earth Magnetic Field | Test Criteria |
| FS | Full Scale | Test Criteria |
| Hot-Spotting | Sensitivity to nearby Ferro magnetic material | Specification |
| IC | Integrated Circuit | Electronics |
| MFS Component | Magnetic Field Sensor | Sensor |
| NCT | Non Contact Torque | Technology |
| PCB | Printed Circuit Board | Electronics |
| PCME | Pulse Current Modulated Encoding | Technology |
| POC | Proof-of-Concept | |
| RSU | Rotational Signal Uniformity | Specification |
| SCSP | Signal Conditioning & Signal Processing | Electronics |
| SF | Single Field | Primary Sensor |
| SH | Sensor Host | Primary Sensor |
| SPHC | Shaft Processing Holding Clamp | Processing Tool |
| SSU | Secondary Sensor Unit | Sensor Component |

The magnetic principle based mechanical-stress sensing technology allows to design and to produce a wide range of "physical-parameter-sensors" (like Force Sensing, Torque Sensing, and Material Diagnostic Analysis) that can be applied where Ferro-Magnetic materials are used. The most common technologies used to build "magnetic-principle-based" sensors are: Inductive differential displacement measurement (requires torsion shaft), measuring the changes of the materials permeability, and measuring the magnetostriction effects.

Over the last 20 years a number of different companies have developed their own and very specific solution in how to design and how to produce a magnetic principle based torque sensor (i.e. ABB, FAST, Frauenhofer Institute, FT, Kubota, MDI, NCTE, RM, Siemens, and others). These technologies are at various development stages and differ in "how-it-works", the achievable performance, the systems reliability, and the manufacturing/system cost.

Some of these technologies require that mechanical changes are made to the shaft where torque should be measured (chevrons), or rely on the mechanical torsion effect (require a long shaft that twists under torque), or that something will be attached to the shaft itself (press-fitting a ring of certain properties to the shaft surface,), or coating of the shaft surface with a special substance. No-one has yet mastered a high-volume manufacturing process that can be applied to (almost) any shaft size, achieving tight performance tolerances, and is not based on already existing technology patents.

In the following, a magnetostriction principle based Non-Contact-Torque (NCT) Sensing Technology is described that offers to the user a whole host of new features and improved performances, previously not available. This technology enables the realization of a fully-integrated (small in space), real-time (high signal bandwidth) torque measurement, which is reliable and can be produced at an affordable cost, at any desired quantities. This technology is called: PCME (For Pulse-Current-Modulated Encoding) or Magnetostriction Transversal Torque Sensor.

The PCME technology can be applied to the shaft without making any mechanical changes to the shaft, or without attaching anything to the shaft. Most important, the PCME technology can be applied to any shaft diameter (most other technologies have here a limitation) and does not need to rotate/spin the shaft during the encoding process (very simple and low-cost manufacturing process) which makes this technology very applicable for high-volume application.

In the following, a Magnetic Field Structure (Sensor Principle) will be described.

The sensor life-time depends on a "closed-loop" magnetic field design. The PCME technology is based on two magnetic field structures, stored above each other, and running in opposite directions. When no torque stress or motion stress is applied to the shaft (also called Sensor Host, or SH) then the SH will act magnetically neutral (no magnetic field can be sensed at the outside of the SH).

Figure 12:
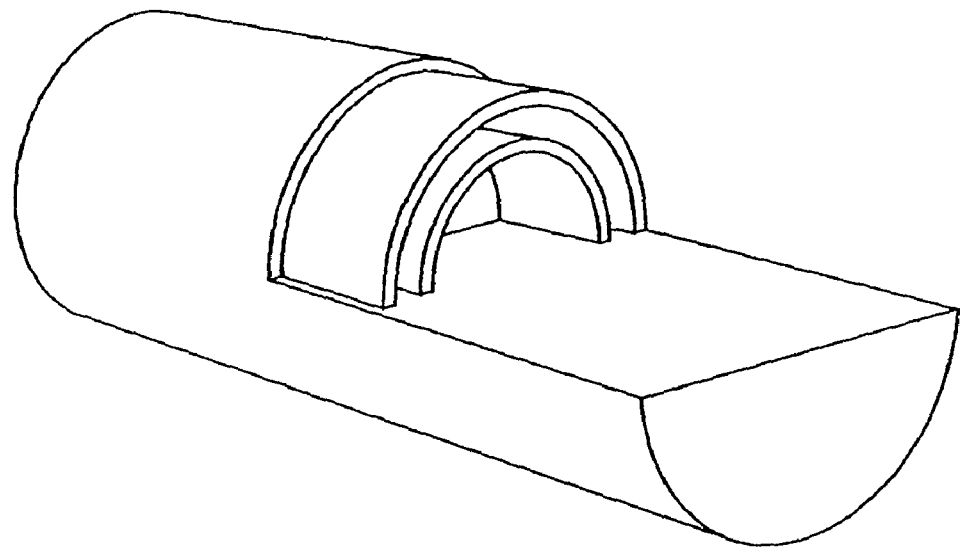
FIG. 12 shows a schematic diagram of a sensor element of a torque sensor according to another exemplary embodiment of the present invention showing that two magnetic fields may be stored in the shad and running in endless circles.

FIG. 12 shows that two magnetic fields are stored in the shaft and running in endless circles. The outer field runs in one direction, while the inner field runs in the opposite direction.

Figure 13:
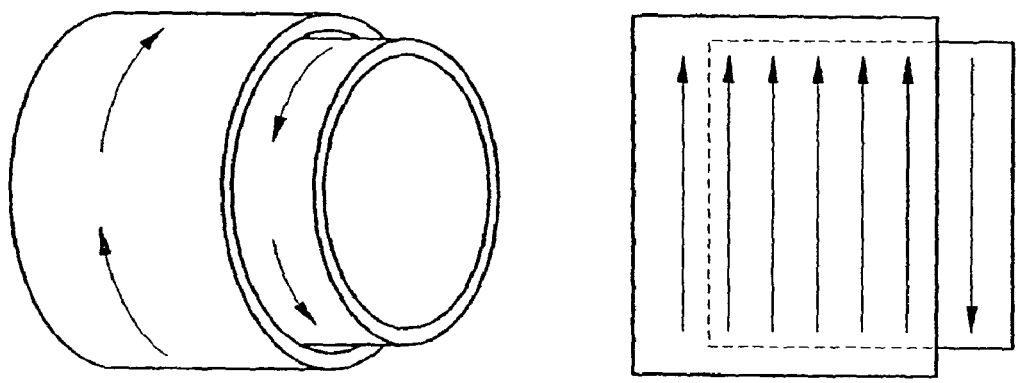
FIG. 13 is another schematic diagram for illustrating PCME sensing technology using two counter cycle or magnetic field loops which may be generated in accordance with a manufacturing method according to the present invention.

FIG. 13 illustrates that the PCME sensing technology uses two Counter-Circular magnetic field loops that are stored on top of each other (Picky-Back mode).

When mechanical stress (like reciprocation motion or torque) is applied at both ends of the PCME magnetized SH (Sensor Host, or Shaft) then the magnetic flux lines of both magnetic structures (or loops) will tilt in proportion to the applied torque.

As illustrated in FIG. 14, when no mechanical stresses are applied to the SH the magnetic flux lines are running in its original path. When mechanical stresses are applied the magnetic flux lines tilt in proportion to the applied stress (like linear motion or torque).

Depending on the applied torque direction (clockwise or anti-clockwise, in relation to the SH) the magnetic flux lines will either tilt to the right or tilt to the left. Where the magnetic flux lines reach the boundary of the magnetically encoded region, the magnetic flux lines from the upper layer will join-up with the magnetic flux lines from the lower layer and visa-versa. This will then form a perfectly controlled toroidal shape.

The benefits of such a magnetic structure are:
Reduced (almost eliminated) parasitic magnetic field structures when mechanical stress is applied to the SH (this will result in better RSU performances).
Higher Sensor-Output Signal-Slope as there are two "active" layers that compliment each other when generating a mechanical stress related signal. Explanation: When using a single-layer sensor design, the "tilted" magnetic flux lines that exit at the encoding region boundary have to create a "return passage" from one boundary side to the other. This effort effects how much signal is available to be sensed and measured outside of the SH with the secondary sensor unit,
There are almost no limitations on the SH (shaft) dimensions where the PCME technology will be applied to. The dual layered magnetic field structure can be adapted to any solid or hollow shaft dimensions.
The physical dimensions and sensor performances are in a very wide range programmable and therefore can be tailored to the targeted application.
This sensor design allows to measure mechanical stresses coming from all three dimensions axis, including in-line forces applied to the shaft (applicable as a load-cell). Explanation: Earlier magnetostriction sensor designs (for example from FAST Technology) have been limited to be sensitive in 2 dimensional axis only, and could not measure in-line forces.

Referring to FIG. 15, when torque is applied to the SH, the magnetic flux lines from both Counter-Circular magnetic loops are connecting to each other at the sensor region boundaries.

When mechanical torque stress is applied to the SH then the magnetic field will no longer run around in circles but tilt slightly in proportion to the applied torque stress. This will cause the magnetic field lines from one layer to connect to the magnetic field lines in the other layer, and with this form a toroidal shape.

Referring to FIG. 16, an exaggerated or idealized presentation is shown of how the magnetic flux line will form an angled toroidal structure when high levels of torque are applied to the SH.

In the following, features and benefits of the PCM-Encoding (PCME) Process will be described.

The magnetostriction NCT sensing technology from NCTE according to the present invention offers high performance sensing features like:
No mechanical changes required on the Sensor Host (already existing shafts can be used as they are)
Nothing has to be attached to the Sensor Host (therefore nothing can fall off or change over the shaft-lifetime=high MTBF)
During measurement the SH can rotate, reciprocate or move at any desired speed (no limitations on rpm)
Very good RSU (Rotational Signal Uniformity) performances
Excellent measurement linearity (up to 0.01% of FS)
High measurement repeatability
Very high signal resolution (better than 14 bit)
Very high signal bandwidth (better than 10 kHz)

Depending on the chosen type of magnetostriction sensing technology, and the chosen physical sensor design, the mechanical power transmitting shaft (also called "Sensor Host" or in short "SH") can be used "as is" without making any mechanical changes to it or without attaching anything to the shaft. This is then called a "true" Non-Contact-Torque measurement principle allowing the shaft to rotate freely at any desired speed in both directions.

The here described PCM-Encoding (PCME) manufacturing process according to an exemplary embodiment of the present invention provides additional features no other magnetostriction technology can offer (Uniqueness of this technology):
More then three times signal strength in comparison to alternative magnetostriction encoding processes (like the "RS" process from FAST).
Easy and simple shaft loading process (high manufacturing through-putt).
No moving components during magnetic encoding process (low complexity manufacturing equipment=high MTBF, and lower cost).
Process allows NCT sensor to be "line-tuning" to achieve target accuracy or a Fraction of one percent.
Manufacturing process allows shaft "pre-processing" and "post-processing" in the same process cycle (high manufacturing through-putt).
Sensing technology and manufacturing process is ratio-metric and therefore is applicable to all shaft or tube diameters.
The PCM-Encoding process can be applied while the SH is already assembled (depending on accessibility) (maintenance friendly).
Final sensor is insensitive to axial shaft movements (the actual allowable axial shaft movement depends on the physical "length" of the magnetically encoded region).
Magnetically encoded SH remains neutral and has little to non magnetic field when no forces (like torque) are applied to the SH.
Sensitive to mechanical forces in all three dimensional axis.

In the following, the Magnetic Flux Distribution in the SH will be described.

The PCME processing technology is based on using electrical currents, passing through the SH (Sensor Host or Shaft) to achieve the desired, permanent magnetic encoding of the Ferro-magnetic material. To achieve the desired sensor performance and features a very specific and well controlled electrical current is required. Early experiments that used DC currents failed because of luck of understanding how small amounts and large amounts of DC electric current are travelling through a conductor (in this case the "conductor" is the mechanical power transmitting shaft, also called Sensor Host or in short "SH").

Figure 17:
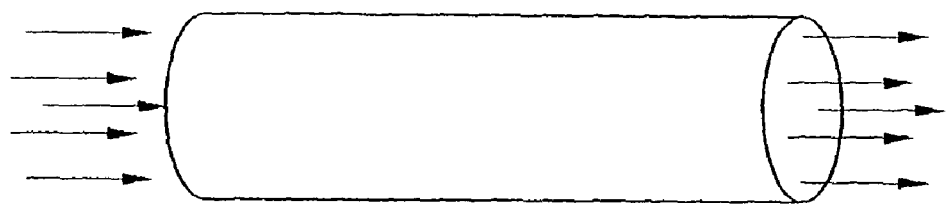
FIGS. 17-22 are schematic representations for further explaining a principle of an exemplary embodiment of the present invention.

Referring to FIG. 17, an assumed electrical current density in a conductor is illustrated.

It is widely assumed that the electric current density in a conductor is evenly distributed over the entire cross-section of the conductor when an electric current (DC) passes through the conductor.

Figure 18:
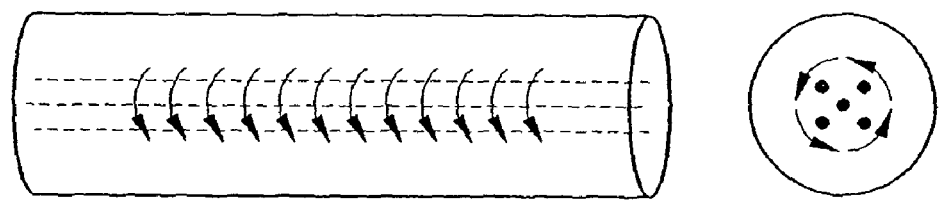

Referring to FIG. 18, a small electrical current forming magnetic field that ties current path in a conductor is shown.

It is our experience that when a small amount of electrical current (DC) is passing through the conductor that the current density is highest at the centre of the conductor. The two main reasons for this are: The electric current passing through a conductor generates a magnetic field that is tying together the current path in the centre of the conductor, and the impedance is the lowest in the centre of the conductor.

Figure 19:
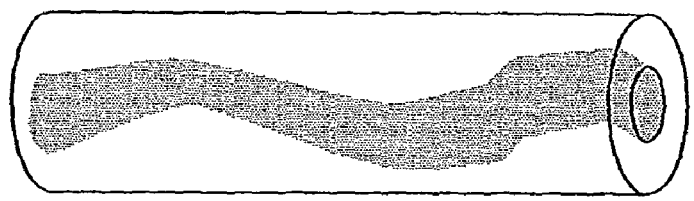

Referring to FIG. 19, a typical flow of small electrical currents in a conductor is illustrated.

In reality, however, the electric current may not flow in a "straight" line from one connection pole to the other (similar to the shape of electric lightening in the sky).

At a certain level of electric current the generated magnetic field is large enough to cause a permanent magnetization of the Ferro-magnetic shaft material. As the electric current is flowing near or at the centre of the SH, the permanently stored magnetic field will reside at the same location: near or at the centre of the SH. When now applying mechanical torque or linear force for oscillation/reciprocation to the shaft, then shaft internally stored magnetic field will respond by tilting its magnetic flux path in accordance to the applied mechanical force. As the permanently stored magnetic field lies deep below the shaft surface the measurable effects are very small, not uniform and therefore not sufficient to build a reliable NCT sensor system.

Figure 20:
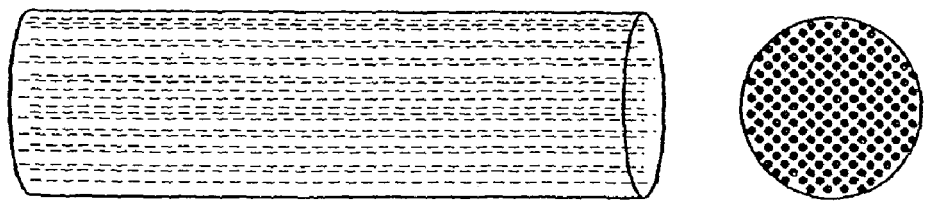

Referring to FIG. 20, a uniform current density in a conductor at saturation level is shown.

Only at the saturation level is the electric current density (when applying DC) evenly distributed at the entire cross section of the conductor. The amount of electrical current to achieve this saturation level is extremely high and is mainly influenced by the cross section and conductivity (impedance) of the used conductor.

Figure 21:
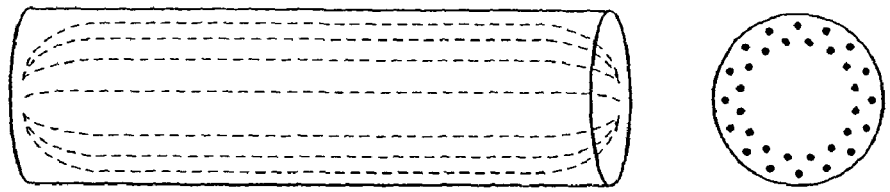

Referring to FIG. 21, electric current travelling beneath or at the surface of the conductor (Skin-Effect) is shown.

It is also widely assumed that when passing through alternating current (like a radio frequency signal) through a conductor that the signal is passing through the skin layers of the conductor, called the Skin Effect. The chosen frequency of the alternating current defines the "Location/position" and "depth" of the Skin Effect. At high frequencies the electrical current will travel right at or near the surface of the conductor (A) while at lower frequencies (in the 5 to 10 Hz regions for a 20 min diameter SH) the electrical alternating current will penetrate more the centre of the shafts cross section (E). Also, the relative current density is higher in the current occupied regions at higher AC frequencies in comparison to the relative current density near the centre of the shaft at very low AC frequencies (as there is more space available for the current to flow through).

Figure 22:
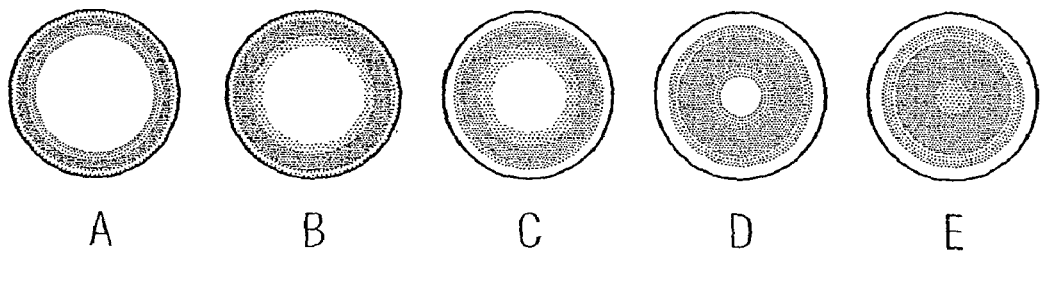

Referring to FIG. 22, the electrical current density of an electrical conductor (cross-section 90 deg to the current flow) when passing through the conductor an alternating current at different frequencies is illustrated.

The desired magnetic field design of the PCME sensor technology are two circular magnetic field structures, stored in two layers on top of each other ("Picky-Back"), and running in opposite direction to each other (Counter-Circular).

Again referring to FIG. 13, a desired magnetic sensor structure is shown: two endless magnetic loops placed on top of each other, running in opposite directions to each other: Counter-Circular "Picky-Back" Field Design.

To make this magnetic field design highly sensitive to mechanical stresses that will be applied to the SH (shaft), and to generate the largest sensor signal possible, the desired magnetic field structure has to be placed nearest to the shaft surface. Placing the circular magnetic fields to close to the centre of the SH will cause damping of the user available sensor-output-signal slope (most of the sensor signal will travel through the Ferro-magnetic shaft material as it has a much higher permeability in comparison to air), and increases the non-uniformity of the sensor signal (in relation to shaft rotation and to axial movements of the shaft in relation to the secondary sensor.

Figure 23:
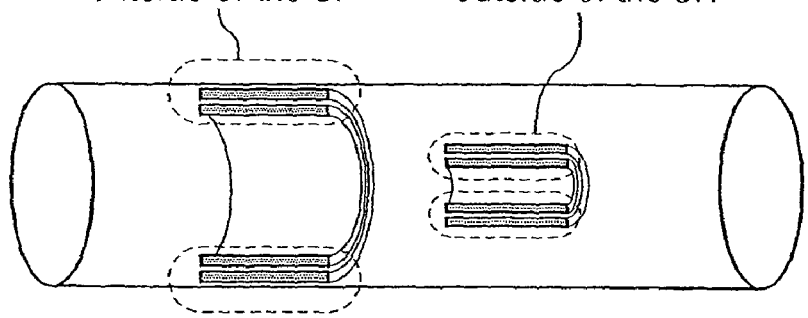
FIG. 23 is another schematic diagram for explaining a principle of an exemplary embodiment of the present invention.

Referring to FIG. 23, magnetic field structures stored near the shaft surface and stored near the centre of the shaft are illustrated.

It may be difficult to achieve the desired permanent magnetic encoding of the SH when using AC (alternating current) as the polarity of the created magnetic field is constantly changing and therefore may act more as a Degaussing system.

The PCME technology requires that a strong electrical current ("uni-polar" or DC, to prevent erasing of the desired magnetic field structure) is travelling right below the shaft surface (to ensure that the sensor signal will be uniform and measurable at the outside of the shaft). In addition a Counter-Circular, "picky back" magnetic field structure needs to be formed.

It is possible to place the two Counter-Circular magnetic field structures in the shaft by storing them into the shaft one after each other. First the inner layer will be stored in the SH, and then the outer layer by using a weaker magnetic force (preventing that the inner layer will be neutralized and deleted by accident. To achieve this, the known "permanent" magnet encoding techniques can be applied as described in patents from FAST technology, or by using a combination of electrical current encoding and the "permanent" magnet encoding.

A much simpler and faster encoding process uses "only" electric current to achieve the desired Counter-Circular "Picky-Back" magnetic field structure. The most challenging part here is to generate the Counter-Circular magnetic field.

A uniform electrical current will produce a uniform magnetic field, running around the electrical conductor in a 90 deg angle, in relation to the current direction (A). When placing two conductors side-by-side (B) then the magnetic field between the two conductors seems to cancel-out the effect of each other (C). Although still present, there is no detectable (or measurable) magnetic field between the closely placed two conductors. When placing a number of electrical conductors side-by-side (D) the "measurable" magnetic field seems to go around the outside the surface of the "flat" shaped conductor.

Figure 24:
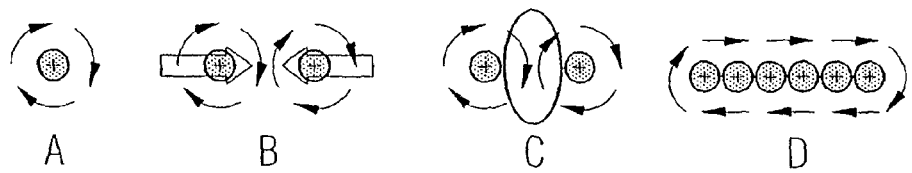
FIGS. 24, 25 and 26 are schematic diagrams for further explaining a principle of an exemplary embodiment of the present invention.

Referring to FIG. 24, the magnetic effects when looking at the cross-section of a conductor with a uniform current flowing through them are shown.

The "flat" or rectangle shaped conductor has now been bent into a "U"-shape. When passing an electrical current through the "U"-shaped conductor then the magnetic field following the outer dimensions of the "U"-shape is cancelling out the measurable effects in the inner halve of the "U".

Figure 25:
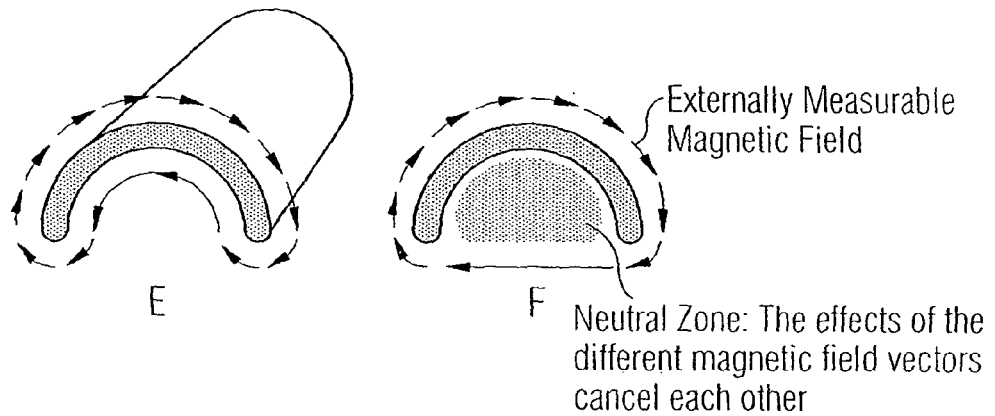

Referring to FIG. 25, the zone inside the "U"-shaped conductor seem to be magnetically "Neutral" when an electrical current is flowing through the conductor.

When no mechanical stress is applied to the cross-section of a "U"-shaped conductor it seems that there is no magnetic field present inside of the "U" (F). But when bending or twisting the "U"-shaped conductor the magnetic field will no longer follow its original path (90 deg angle to the current flow). Depending on the applied mechanical forces, the magnetic field begins to change slightly its path. At that time the magnetic-field-vector that is caused by the mechanical stress can be sensed and measured at the surface of the conductor, inside and outside of the "U"-shape. Note: This phenomena is applies only at very specific electrical current levels.

The same applies to the "O"-shaped conductor design. When passing a uniform electrical current through an "O"-shaped conductor (Tube) the measurable magnetic effects inside of the "O" (Tube) have cancelled-out each other (G).

Figure 26:
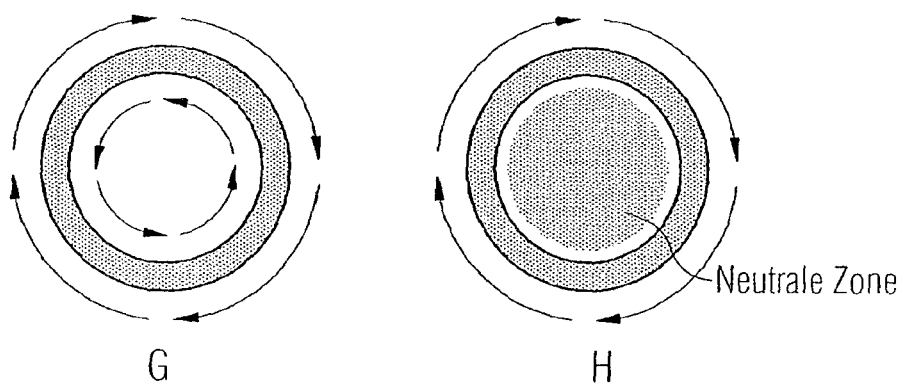

Referring to FIG. 26, the zone inside the "O"-shaped conductor seem to be magnetically "Neutral" when an electrical current is flowing through the conductor.

However, when mechanical stresses are applied to the "O"-shaped conductor (Tube) it becomes evident that there has been a magnetic field present at the inner side of the "O"-shaped conductor. The inner, counter directional magnetic field (as well as the outer magnetic field) begins to tilt in relation to the applied torque stresses. This tilting field can be clearly sensed and measured.

In the following, an Encoding Pulse Design will be described.

To achieve the desired magnetic field structure (Counter-Circular, Picky-Back, Fields Design) inside the SH, according to an exemplary embodiment of a method of the present invention, unipolar electrical current pulses are passed through the Shaft (or SH). By using "pulses" the desired "Skin-Effect" can be achieved. By using a "unipolar" current direction (not changing the direction of the electrical current) the generated magnetic effect will not be erased accidentally.

The used current pulse shape is most critical to achieve the desired PCME sensor design. Each parameter has to be accurately and repeatable controlled: Current raising time, Constant current on-time, Maximal current amplitude, and Current falling time. In addition it is very critical that the current enters and exits very uniformly around the entire shaft surface.

In the following, a Rectangle Current Pulse Shape will be described.

Figure 27:
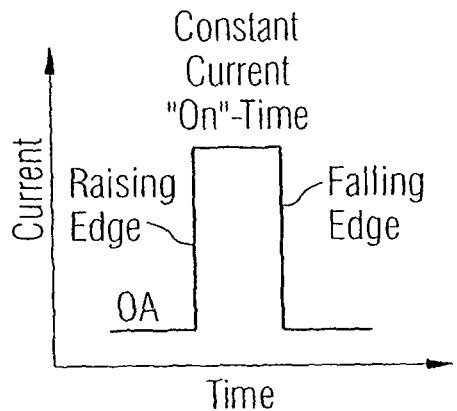
FIG. 27 is a current versus time diagram for illustrating a current pulse which may be applied to a sensor element according to a manufacturing method according to an exemplary embodiment of the present invention.

Referring to FIG. 27, a rectangle shaped electrical current pulse is illustrated.

A rectangle shaped current pulse has a fast raising positive edge and a fast falling current edge. When passing a rectangle shaped current pulse through the SH, the raising edge is responsible for forming the targeted magnetic structure of the PCME sensor while the flat "on" time and the falling edge of the rectangle shaped current pulse are counter productive.

Figure 28:
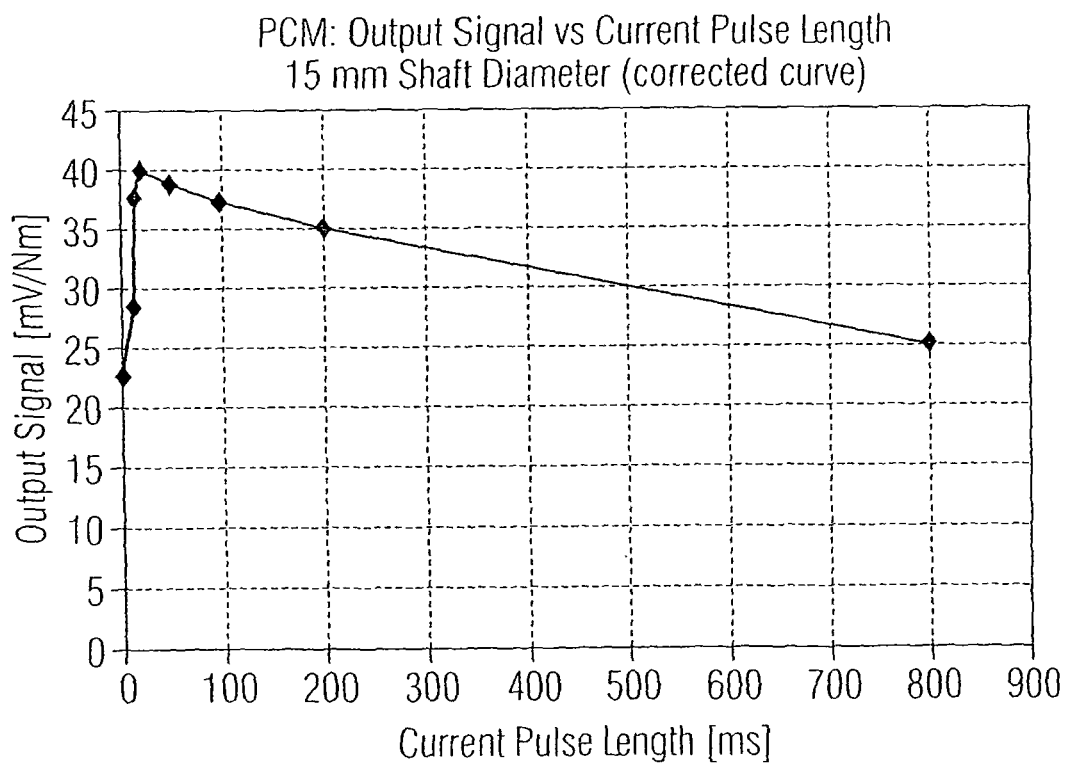
FIG. 28 shows an output signal versus current pulse length diagram according to an exemplary embodiment of the present invention.

Referring to FIG. 28, a relationship between rectangles shaped Current Encoding Pulse-Width (Constant Current On-Time) and Sensor Output Signal Slope is shown.

In the following example a rectangle shaped current pulse has been used to generate and store the Couter-Circilar "Picky-Back" field in a 15 mm diameter, 14CrNi14 shaft. The pulsed electric current had its maximum at around 270 Ampere. The pulse "on-time" has been electronically controlled. Because of the high frequency component in the rising and falling edge of the encoding pulse, this experiment can not truly represent the effects of a true DC encoding SH. Therefore the Sensor-Output-Signal Slope-curve eventually flattens-out at above 20 mV/Nm when passing the Constant-Current On-Time of 1000 ms.

Without using a fast raising current-pulse edge (like using a controlled ramping slope) the sensor output signal slope would have been very poor (below 10 mV/Nm). Note: In this experiment (using 14CrNi14) the signal hysteresis was around 0.95% of the FS signal (FS=75 Nm torque).

Figure 29:
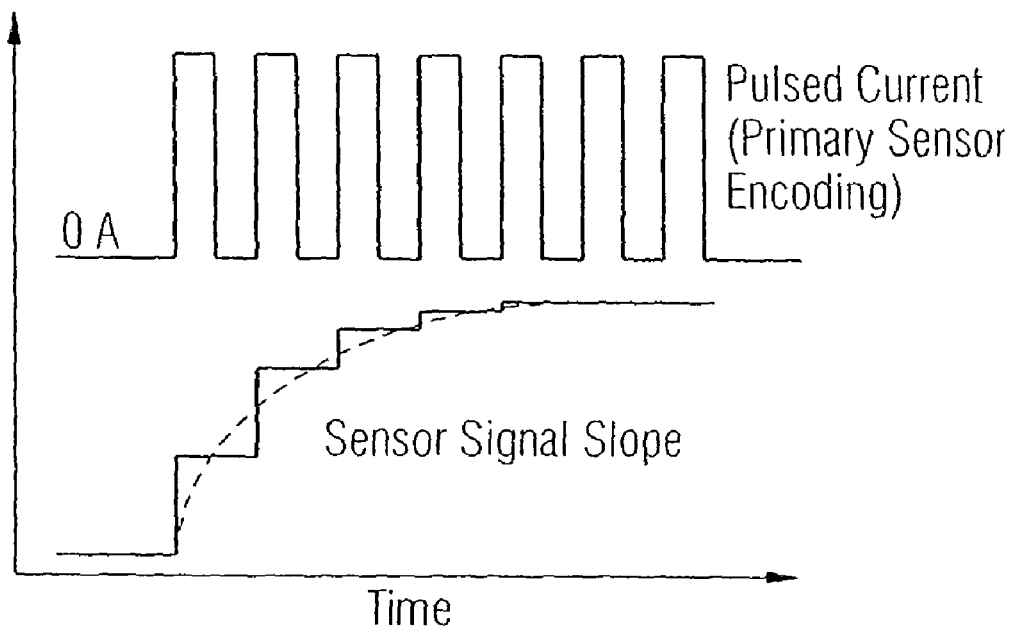
FIG. 29 shows a current versus time diagram with current pulses according to an exemplary embodiment of the present invention which may be applied to sensor elements according to a method of the present invention.

Referring to FIG. 29, increasing the Sensor-Output Signal-Slope by using several rectangle shaped current pulses in succession is shown.

The Sensor-Output-Signal slope can be improved when using several rectangle shaped current-encoding-pulses in successions. In comparisons to other encoding-pulse-shapes the fast falling current-pulse signal slope of the rectangle shaped current pulse will prevent that the Sensor-Output-Signal slope may ever reach an optimal performance level. Meaning that after only a few current pulses (2 to 10) have been applied to the SH (or Shaft) the Sensor-Output Signal-Slope will no longer rise.

In the following, a Discharge Current Pulse Shape is described.

The Discharge-Current-Pulse has no Constant-Current ON-Time and has no fast falling edge. Therefore the primary and most felt effect in the magnetic encoding of the SH is the fast raising edge of this current pulse type.

Figure 30:
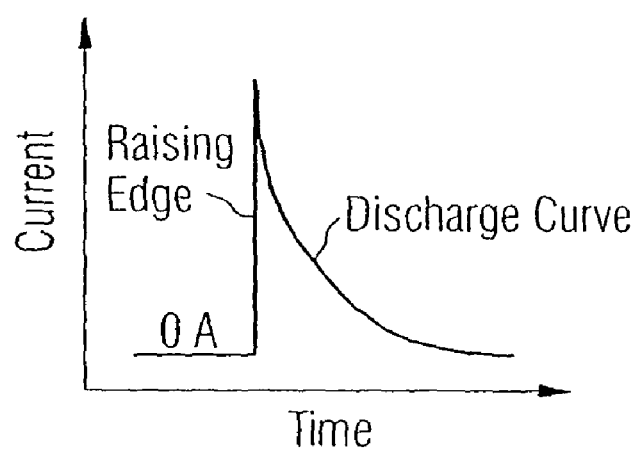
FIG. 30 shows another current versus time diagram showing an exemplary embodiment of a current pulse applied to a sensor element such as a shaft according to a method of an exemplary embodiment of the present invention.

As shown in FIG. 30, a sharp raising current edge and a typical discharging curve provides best results when creating a PCMB sensor.

Figure 31:
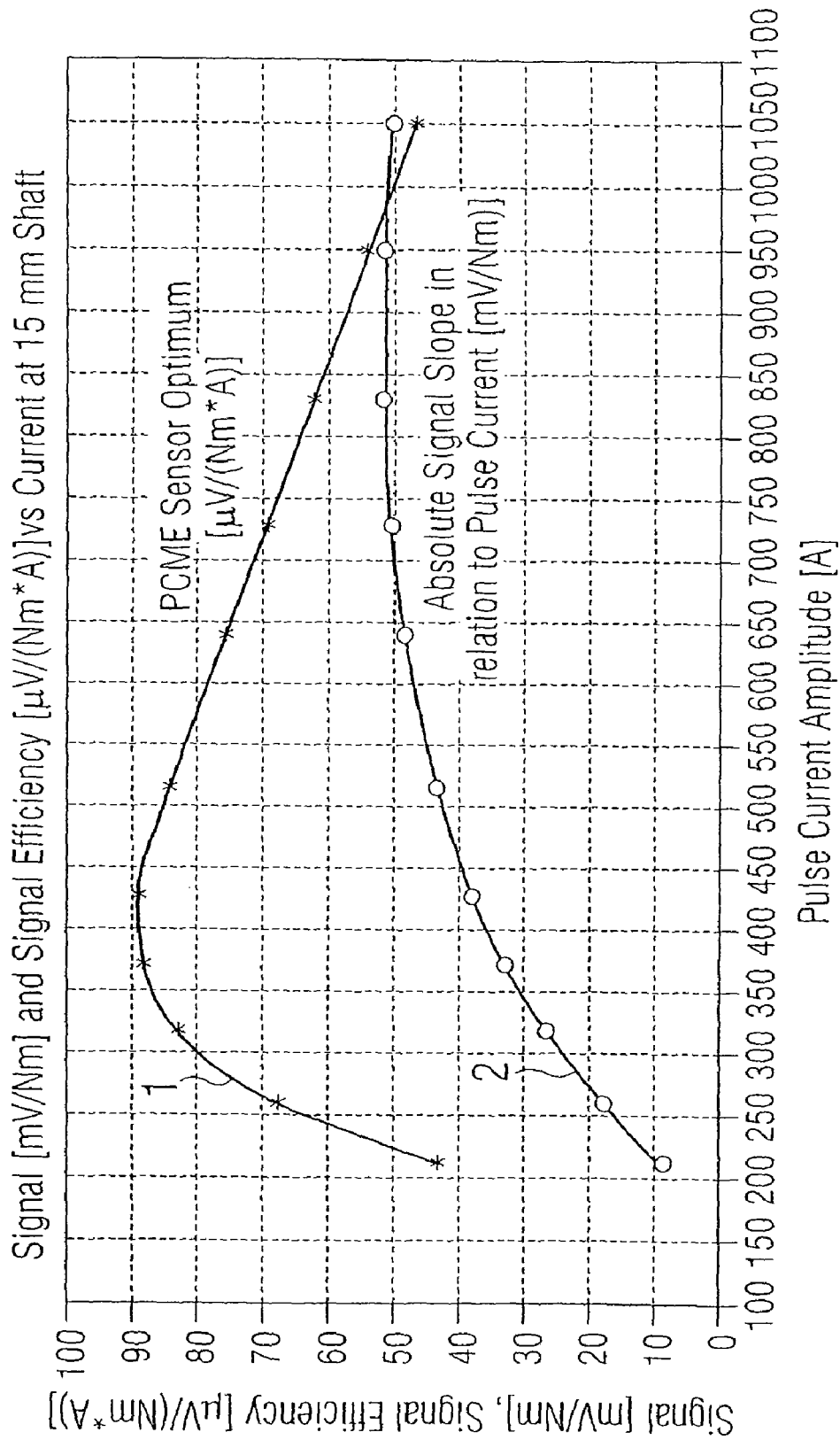
FIG. 31 shows a signal and signal efficiency versus current diagram in accordance with an exemplary embodiment of the present invention.

Referring to FIG. 31, a PCME Sensor-Output Signal-Slope optimization by identifying the right pulse current is illustrated.

At the very low end of the pulse current scale (0 to 75 A for a 15 mm diameter shaft, 14CrNi14 shaft material) the "Discharge-Current-Pulse type is not powerful enough to cross the magnetic threshold needed to create a lasting magnetic field inside the Ferro magnetic shaft. When increasing the pulse current amplitude the double circular magnetic field structure begins to form below the shaft surface. As the pulse current amplitude increases so does the achievable torque sensor-output signal-amplitude of the secondary sensor system. At around 400 A to 425 A the optimal PCME sensor design has been achieved (the two counter flowing magnetic regions have reached their most optimal distance to each other and the correct flux density for best sensor performances.

Figure 32:
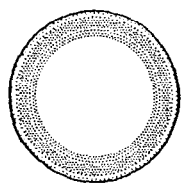
FIG. 32 is a cross-sectional view of a sensor element having a PCME electrical current density according to an exemplary embodiment of the present invention.

Referring to FIG. 32, Sensor Host (SH) cross section with the optimal PCME electrical current density and location during the encoding pulse is illustrated.

When increasing further the pulse current amplitude the absolute, torque force related, sensor signal amplitude will further increase (curve 2) for some time while the overall PCME-typical sensor performances will decrease (curve 1). When passing 900 A Pulse Current Amplitude (for a 15 mm diameter shaft) the absolute, torque force related, sensor signal amplitude will begin to drop as well (curve 2) while the PCME sensor performances are now very poor (curve 1).

Figure 33:
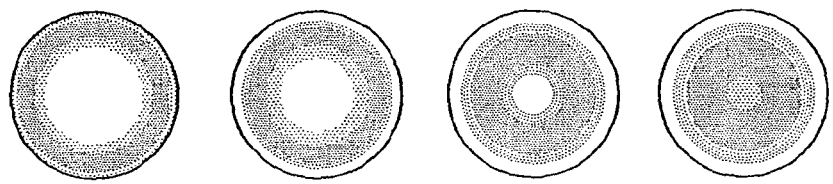
FIG. 33 shows a cross-sectional view of a sensor element and an electrical pulse current density at different and increasing pulse current levels according to an exemplary embodiment of the present invention.

Referring to FIG. 33, Sensor Host (SH) cross sections and the electrical pulse current density at different and increasing pulse current levels is shown.

As the electrical current occupies a larger cross section in the SH the spacing between the inner circular region and the outer (near the shaft surface) circular region becomes larger.

Figure 34:
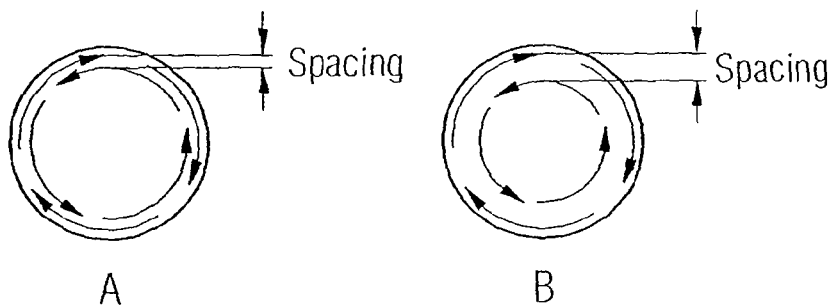
FIGS. 34a and 34b show a spacing achieved with different current pulses of magnetic flows in sensor elements according to the present invention.

Referring to FIG. 34, better PCME sensor performances will be achieved when the spacing between the Counter-Circular "Picky-Back" Field design is narrow (A).

The desired double, counter flow, circular magnetic field structure will be less able to create a close loop structure under torque forces which results in a decreasing secondary sensor signal amplitude.

Figure 35:
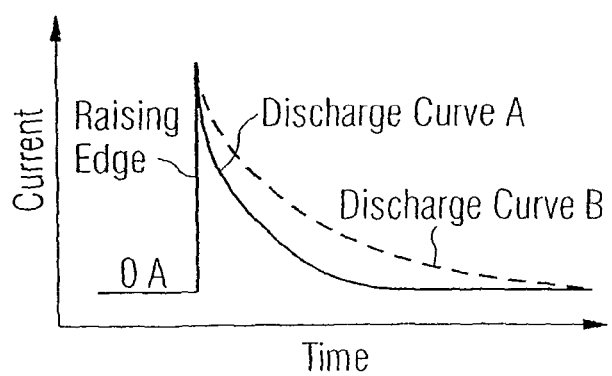
FIG. 35 shows a current versus time diagram of a current pulse as it may be applied to a sensor element according to an exemplary embodiment of the present invention.

Referring to FIG. 35, flattening-out the current-discharge curve will also increase the Sensor-Output Signal-Slope.

When increasing the Current-Pulse discharge time (making the current pulse wider) (B) the Sensor-Output Signal-Slope will increase. However the required amount of current is very high to reduce the slope of the falling edge of the current pulse. It might be more practical to use a combination of a high current amplitude (with the optimal value) and the slowest possible discharge time to achieve the highest possible Sensor-Output Signal Slope.

In the following, Electrical Connection Devices in the frame of Primary Sensor Processing will be described.

The PCME technology (it has to be noted that the term 'PCME' technology is used to refer to exemplary embodiments of the present invention) relies on passing through the shaft very high amounts of pulse-modulated electrical current at the location where the Primary Sensor should be produced. When the surface of the shaft is very clean and highly conductive a multi-point Cupper or Gold connection may be sufficient to achieve the desired sensor signal uniformity. Important is that the Impedance is identical of each connection point to the shaft surface. This can be best achieved when assuring the cable length (L) is identical before it joins the main current connection point (I).

Figure 36:
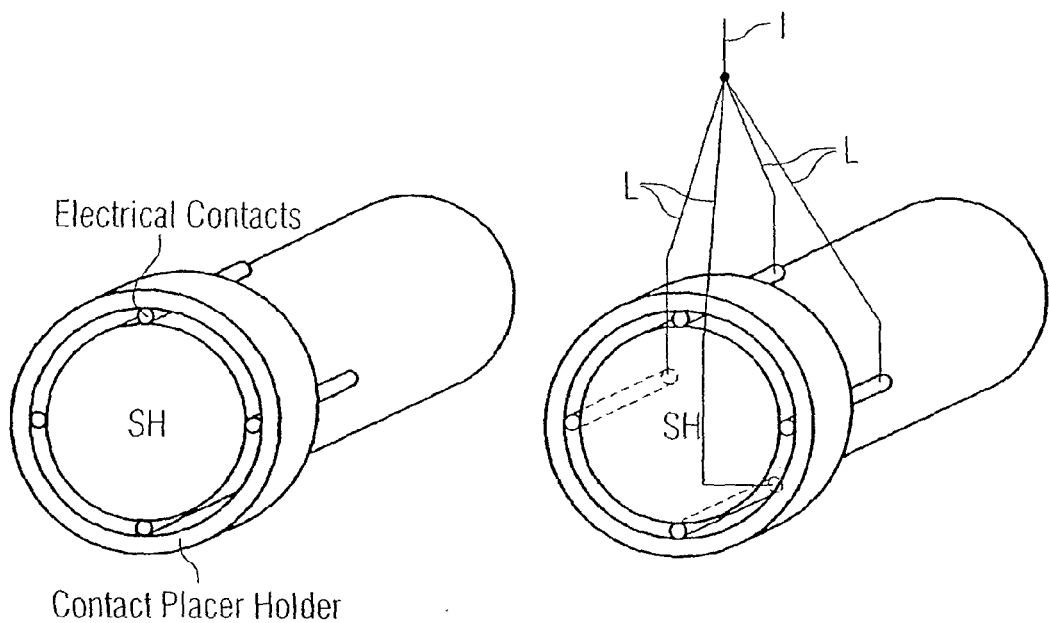
FIG. 36 shows an electrical multi-point connection to a sensor element according to an exemplary embodiment of the present invention.

Referring to FIG. 36, a simple electrical multi-point connection to the shaft surface is illustrated.

However, in most cases a reliable and repeatable multi-point electrical connection can be only achieved by ensuring that the impedance at each connection point is identical and constant. Using a spring pushed, sharpened connector will penetrate possible oxidation or isolation layers (maybe caused by finger prints) at the shaft surface.

Figure 37:
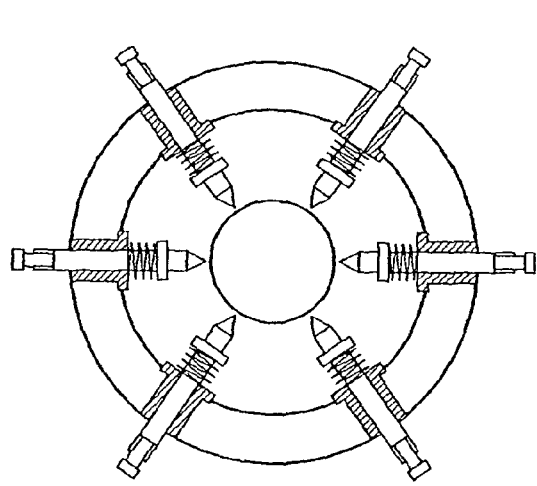
FIG. 37 shows a multi-channel electrical connection fixture with spring loaded contact points to apply a current pulse to the sensor element according to an exemplary embodiment of the present invention.

Referring to FIG. 37, a multi channel, electrical connecting fixture, with spring loaded contact points is illustrated.

When processing the shaft it is most important that the electrical current is injected and extracted from the shaft in the most uniform way possible. The above drawing shows several electrical, from each other insulated, connectors that are held by a fixture around the shaft. This device is called a Shaft-Processing-Holding-Clamp (or SPHC). The number of electrical connectors required in a SPHC depends on the shafts outer diameter. The larger the outer diameter, the more connectors are required. The spacing between the electrical conductors has to be identical from one connecting point to the next connecting point. This method is called Symmetrical-"Spot"-Contacts.

Figure 38:
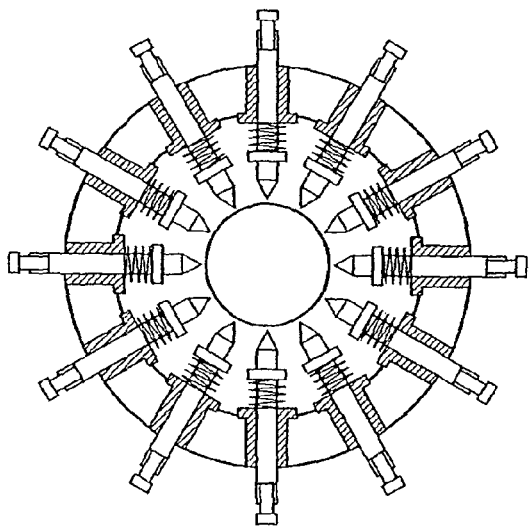
FIG. 38 shows an electrode system with an increased number of electrical connection points according to an exemplary embodiment of the present invention.

Referring to FIG. 38, it is illustrated that increasing the number of electrical connection points will assist the efforts of entering and exiting the Pulse-Modulated electrical current. It will also increase the complexity of the required electronic control system.

Figure 39:
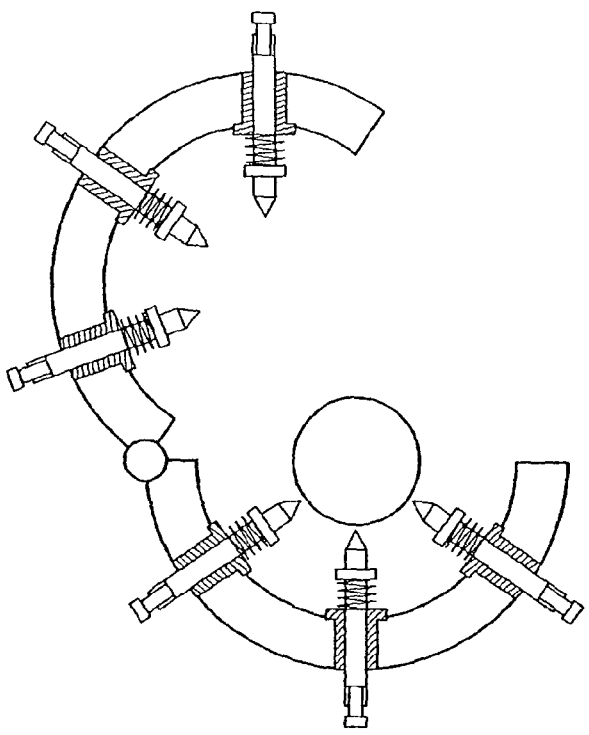
FIG. 39 shows an exemplary embodiment of the electrode system of FIG. 37.

Referring to FIG. 39, an example of how to open the SPHC for easy shall loading is shown.

In the following, an encoding scheme in the frame of Primary Sensor Processing will be described.

The encoding of the primary shaft can be done by using permanent magnets applied at a rotating shaft or using electric currents passing through the desired section of the shaft. When using permanent magnets a very complex, sequential procedure is necessary to put the two layers of closed loop magnetic fields, on top of each other, in the shaft. When using the PCME procedure the electric current has to enter the shaft and exit the shaft in the most symmetrical way possible to achieve the desired performances.

Figure 40:
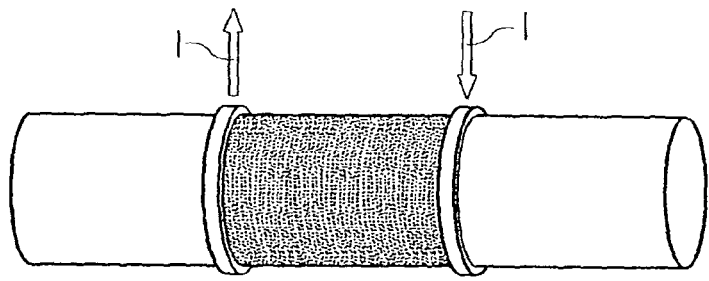
FIG. 40 shows shaft processing holding clamps used for a method according to an exemplary embodiment of the present invention.

Referring to FIG. 40, two SPHCs (Shaft Processing Holding Clamps) are placed at the borders of the planned sensing encoding region. Through one SPHC the pulsed electrical current (I) will enter the shaft, while at the second SPHC the pulsed electrical current (I) will exit the shaft. The region between the two SPI-ICs will then turn into the primary sensor.

This particular sensor process will produce a Single Field (SF) encoded region. One benefit of this design (in comparison to those that are described below) is that this design is insensitive to any axial shaft movements in relation to the location of the secondary sensor devices. The disadvantage of this design is that when using axial (or in-line) placed MFS coils the system will be sensitive to magnetic stray fields (like the earth magnetic field).

Figure 41:
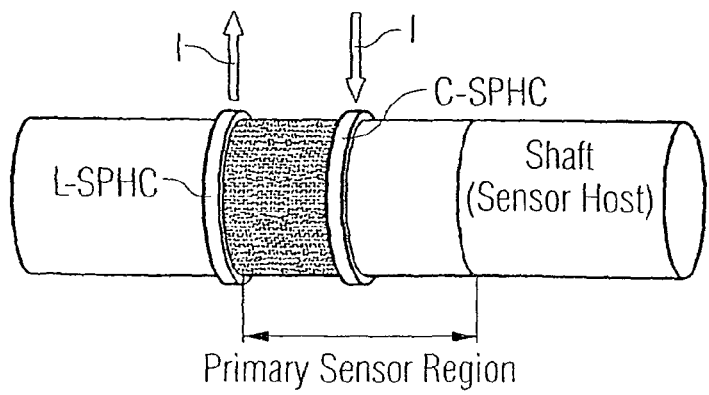
FIG. 41 shows a dual field encoding region of a sensor element according to the present invention.

Referring to FIG. 41, a Dual Field (DF) encoded region (meaning two independent functioning sensor regions with opposite polarity, side-by-side) allows cancelling the effects of uniform magnetic stray fields when using axial (or in-line) placed MFS coils. However, this primary sensor design also shortens the tolerable range of shaft movement in axial direction (in relation to the location of the MFS coils). There are two ways to produce a Dual Field (DF) encoded region with the PCME technology. The sequential process, where the magnetic encoded sections are produced one after each other, and the parallel process, where both magnetic encoded sections are produced at the same time.

The first process step of the sequential dual field design is to magnetically encode one sensor section (identically to the Single Field procedure), whereby the spacing between the two SPHC has to be halve of the desired final length of the Primary Sensor region. To simplify the explanations of this process we call the SPHC that is placed in the centre of the final Primary Sensor Region the Centre SPHC (C-SPHC), and the SPEW that is located at the left side of the Centre SPHC: L-SPHC.

Figure 42:
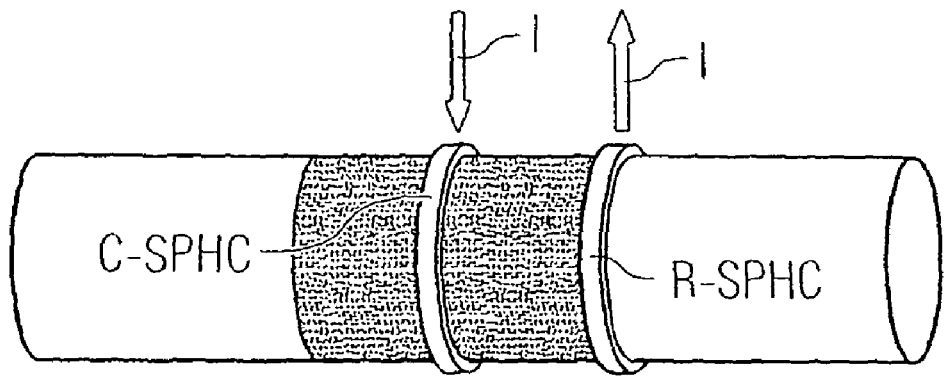
FIG. 42 shows a process step of a sequential dual field encoding according to an exemplary embodiment of the present invention.

Referring to FIG. 42, the second process step of the sequential Dual Field encoding will use the SPHC that is located in the centre of the Primary Sensor region (called C-SPHC) and a second SPHC that is placed at the other side (the right side) of the centre SPHC, called R-SPHC. Important is that the current flow direction in the centre SPHC (C-SPHC) is identical at both process steps.

Figure 43:
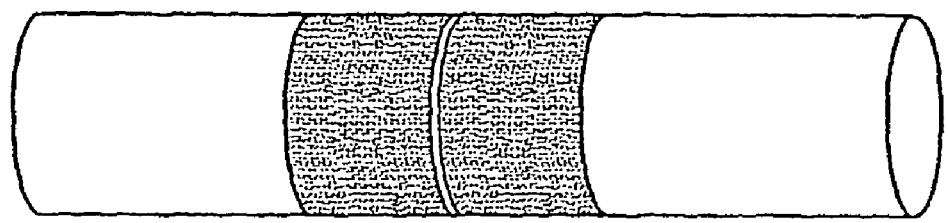
FIG. 43 shows another process step of the dual field encoding according to another exemplary embodiment of the present invention.

Referring to FIG. 43, the performance of the final Primary Sensor Region depends on how close the two encoded regions can be placed in relation to each other. And this is dependent on the design of the used centre SPHC. The narrower the in-line space contact dimensions are of the C-SPIIC, the better are the performances of the Dual Field PCME sensor.

Figure 44:
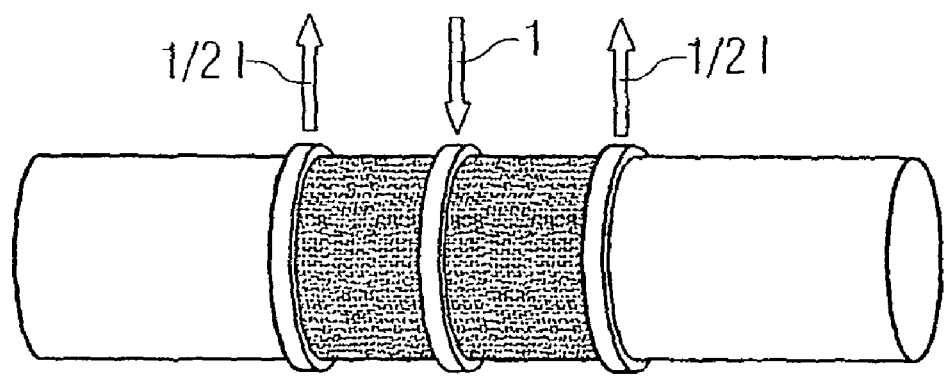
FIG. 44 shows another exemplary embodiment of a sensor element with an illustration of a current pulse application according to another exemplary embodiment of the present invention.

FIG. 44 shows the pulse application according to another exemplary embodiment of the present invention. As my be taken from the above drawing, the pulse is applied to three locations of the shaft. Due to the current distribution to both sides of the middle electrode where the current I is entered into the shaft, the current leaving the shaft at the lateral electrodes is only hal the current entered at the middle electrode, namely ½ I. The electrodes are depicted as rings which dimensions are adapted to the dimensions of the outer surface of the shaft. However, it has to be noted that other electrodes may be used, such as the electrodes comprising a plurality of pin electrodes described later in this text.

Figure 45:
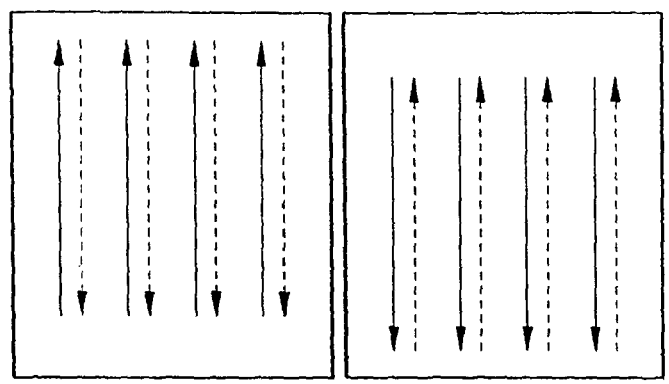
FIG. 45 shows schematic diagrams for describing magnetic flux directions in sensor elements according to the present invention when no stress is applied.

Referring to FIG. 45, magnetic flux directions of the two sensor sections of a Dual Field PCME sensor design are shown when no torque or linear motion stress is applied to the shaft. The counter flow magnetic flux loops do not interact with each other.

Figure 46:
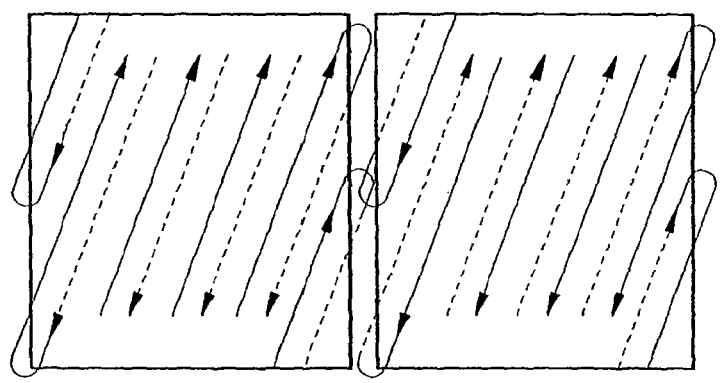
FIG. 46 shows magnetic flux directions of the sensor element of FIG. 45 when a force is applied.

Referring to FIG. 46, when torque forces or linear stress forces are applied in a particular direction then the magnetic flux loops begin to run with an increasing tilting angle inside the shaft. When the tilted magnetic flux reaches the PCME segment boundary then the flux line interacts with the counterflowing magnetic flux lines, as shown.

Figure 47:
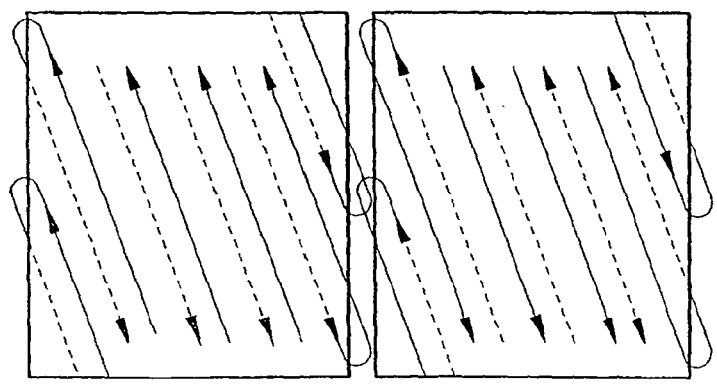
FIG. 47 shows the magnetic flux inside the PCM encoded shaft of FIG. 45 when the applied torque direction is changing.

Referring to FIG. 47, when the applied torque direction is changing (for example from clock-wise to counter-clockwise) so will change the tilting angle of the counterflow magnetic flux structures inside the PCM Encoded shaft.

In the following, a Multi Channel Current Driver for Shaft Processing will be described.

In cases where an absolute identical impedance of the current path to the shaft surface can not be guaranteed, then electric current controlled driver stages can be used to overcome this problem.

Figure 48:
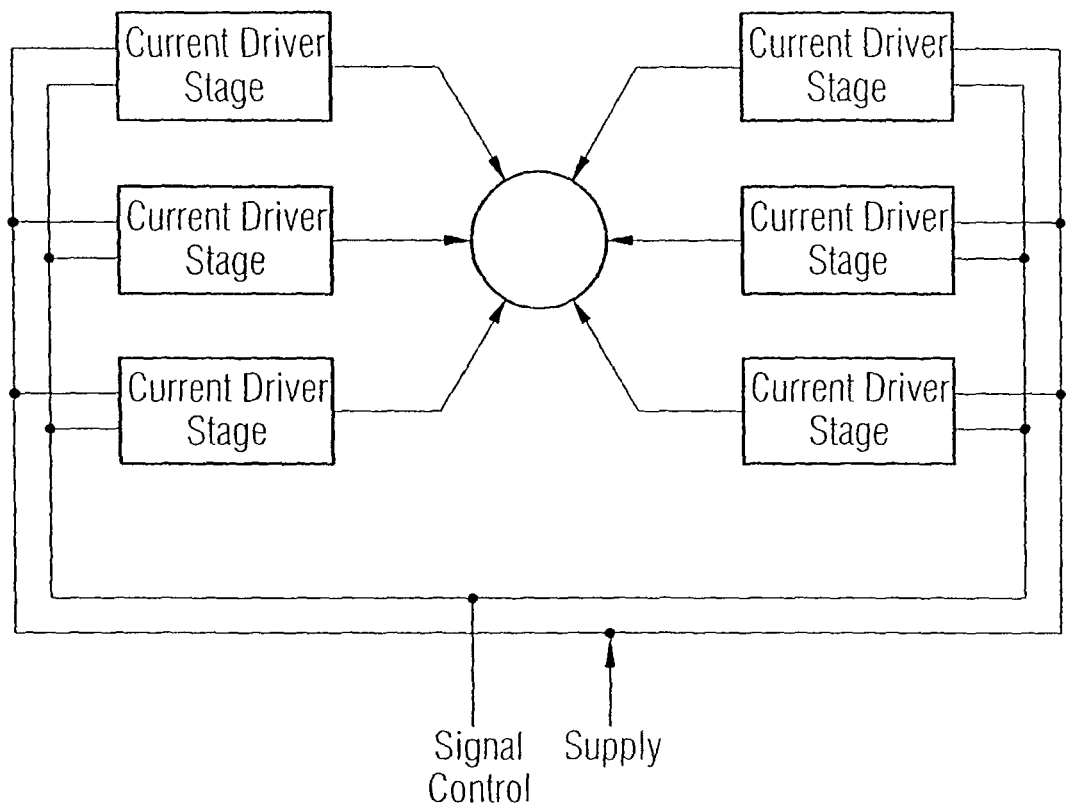
FIG. 48 shows a 6-channel synchronized pulse current driver system according to an exemplary embodiment of the present invention.

Referring to FIG. 48, a six-channel synchronized Pulse current driver system for small diameter Sensor Hosts (SH) is shown. As the shaft diameter increases so will the number of current driver channels.

In the following, Bras Ring Contacts and Symmetrical "Spot" Contacts will be described.

When the shaft diameter is relative small and the shaft surface is clean and free from any oxidations at the desired Sensing Region, then a simple "Bras"-ring (or Copper-ring) contact method can be chosen to process the Primary Sensor.

Figure 49:
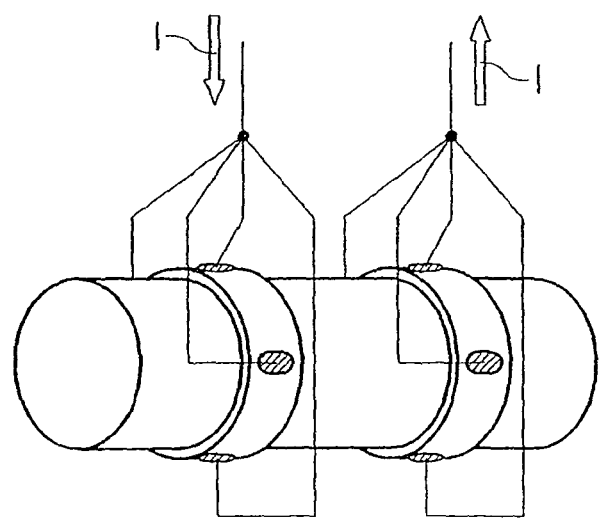
FIG. 49 shows a simplified representation of an electrode system according to another exemplary embodiment of the present invention.

Referring to FIG. 49, bras-rings (or Copper-rings) tightly fitted to the shaft surface may be used, with solder connections for the electrical wires. The area between the two Brasrings (Copper-rings) is the encoded region.

However, it is very likely that the achievable RSU performances are much lower then when using the Symmetrical "Spot" Contact method.

In the following, a Hot-Spotting concept will be described.

A standard single field (SF) PCME sensor has very poor Hot-Spotting performances. The external magnetic flux profile of the SF PCME sensor segment (when torque is applied) is very sensitive to possible changes (in relation to Ferro magnetic material) in the nearby environment. As the magnetic boundaries of the SF encoded sensor segment are not well defined (not "Pinned Down") they can "extend" towards the direction where Ferro magnet material is placed near the PCME sensing region.

Figure 50:
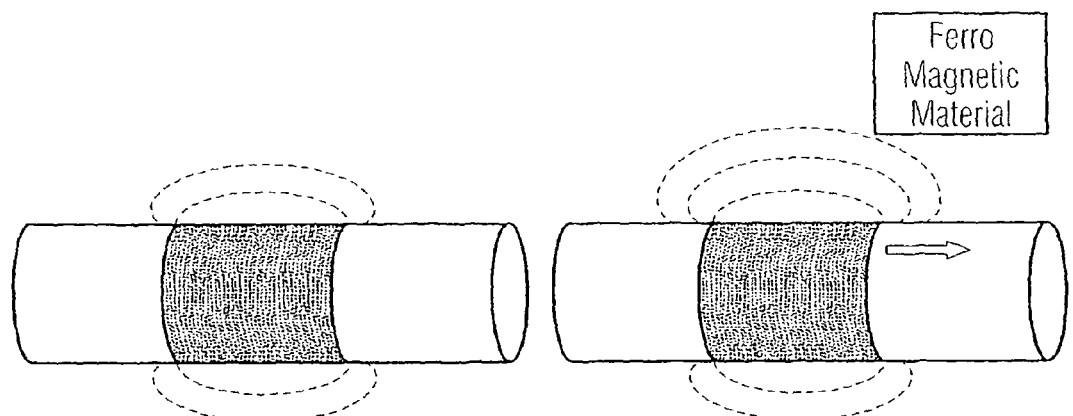
FIG. 50 is a representation of a sensor element according to an exemplary embodiment of the present invention.

Referring to FIG. 50, a PCME process magnetized sensing region is very sensitive to Ferro magnetic materials that may come close to the boundaries of the sensing regions.

To reduce the Hot-Spotting sensor sensitivity the PCME sensor segment boundaries have to be better defined by pinning them down (they can no longer move).

Figure 51:
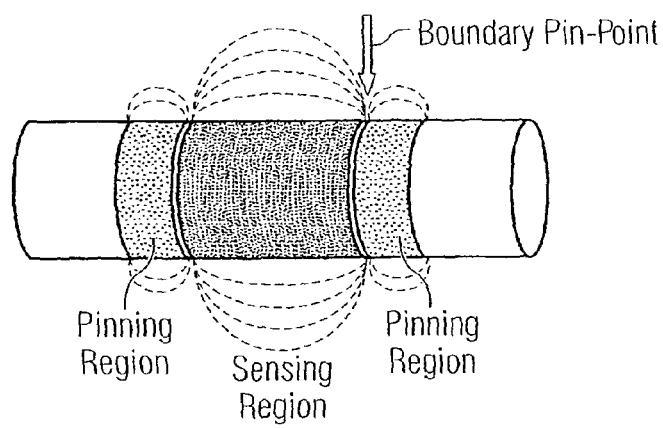
FIG. 51 is another exemplary embodiment of a sensor element according to the present invention having a PCME process sensing region with two pinning field regions.

Referring to FIG. 51, a PCME processed Sensing region with two "Pinning Field Regions" is shown, one on each side of the Sensing Region.

By placing Pinning Regions closely on either side the Sensing Region, the Sensing Region Boundary has been pinned down to a very specific location. When Ferro magnetic material is coming close to the Sensing Region, it may have an effect on the outer boundaries of the Pinning Regions, but it will have very limited effects on the Sensing Region Boundaries.

There are a number of different ways, according to exemplary embodiments of the present invention how the SH (Sensor Host) can be processed to get a Single Field (SF) Sensing Region and two Pinning Regions, one on each side of the Sensing Region. Either each region is processed after each other (Sequential Processing) or two or three regions are processed simultaneously (Parallel Processing). The Parallel Processing provides a more uniform sensor (reduced parasitic fields) but requires much higher levels of electrical current to get to the targeted sensor signal slope.

Figure 52:
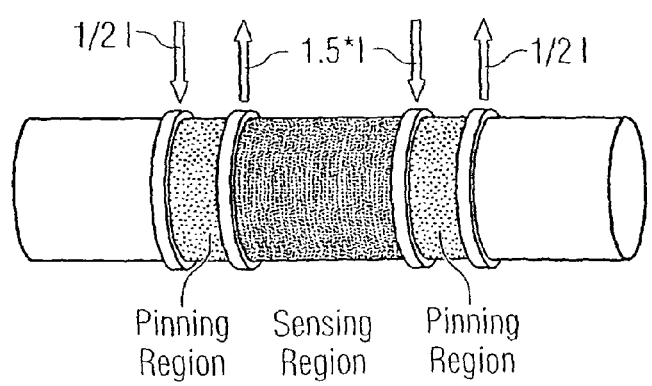
FIG. 52 is a schematic representation for explaining a manufacturing method according to an exemplary embodiment of the present invention for manufacturing a sensor element with an encoded region and pinning regions.

Referring to FIG. 52, a parallel processing example for a Single Field (SF) PCME sensor with Pinning Regions on either side of the main sensing region is illustrated, in order to reduce (or even eliminate) Hot-Spotting.

A Dual Field PCME Sensor is less sensitive to the effects of Hot-Spotting as the sensor centre region is already Pinned-Down. However, the remaining Hot-Spotting sensitivity can be further reduced by placing Pinning Regions on either side of the Dual-Field Sensor Region.

Figure 53:
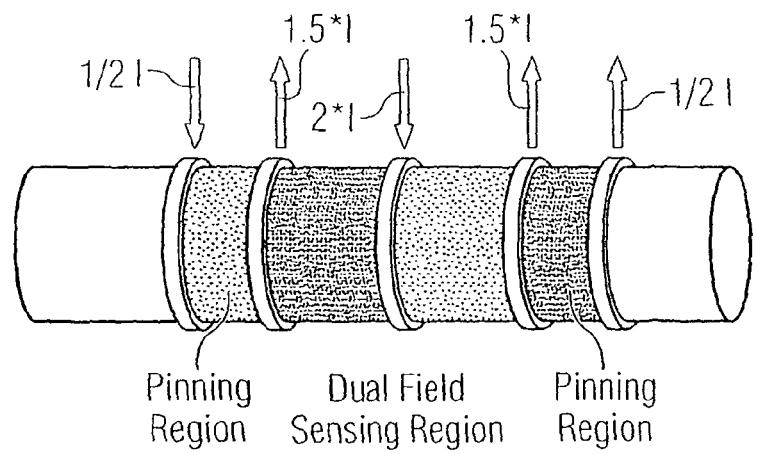
FIG. 53 is another schematic representation of a sensor element according to an exemplary embodiment of the present invention manufactured in accordance with a manufacturing method according to an exemplary embodiment of the present invention.

Referring to FIG. 53, a Dual Field (DF) PCME sensor with Pinning Regions either side is shown.

When Pinning Regions are not allowed or possible (example: limited axial spacing available) then the Sensing Region has to be magnetically shielded from the influences of external Ferro Magnetic Materials.

In the following, the Rotational Signal Uniformity (RSU) will be explained.

The RSU sensor performance are, according to current understanding, mainly depending on how circumferentially uniform the electrical current entered and exited the SH surface, and the physical space between the electrical current entry and exit points. The larger the spacing between the current entry and exit points, the better is the RSU performance.

Figure 54:
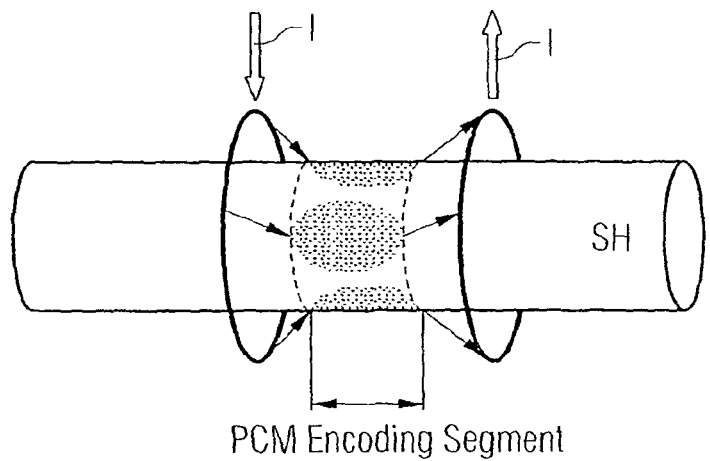
FIG. 54 is a simplified schematic representation for further explaining an exemplary embodiment of the present invention.

Referring to FIG. 54, when the spacings between the individual circumferential placed current entry points are relatively large in relation to the shaft diameter (and equally large are the spacings between the circumferentially placed current exit points) then this will result in very poor RSU performances. In such a case the length of the PCM Encoding Segment has to be as large as possible as otherwise the created magnetic field will be circumferentially non-uniform.

Figure 55:
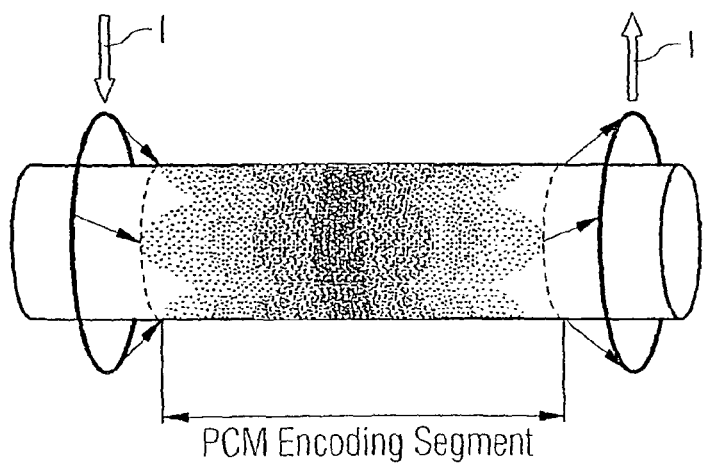
FIG. 55 is another simplified schematic representation for further explaining an exemplary embodiment of the present invention.

Referring to FIG. 55, by widening the PCM Encoding Segment the circumferentially magnetic held distribution will become more uniform (and eventually almost perfect) at the halve distance between the current entry and current exit points. Therefore the RSU performance of the PCME sensor is best at the halve way-point between of the current-entry/current-exit points.

Next, the basic design issues of a NCT sensor system will be described.

Without going into the specific details of the PCM-Encoding technology, the end-user of this sensing technology need to now some design details that will allow him to apply and to use this sensing concept in his application. The following pages describe the basic elements of a magnetostriction based NCT sensor (like the primary sensor, secondary sensor, and the SCSP electronics), what the individual components look like, and what choices need to be made when integrating this technology into an already existing product.

In principle the PCME sensing technology can be used to produce a stand-alone sensor product. However, in already existing industrial applications there is little to none space available for a "stand-alone" product. The PCME technology can be applied in an existing product without the need of redesigning the final product.

In ease a stand-alone torque sensor device or position detecting sensor device will be applied to a motor-transmission system it may require that the entire system need to undergo a major design change.

In the following, referring to FIG. 56, a possible location of a PCME sensor at the shaft of an engine is illustrated.

Figure 56:
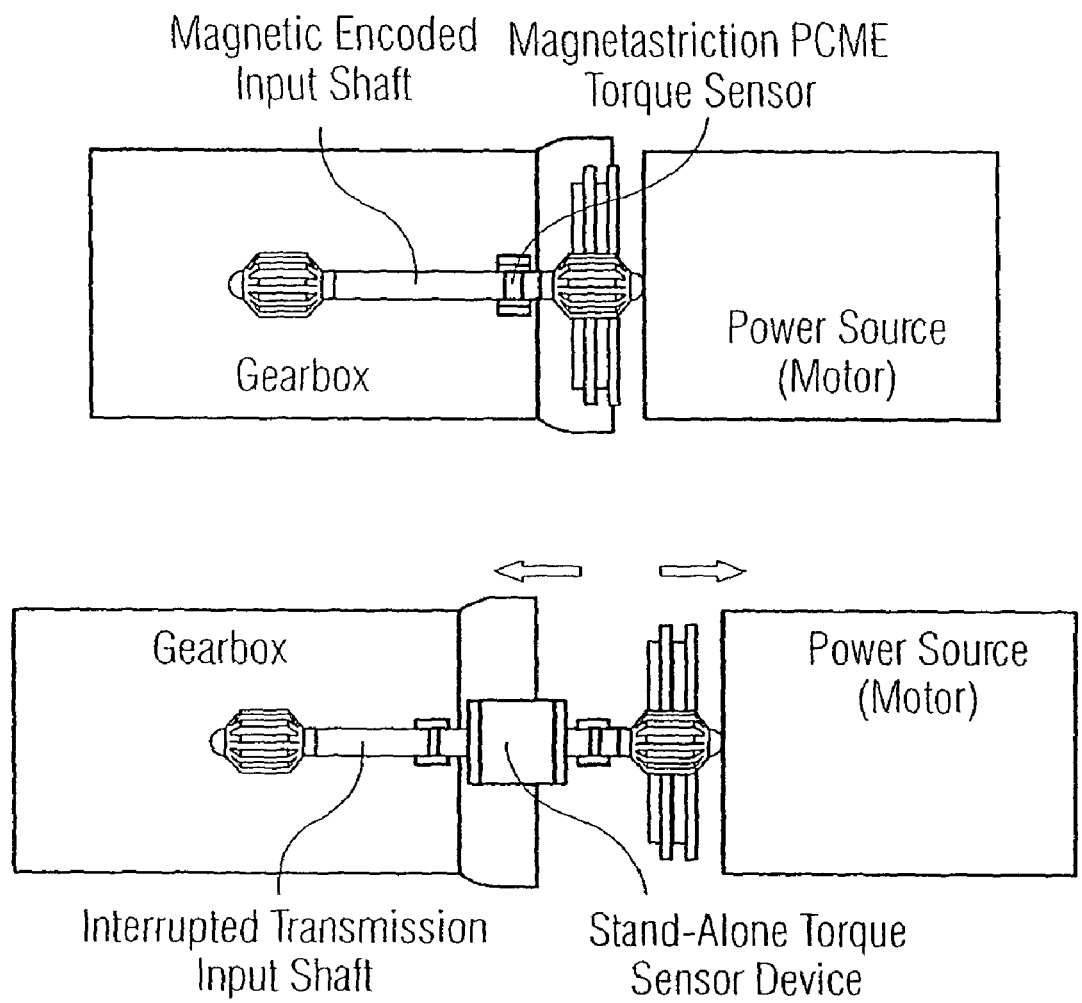
FIG. 56 shows an application of a torque sensor according to an exemplary embodiment of the present invention in a gear box of a motor.

FIG. 56 shows possible arrangement locations for the torque sensor according to an exemplary embodiment of the present invention, for example, in a gear box of a motorcar. The upper portion of FIG. 56 shows the arrangement of the PCME torque sensor according to an exemplary embodiment of the present invention. The lower portion of the FIG. 56 shows the arrangement of a stand alone sensor device which is not integrated in the input shaft of the gear box as is in the exemplary embodiment of the present invention.

As may be taken from the upper portion of FIG. 56, the torque sensor according to an exemplary embodiment of the present invention may be integrated into the input shaft of the gear box. In other words, the primary sensor may be a portion of the input shaft. In other words, the input shaft may be magnetically encoded such that it becomes the primary sensor or sensor element itself. The secondary sensors, i.e. the coils, may, for example, be accommodated in a bearing portion close to the encoded region of the input shaft. Due to this, for providing the torque sensor between the power source and the gear box, it is not necessary to interrupt the input shaft and to provide a separate torque sensor in between a shaft going to the motor and another shaft going to the gear box as shown in the lower portion of FIG. 56.

Due to the integration of the encoded region in the input shaft it is possible to provide for a torque sensor without making any alterations to the input shaft, for example, for a car. This becomes very important, for example, in parts for an aircraft where each part has to undergo extensive tests before being allowed for use in the aircraft. Such torque sensor according to the present invention may be perhaps even without such extensive testing being corporated in shafts in aircraft or turbine since, the immediate shaft is not altered. Also, no material effects are caused to the material of the shaft.

Furthermore, as may be taken from FIG. 56, the torque sensor according to an exemplary embodiment of the present invention may allow to reduce a distance between a gear box and a power source since the provision of a separate stand alone torque sensor between the shaft exiting the power source and the input shaft to the gear box becomes obvious.

Next, Sensor Components will be explained.

Figure 57:
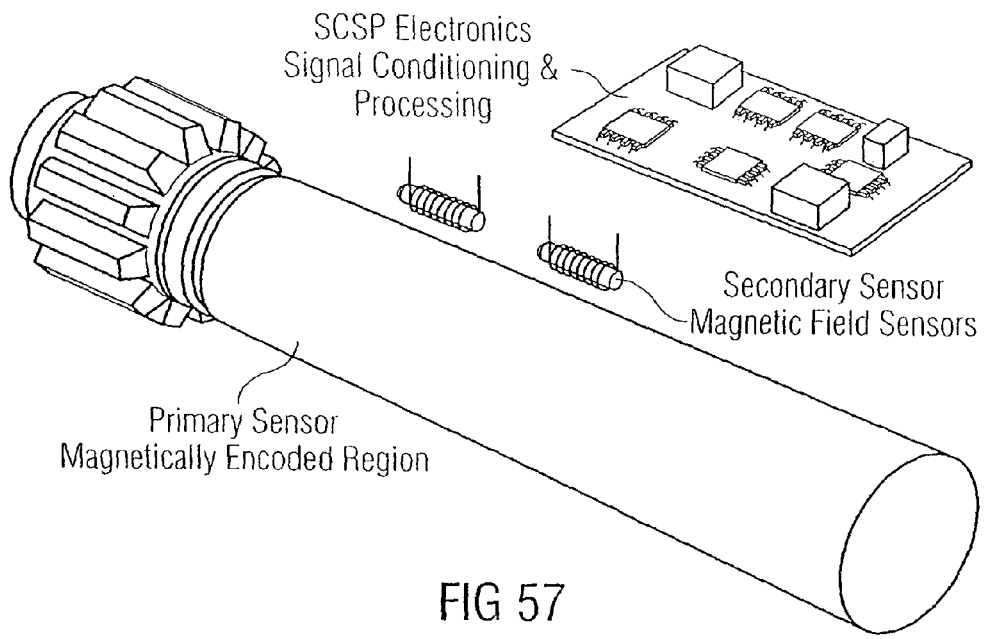
FIG. 57 shows a torque sensor according to an exemplary embodiment of the present invention.

A non-contact magnetostriction sensor (NCT-Sensor), as shown in FIG. 57, may consist, according to an exemplary embodiment of the present invention, of three main functional elements: The Primary Sensor, the Secondary Sensor, and the Signal Conditioning & Signal Processing (SCSP) electronics.

Depending on the application type (volume and quality demands, targeted manufacturing cost, manufacturing process flow) the customer can chose to purchase either the individual components to build the sensor system under his own management, or can subcontract the production of the individual modules.

Figure 58:
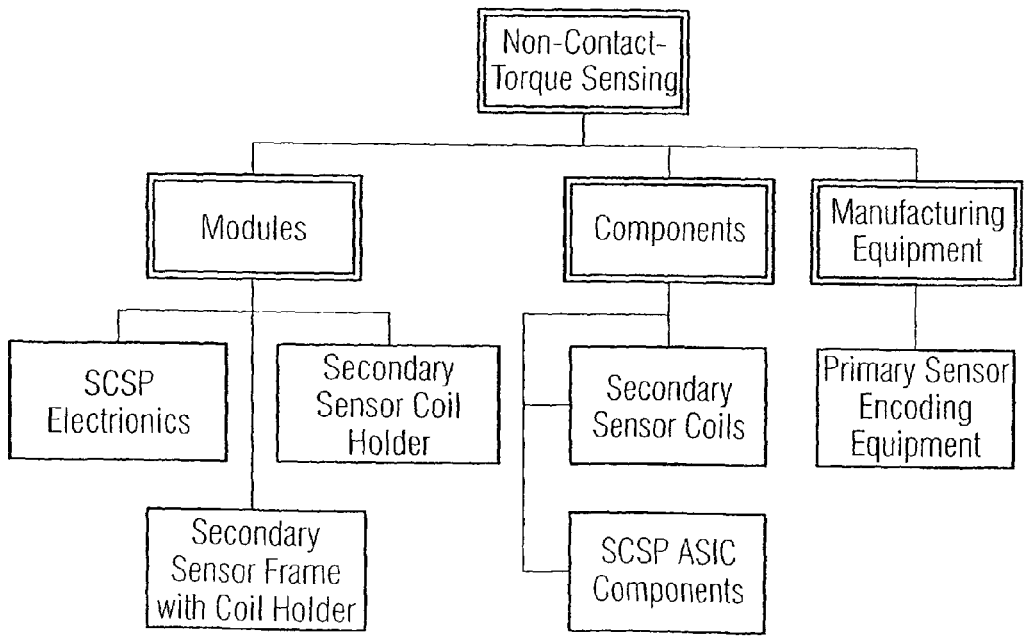
FIG. 58 shows a schematic illustration of components of a non-contact torque sensing device according to an exemplary embodiment of the present invention.

FIG. 58 shows a schematic illustration of components of a non-contact torque sensing device. However, these components can also be implemented in a non-contact position sensing device.

In cases where the annual production target is in the thousands of units it may be more efficient to integrate the "primary-sensor magnetic-encoding-process" into the customers manufacturing process. In such a case the customer needs to purchase application specific "magnetic encoding equipment".

In high volume applications, where cost and the integrity of the manufacturing process are critical, it is typical that NCTE supplies only the individual basic components and equipment necessary to build a non-contact sensor:

ICs (surface mount packaged, Application-Specific Electronic Circuits)
MFS-Coils (as part of the Secondary Sensor)
Sensor Host Encoding Equipment (to apply the magnetic encoding on the shaft=Primary Sensor)

Depending on the required volume, the MFS-Coils can be supplied already assembled on a frame, and if desired, electrically attached to a wire harness with connector. Equally the SCSP (Signal Conditioning & Signal Processing) electronics can be supplied fully functional in PCB format, with or without the MFS-Coils embedded in the PCB.

Figure 59:
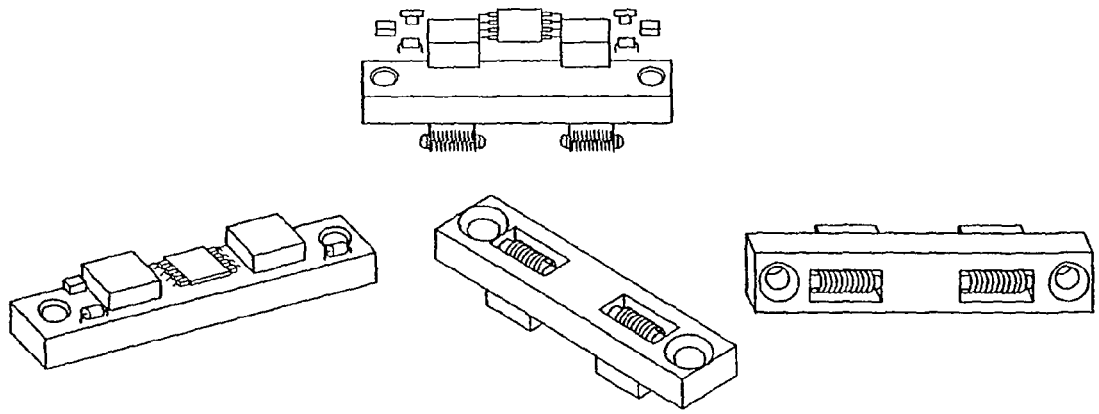
FIG. 59 shows components of a sensing device according to an exemplary embodiment of the present invention.

FIG. 59 shows components of a sensing device.

Figure 60:
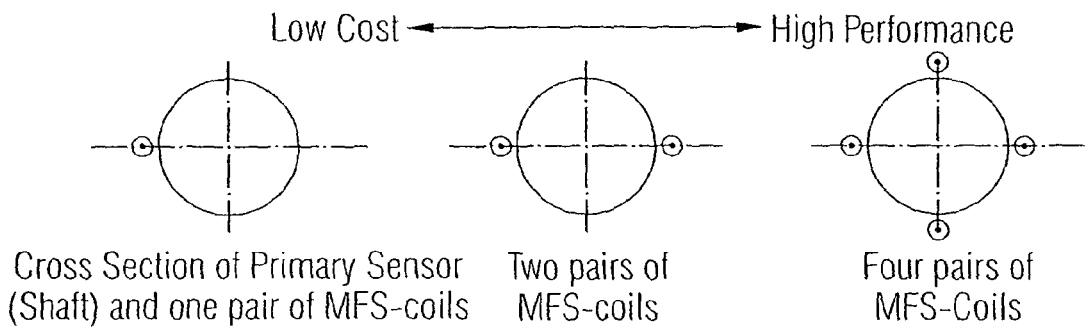
FIG. 60 shows arrangements of coils with a sensor element according to an exemplary embodiment of the present invention.

As can be seen from FIG. 60, the number of required MFS-coils is dependent on the expected sensor performance and the mechanical tolerances of the physical sensor design. In a well designed sensor system with perfect Sensor Host (SH or magnetically encoded shaft) and minimal interferences from unwanted magnetic stray fields, only 2 WS-coils are needed. However, if the SH is moving radial or axial in relation to the secondary sensor position by more than a few tenths of a millimeter, then the number of MFS-coils need to be increased to achieve the desired sensor performance.

In the following, a control and/or evaluation circuitry will be explained.

The SCSP electronics, according to an exemplary embodiment of the present invention, consist of the NCTE specific ICs, a number of external passive and active electronic circuits, the printed circuit hoard (PCB), and the SCSP housing or casing. Depending on the environment where the SCSP unit will be used the casing has to be sealed appropriately.

Depending on the application specific requirements NCTE (according to an exemplary embodiment of the present invention) offers a number of different application specific circuits:
Basic Circuit
Basic Circuit with integrated Voltage Regulator
High Signal Bandwidth Circuit
Optional High Voltage and Short Circuit Protection Device
Optional Fault Detection Circuit FIG. 61 shows a single channel, low cost sensor electronics solution.

Figure 61:
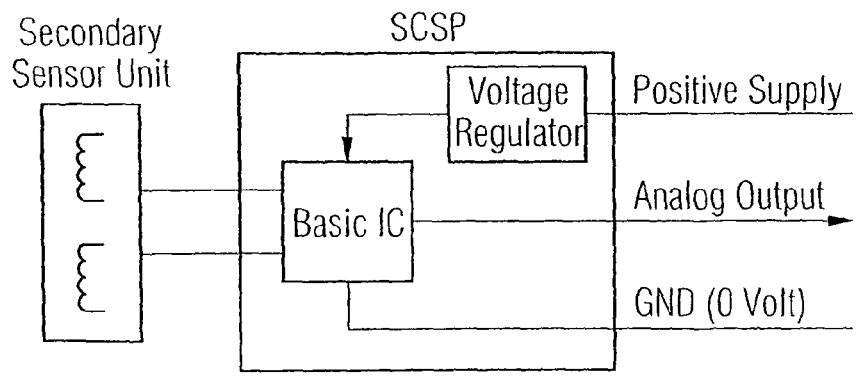
FIG. 61 shows a single channel sensor electronics according to an exemplary embodiment of the present invention.

As may be taken from FIG. 61, there may be provided a secondary sensor unit which comprises, for example, coils. These coils are arranged as, for example, shown in FIG. 60 for sensing variations in a magnetic field emitted from the primary sensor unit, i.e. the sensor shaft or sensor element when torque is applied thereto. The secondary sensor unit is connected to a basis IC in a SCST. The basic IC is connected via a voltage regulator to a positive supply voltage. The basic IC is also connected to ground. The basic IC is adapted to provide an analog output to the outside of the SCST which output corresponds to the variation of the magnetic field caused by the stress applied to the sensor element.

Figure 62:
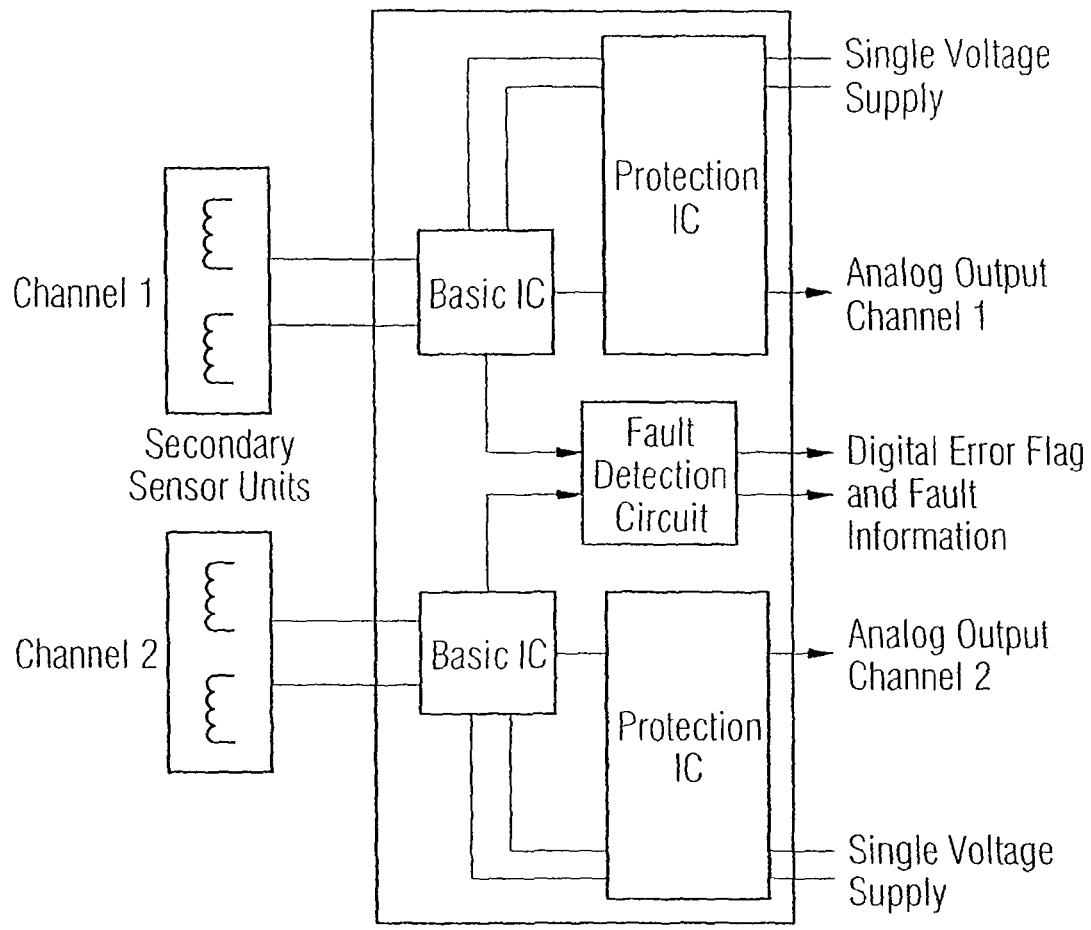
FIG. 62 shows a dual channel, short circuit protected system according to an exemplary embodiment of the present invention.

FIG. 62 shows a dual channel, short circuit protected system design with integrated fault detection. This design consists of 5 ASIC devices and provides a high degree of system safety. The Fault-Detection IC identifies when there is a wire breakage anywhere in the sensor system, a fault with the MFS coils, or a fault in the electronic driver stages of the "Basic IC".

Next, the Secondary Sensor Unit will be explained.

Figure 63:
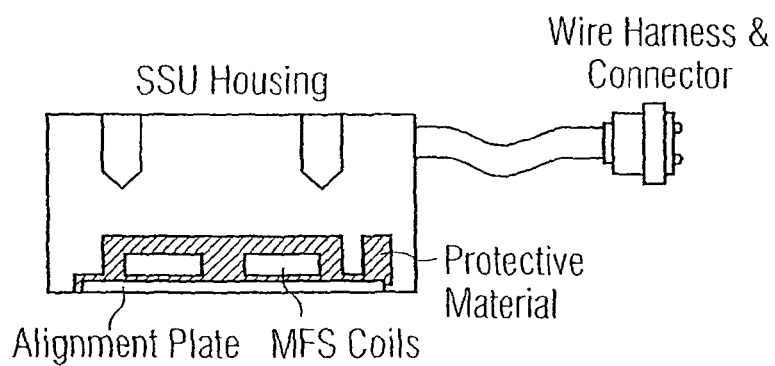
FIG. 63 shows a sensor according to another exemplary embodiment of the present invention.

The Secondary Sensor may, according to one embodiment shown in FIG. 63, consist of the elements: One to eight MFS (Magnetic Field Sensor) Coils, the Alignment- & Connection-Plate, the wire harness with connector, and the Secondary-Sensor-Housing.

The MFS-coils may be mounted onto the Alignment-Plate. Usually the Alignment-Plate allows that the two connection wires of each MFS-Coil are soldered/connected in the appropriate way. The wire harness is connected to the alignment plate. This, completely assembled with the MFS-Coils and wire harness, is then embedded or held by the Secondary-Sensor-Housing.

The main element of the MFS-Coil is the core wire, which has to be made out of an amorphous-like material.

Depending on the environment where the Secondary-Sensor-Unit will be used, the assembled Alignment Plate has to be covered by protective material. This material can not cause mechanical stress or pressure on the MFS-coils when the ambient temperature is changing.

In applications where the operating temperature will not exceed +110 deg C. the customer has the option to place the SCSP electronics (ASIC) inside the secondary sensor unit (SSU). While the ASIC devices can operated at temperatures above +125 deg C. it will become increasingly more difficult to compensate the temperature related signal-offset and signal-gain changes.

The recommended maximal cable length between the MFS-coils and the SCSP electronics is 2 meters. When using the appropriate connecting cable, distances of up to 10 meters are achievable. To avoid signal-cross-talk in multi-channel applications (two independent SSUs operating at the same Primary Sensor location=Redundant Sensor Function), specially shielded cable between the SSUs and the SCSP Electronics should be considered.

When planning to produce the Secondary-Sensor-Unit (SSU) the producer has to decide which part/parts of the SSU have to be purchased through subcontracting and which manufacturing steps will be made in-house.

In the following, Secondary Sensor Unit Manufacturing Options will be described.

When integrating the NCT-Sensor into a customized tool or standard transmission system then the systems manufacturer has several options to choose from:
- custom made SSU (including the wire harness and connector)
- selected modules or components; the final SSU assembly and system test may be done under the customer's management.
- only the essential components (MFS-coils or MFS-core-wire, Application specific ICs) and will produce the SSU in-house.

Figure 64:
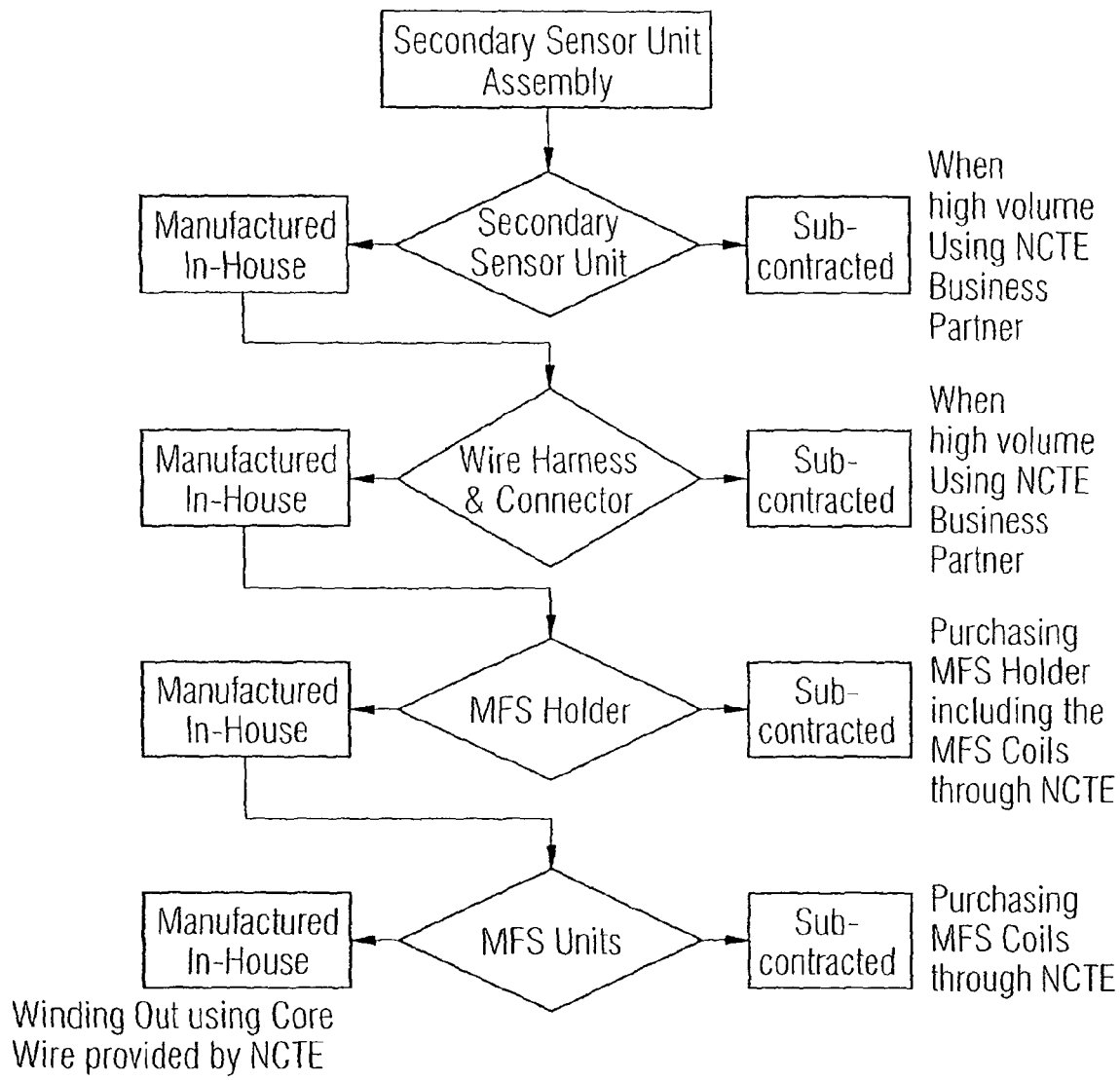
FIG. 64 illustrates an exemplary embodiment of a secondary sensor unit assembly according to an exemplary embodiment of the present invention.

FIG. 64 illustrates an exemplary embodiment of a Secondary Sensor Unit Assembly.

Next, a Primary Sensor Design is explained.

The SSU (Secondary Sensor Units) can be placed outside the magnetically encoded SH (Sensor Host) or, in case the SH is hollow, inside the SH. The achievable sensor signal amplitude is of equal strength but has a much better signal-to-noise performance when placed inside the hollow shall.

Figure 65:
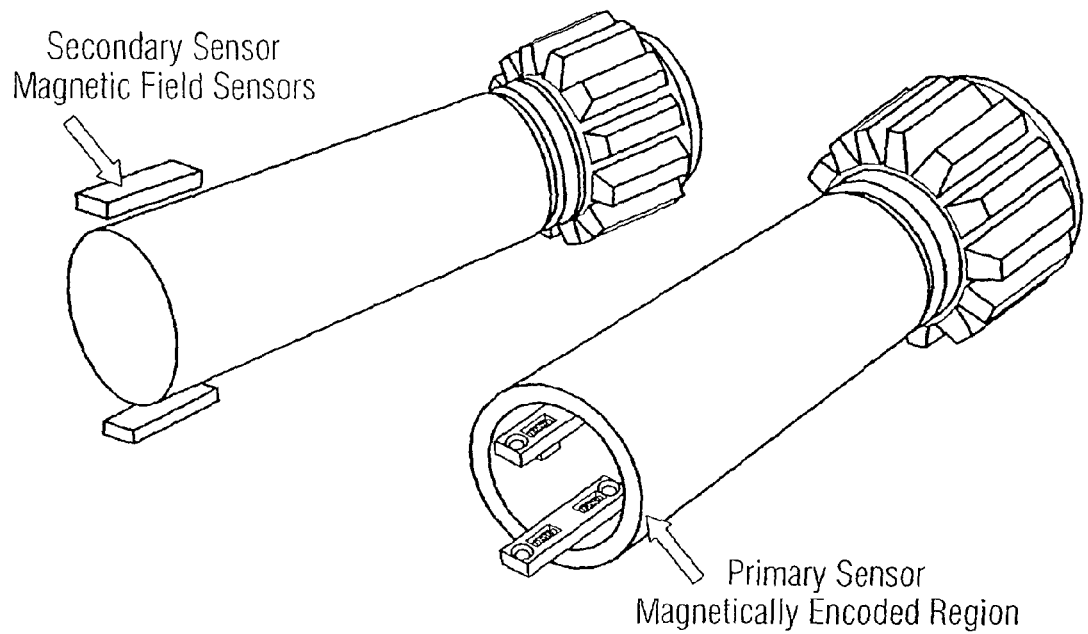
FIG. 65 illustrates two configurations of a geometrical arrangement of primary sensor and secondary sensor according to an exemplary embodiment of the present invention.

FIG. 65 illustrates two configurations of the geometrical arrangement of Primary Sensor and Secondary Sensor.

Improved sensor performances may be achieved when the magnetic encoding process is applied to a straight and parallel section of the SH (shaft). For a shaft with 15 mm to 25 mm diameter the optimal minimum length of the Magnetically Encoded Region is 25 mm. The sensor performances will further improve if the region can be made as long as 45 mm (adding Guard Regions). In complex and highly integrated transmission (gearbox) systems it will be difficult to rind such space. Under more ideal circumstances, the Magnetically Encoding Region can be as short as 14 mm, but this bears the risk that not all of the desired sensor performances can be achieved.

Figure 66:
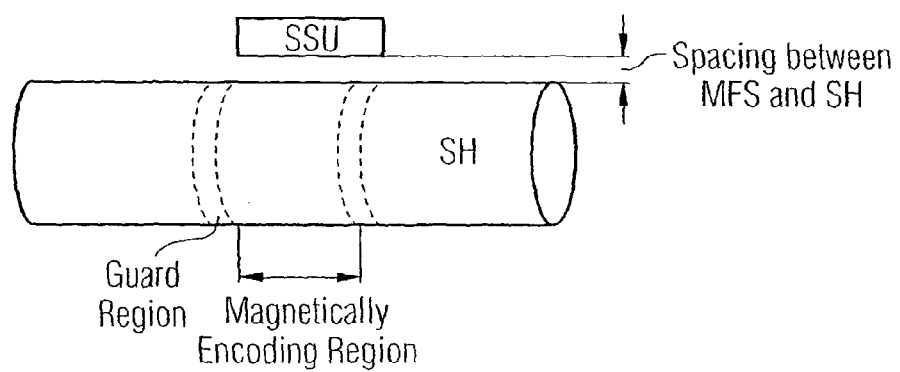
FIG. 66 is a schematic representation for explaining that a spacing between the secondary sensor unit and the sensor host is for example as small as possible.

As illustrated in FIG. 66, the spacing between the SSU (Secondary Sensor Unit) and the Sensor Host surface, according to an exemplary embodiment of the present invention, should be held as small as possible to achieve the best possible signal quality.

Next, the Primary Sensor Encoding Equipment will be described.

Figure 67:
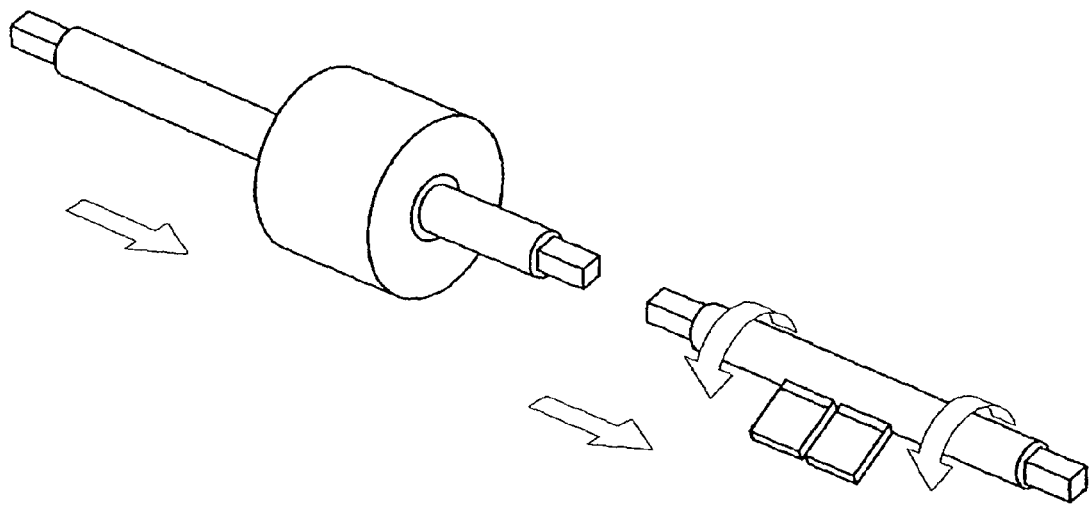
FIG. 67 is an embodiment showing a primary sensor encoding equipment.

An example is shown in FIG. 67.

Depending on which magnetostriction sensing technology will be chosen, the Sensor Host (SN) needs to be processed and treated accordingly. The technologies vary by a great deal from each other (ABB, FAST, FT, Kubota, MDI, NCTE, RM, Siemens, . . . ) and so does the processing equipment required. Some of the available magnetostriction sensing technologies do not need any physical changes to be made on the SH and rely only on magnetic processing (MDI, FAST, NCTE).

While the MDI technology is a two phase process, the FAST technology is a three phase process, and the NCTE technology a one phase process, called PCM Encoding.

One should be aware that after the magnetic processing, the Sensor Host (SH or Shaft), has become a "precision measurement" device and has to be treated accordingly. The magnetic processing should be the very last step before the treated SH is carefully placed in its final location.

The magnetic processing should be an integral part of the customer's production process (in-house magnetic processing) under the following circumstances:
- High production quantities (like in the thousands)
- Heavy or difficult to handle SH (e.g. high shipping costs)
- Very specific quality and inspection demands (e.g. defense applications)

In all other cases it may be more cost effective to get the SH magnetically treated by a qualified and authorized subcontractor, such as NCTE. For the "in-house" magnetic processing dedicated manufacturing equipment is required. Such equipment can be operated fully manually, semi-automated, and fully automated. Depending on the complexity and automation level the equipment can cost anywhere from EUR 20 k to above EUR 500 k.

In the following, referring to FIGS. 68a to 102, exemplary embodiments of non-contact, absolute and incremental rotational angle sensors according to exemplary embodiments of the invention will be described.

A unique aspect of the PCME sensor encoding process is that it allows a lifetime lasting magnetic encoding in a sensor host. This is only possible when sensor host is made from ferromagnetic material. In the following, an absolute and incremental angle sensor design will be described that may be based on the PCME encoding process. However, the generation of a magnetically encoded portion may only performed with other techniques, for instance with a technique which is disclosed, as such, in WO 02/063262.

The non-contact rotation angle sensor which will be described in the following can work on its own (so-called single function PCME sensor), or can work in combination with other sensor functions (multifunction PCME sensor). A typical multifunction PCME sensor is the combination or an absolute angle sensing and rotational torque sensing apparatus. When knowing the change of angle, it is possible to calculate the rotational speed with which the sensor host is rotating around its axis.

The product of rotational speed and rotational torque is power. In other words, the multifunction PCME sensor capable of measuring angle and torque may result in a non-contact mechanical power sensing device.

However, any desired combination of one, two or more measured parameters is possible, including bending forces, rotating forces, angles, positions, and so on.

In the following, the magnetic processing of an angle sensor location will be described.

In order to create an absolute rotational angle sensor, that is to say an angle sensor capable of measuring the angular position of a rotating object not only in a relative but in an absolute manner, the system electronics should be able to get data from the magnetic field detecting devices which data should be "unique" in relation to the current angular position of the magnetically encoded region arranged on the movable object. The signal uniqueness can be achieved through a number of different permanent magnetic encoding processes.

In the following, a so-called "analog signal, one cycle pattern" will be described.

A basic principle of an "analog signal, one cycle pattern" rotational angle sensor is that the analog output signal has a near sine-shape signal (one cycle) when the magnetically encoded sensor host rotates by 360° angle.

Figure 68A:
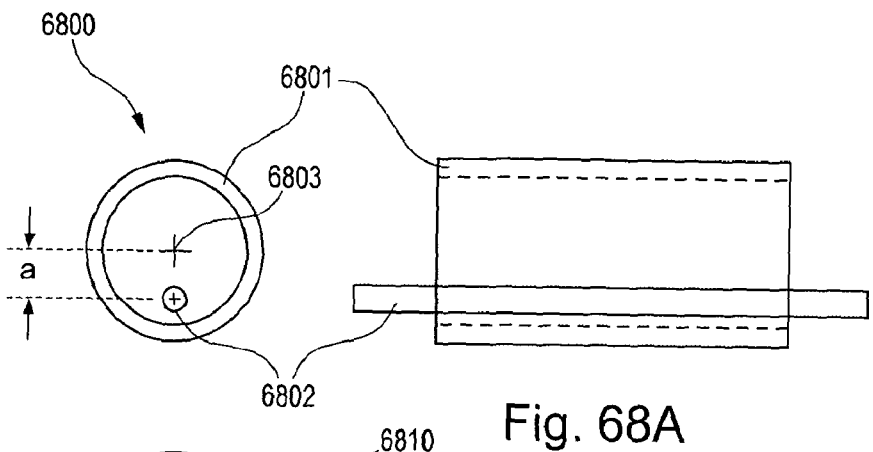
FIG. 68A illustrates a method of magnetizing a movable object according to an exemplary embodiment of the invention.

FIG. 68A illustrates a method of manufacturing an object 6800 which may be used as a movable object in the context of an angular sensor device, wherein the object 6800 may be manufactured by arranging a magnetically encoded region 6801 with an angularly varying magnetic strength along the circumference of the object 6800.

FIG. 68A shows a sectional view and a side view of the object 6800 during a magnetizing process in order to generate the magnetically encoded region 6801 having a magnetic field strength which depends on the position along the circumference of the object 6800, an electric conductor 6802 for generating a PCME encoding signal as described above in detail is placed off-centre by a distance "a" with respect to a symmetry axis of the tubular-like object 6800. Then, a sensor signal in the manner as shown in FIG. 30 or FIG. 35 may be applied to the electrical conductor 6802 in order to generate a magnetization in the magnetically encoded region 6801 which differs along the circumference of the object 6800, since, during the programming procedure, the distance between the electrical conductor 6802 and the different portions of the magnetically encoded region 6801 differs.

To get a sensor signal that is changing its signal amplitude in relation to the sensor host rotation, the magnetic encoding signal (in this example the "PCME" signal) may be passed through the inner of the sensor host tube "off-centre". The further away the electrical conductor 6802 is placed from the tube centre point 6803 (or better, the nearer the electrical conductor 6802 is placed to one side of the sensor host tube wall) the stronger the signal amplitude modulation will be. In other words, a varying distance between electrical conductor and magnetizable material of the object 6800 yields an inhomogeneous magnetization along the circumference of the object 6800.

Figure 68B:
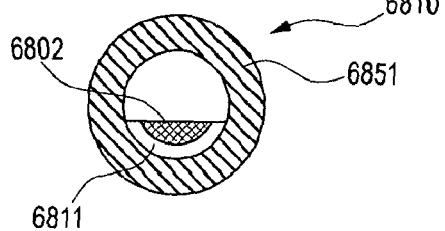
FIG. 68B illustrates an alternative geometrical configuration compared to FIG. 68A.

FIG. 68B shows an alternative magnetization geometry in which an object 6810 is magnetized, wherein an electric insulator 6811 is placed between the electrical conductor 6802 and the tubular wall of the object 6810.

In the following, referring to FIGS. 69A to 70B, it will be described how the programming process and the asymmetric geometry during the programming yields an angular dependence of a signal measured in the vicinity of the object.

Figure 69A:
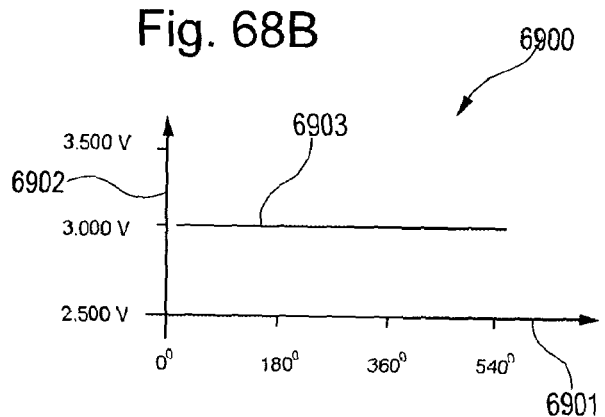
FIG. 69A, FIG. 69B illustrate a sensor signal output in case of a symmetric magnetizing scheme.
Figure 69B:
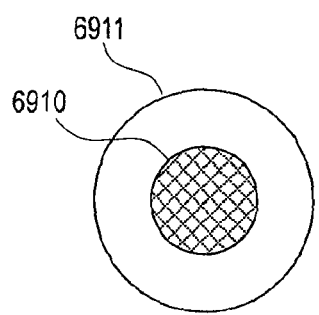

In FIG. 69A, a diagram 6900 is shown, wherein a rotational angle of the sensor host 6910 of FIG. 69B is plotted along an abscissa 6901. Along an ordinate 6902, a sensor signal output of a magnetically field detector arranged along the circumference of the sensor host 6910 is plotted.

The curve 6903 shown in FIG. 69A corresponds to the sensor host 6910 shown in FIG. 69B. The programming scheme in the case of the sensor host 6910 results in a rotational sensor signal amplitude which is constant during rotation of the sensor host 6910 due to a centred magnetic encoding geometry. In other words, the distribution of the signal intensity around the circumference of the sensor host 6910 is constant, resulting in a constant angular dependence of the sensor signal output 6903. The constant magnetic field strength along the circumference of the sensor host 6910 is illustrated by the concentric circle 6911 (or by a rotational sensor signal amplitude 6911).

Figure 70A:
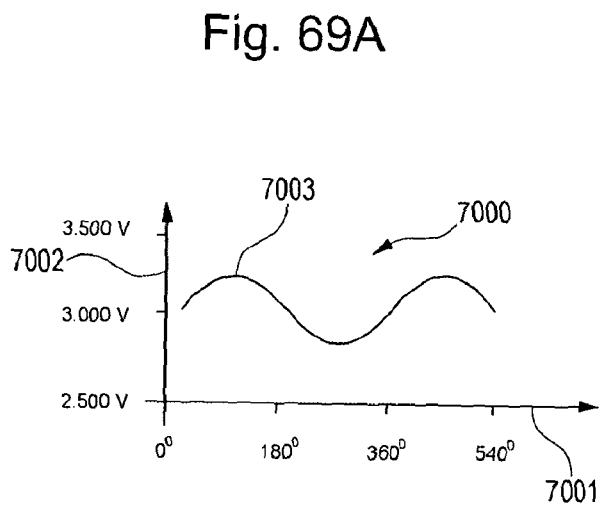
FIG. 70A, FIG. 70B illustrate a signal sensor output and a geometry for magnetizing a magnetizable object in an off-centred manner according to an exemplary embodiment of the invention.

In contrast to this, the diagram 7000 shown in FIG. 70A illustrates a dependence of the sensor signal output (plotted along an ordinate 7002) from the rotational angle from sensor host (plotted along an ordinate 7001).

Figure 70B:
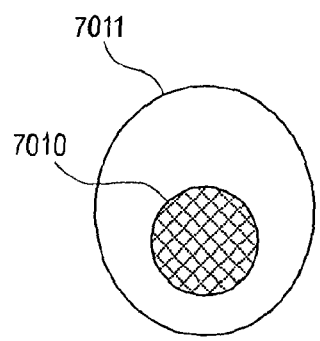

The curve 7003 essentially has a sinusoidal shape. This results from an off-centred magnetic encoding scheme, as illustrated in FIG. 70B, which corresponds to a magnetizing scheme similarly to that shown in FIG. 68A. Consequently, around the circumference of the sensor host 7010, an asymmetric rotational sensor signal amplitude 7011 can be measured.

The diagram 6900 shows the analog sensor signal output when the sensor host 6910 is rotated around its centre axis by more than 360° angle. In this case, the magnetic encoding of the sensor host 6910 has been performed symmetrically around the centre surface. The drawing of FIG. 70A shows the output signal modulation 7003 when rotating the sensor host 7010 around its centre axis as a result from the "off-centred" magnetic encoding.

The magnetically encoded sensor host can be a round shaft or tube, a round disk, a round ring, or a non-round shaped object, that can rotate around a defined axis. When using a non-round shaped object, then the angle sensor signal processor requirements are very demanding as the signal amplitude will be strongly influenced by the non-symmetrically shape of the sensor host. However, such an asymmetric geometrical configuration can also be used for detecting the angular position of a sensor host.

In the following, referring to FIGS. 71 to 73C, different geometrical configurations for magnetizing a sensor host in an asymmetric manner will be described.

Figures 71, 72:
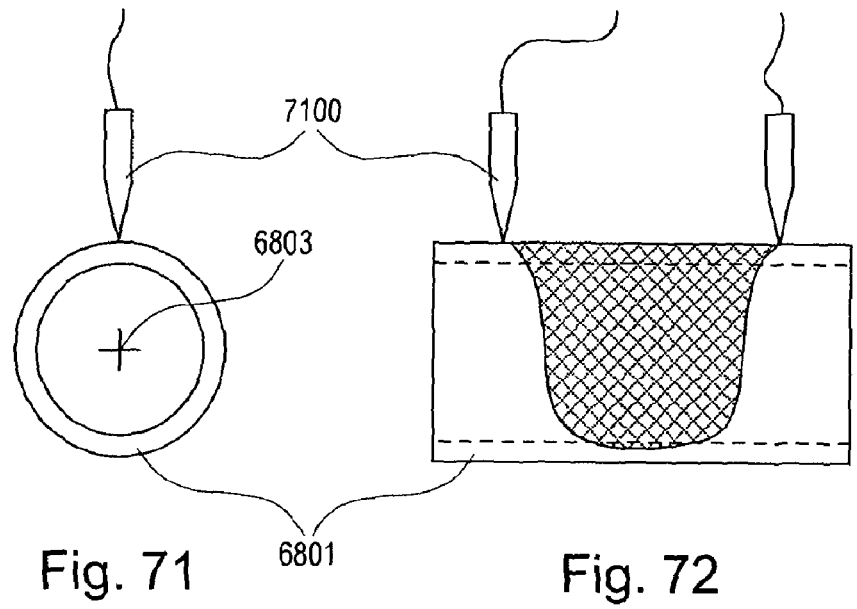
FIG. 71 illustrates an arrangement for magnetizing a magnetizable object according to an exemplary embodiment of the invention.
FIG. 72 illustrates another arrangement for magnetizing an object according to an exemplary embodiment of the invention.

In FIG. 71, a magnetically encoded region 6801 is shown together with a symmetry axis 6803 of a tubular hollow shaft to be magnetized. In contrast to the magnetizing scheme shown in FIG. 68A, an electrical conductor 7100 is brought in direct contact with a circumferential end portion of the magnetically encoded region 6801. The electrical connectors 7100 which are arranged in an asymmetric manner along the circumference of the magnetically encoded region 6801 insert one or two or more PCME encoding pulses (for instance as shown in FIG. 30 or FIG. 35) to the host 6801. Due to the asymmetric configuration of the electrical connectors 7100, the magnetic field distribution of the magnetically encoded region 6801 will also vary along the circumference of the magnetically encoded region 6801.

FIG. 71 shows a cross-sectional view and FIG. 72 shows a side view of this configuration.

Although the magnetically encoded region or the object to be magnetized is shown in FIG. 71, 72 as hollow cylinder, they can also be realized as a full cylinder.

As shown in FIGS. 71, 72, by placing electrical connectors 7100 "one-sided" at the sensor host 6801 (that is to say non-symmetrically around the sensor host), the PCME magnetic encoding will result in an amplitude modulated signal when rotating the sensor host. In other words, an asymmetric programming geometry may be chosen.

Figures 73A, 73B, 73C:
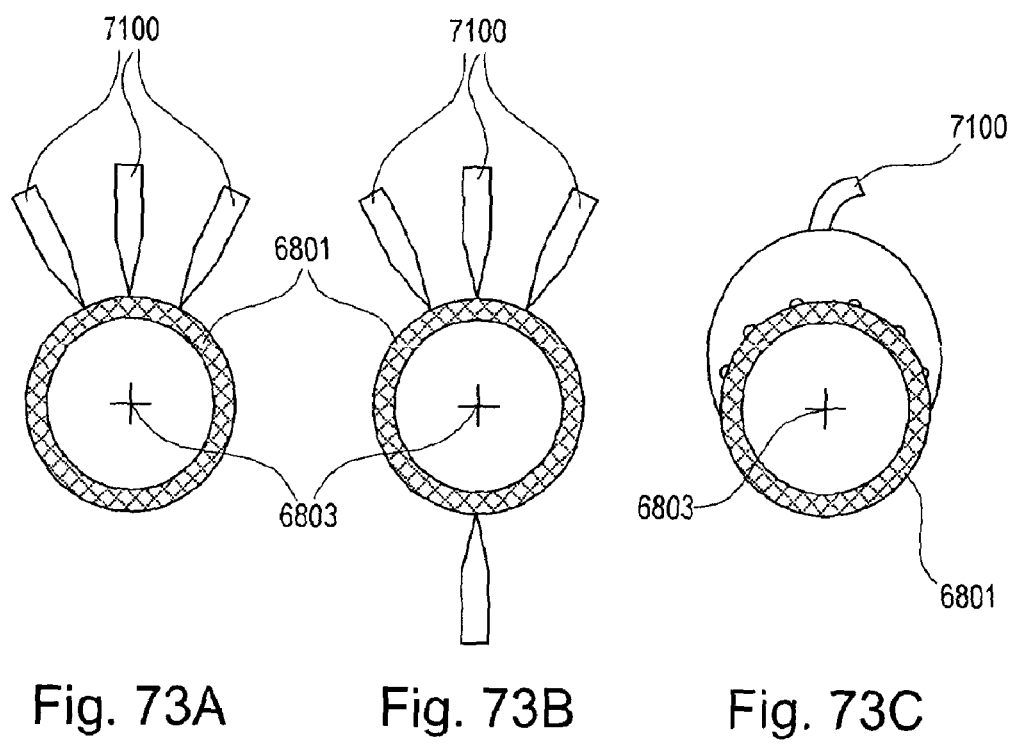
FIGS. 73A to 73C illustrate alternative geometrical configurations compared to FIG. 71.

As can be seen in FIG. 73A to FIG. 73C, alternative configurations of a plurality of electrical connectors 7100 asymmetrically contacting the magnetizable material of the magnetically encoded region 6801 may be used. In all configurations, the programming signals are injectable mostly at a particular part of the circumference of the magnetically encoded region 6801. It should be emphasized that, as an alternative to the configuration shown in FIG. 71 to FIG. 73C, it is also possible to contact one or more electrical connectors 7100 at an inner wall portion of the hollow tubular objects 6801.

To achieve the desired (pseudo-)sinus angle sensor signal shape, an optimal "non-symmetrical" electrical connection method should be implemented. Depending on the sensor host diameter and the "to be encoded angle sensor" length, one or more electrical connectors have to be placed "non-symmetrically" around the sensor host 6801. The arrangement may be such that more electric current is entering the shaft on one side than on the other.

Instead of using individual connectors (as shown in FIGS. 73A, 73B), a single connector 7100 can be used that has different impedance at different locations where the connector is touching the sensor host surface. Such a configuration is shown in FIG. 73C.

In the following, referring to FIG. 74A, FIG. 74B, an apparatus 7400 for magnetizing a magnetizable object 7403 to generate magnetically encoded regions will be described.

The apparatus 7400 comprises electrical connection elements 7401 for electrically contacting different portions of the magnetizable object 7403. Furthermore, an electric signal supply unit 7402 is provided which is connected to the electrical connection elements 7401 and is adapted for applying different electric signals to the different portions so as to generate different magnetically encoded regions in the different portions of the magnetizable object 7403.

In more detail, two electric connection elements 7401 are connected to a left portion of the circumference of the magnetizable object 7403, wherein a current I1 may be inserted in this portion. A right portion of the magnetizable object 7403 is connected by two other electric connection elements 7401 in order to insert the current I1 in this portion, however for instance with opposite direction. An upper part of the circumference of the magnetizable object 7403 is contacted by two other electric connection elements 7401 in order to insert a current I2 in the corresponding portion of the surface of the magnetizable object 7403. Furthermore, the current I2 is further inserted in a bottom part of the circumference of the magnetizable object 7403 by two further electric connection elements 7401 in order to generate another separately determinable and definable magnetization in this part of the surface.

The currents I1, I2 differing concerning direction, polarities and amplitudes may be adjusted separately and may be applied simultaneously or subsequently to the different portions of the surface of the magnetizable object 7403.

By taking this measure, different magnetic surface portions related to the contacts of the electrical connection element 7401 may be defined on the surface of the magnetizable object 7403. This may result in a magnetization pattern on the surface of the magnetizable object 7403 which is illustrated in FIG. 74B.

FIG. 74B shows the surface projection of the magnetized portions of the surface of the magnetizable object 7403.

As can be seen in FIG. 74B, a chessboard-like pattern can be generated on the surface. Adjacent portions may differ concerning polarity and/or intensity of the magnetic field or magnetization generated in the assigned portion.

The configuration shown in FIG. 74A, FIG. 74B results in a surface magnetization pattern which, when sampled or scanned by a magnetic field detector arranged in a vicinity of the circumferential surface of the magnetizable object 7403 has contributions of a plurality of sine functions.

In other words, FIG. 74A, FIG. 74B show an "analog/digital signal, multi-cycle pattern".

The "analog/digital, multi-cycle pattern" rotational angle sensor provides two or more complete cycles of a near sinus shape or a pseudo sinus shape output signal when the magnetically encoded sensor host rotates 360°.

To get a multi-cycle and magnetic pattern, the PCME encoding signal has to be passed through the sensor host in two or more alternating patterns. The solution shown in FIG. 74A, FIG. 74B can be realized with a magnetic processing of a ferromagnetic shaft. If the rotating device 7403 (like a transmission shaft of the power steering shaft) has ferromagnetic properties, then the magnetic processing can be applied to this shaft.

According to the magnetizing scheme shown in FIG. 74A, FIG. 74B, the different currents I1, I2 can be applied one after the other, or simultaneously.

Particularly, although not shown in FIG. 74A, it may be advantageous to use an individual electric signal supply unit 7402 for each pair of the electrical connection elements 7401.

For instance, the current sources I2 and I1 may be separate from each other. Meaning that one needs to use two independent current supply sources to ensure that there is no current cross talk between I1 and I2.

Referring to FIG. 74B, the chess board as shown is generated by using the method as shown in 74A. Meaning that the 4 by 4 field structure forms automatically even so when only 4 current paths are used for magnetic encoding. It is believed that the reason is that only the inner two chess board structures (columns) are generated directly through the current flowing from one connector to the other electrical contact. The outer two chess board columns may be generated by themselves without a electrical current flowing through that regions. This may have something to do with the inductivity between the shaft ends (the sections outside the direct magnetic encoded region) and the cabling.

In the following, referring to FIGS. 75 to 76B, solutions will be described in which a magnetic processed ring is placed around a non-ferromagnetic shaft.

In case the ferromagnetic properties of the rotating device (like a transmission shaft or the power steering shaft) do not allow the direct magnetic processing of this device, then a ring with sufficient ferromagnetic properties can be fixed/attached to this device.

Depending on the ferromagnetic property differences between the main rotating device and the magnetically processed ring, an insulation ring may be appropriate. The insulation ring will magnetically separate the magnetically encoded ring and the main rotating device (for example a transmission shaft or power steering shaft).

FIG. 75 shows a configuration in which a non-magnetic rotating shaft 7500 can be covered with a non-ferromagnetic material insulator 7501, and a ferromagnetic ring 7502 can be mounted on the insulator 7501. The insulator may be made of stainless steel or plastic, for instance. Thus, a modular system is obtained which allows to flexibly connect multifunction components to achieve a high quality angle sensor.

FIG. 76A shows such a configuration in a mounted or assembled state, wherein a central portion of the ferromagnetic ring 7502 forms a magnetically encoded region 6801. As can be seen in FIG. 76B, the insulator 7501 can also be omitted.

Depending on the desired angle sensor performances, the ring width (actual length of the ring) may change. The angle sensor signal quantity will be improved when the magnetically encoded ring is relatively wide. This is particularly true when a "one cycle pattern" is applied to the ring.

The configuration of FIG. 75 to FIG. 76B can, for instance, be implemented within a ball bearing or the like.

FIG. 77 illustrates an angle sensor device according to an exemplary embodiment of the invention.

The angle sensor of FIG. 77 is adapted for determining angular position information of a movable object 7500, which may be rotated. The angle sensor device comprises a magnetically encoded region 7502 arranged on the movable object 7500. Furthermore, a plurality of magnetic field detecting coils 7800 are provided and arranged along a circumference of the magnetically encoded region 7502. Furthermore, an angular position and/or angular speed information determining unit (not shown) is coupled to the magnetic field detecting coils 7800 and is supplied with the signals detected by the magnetic field detecting coils 7800.

The magnetic field detecting coils 7800 are adapted to detect a signal generated by the magnetically encoded region 7502 when the magnetically encoded region 7502 moving with the rotating shaft 7500 passes a surrounding area of the magnetic field detecting coils 7800. The angular position and/or angular speed information determining unit determines an angular position information of the movable object 7500 based on the detected magnetic signal.

FIG. 78 shows another exemplary embodiment of an angle sensor device having a reduced actual length of the magnetically encoded region 7502, when compared to FIG. 77.

In other words, different widths (actual lengths) of the magnetically encoded ring 7502 are shown in FIG. 77, FIG. 78. In this case, the magnetically encoded ring 7502 is fitted around the magnetic insulating ring 7501, allowing to use a non-ferromagnetic main shah 7500.

FIG. 79 shows a front view and FIG. 80 shows a side view of an angle sensor device according to an exemplary embodiment of the invention.

As indicated in FIG. 80, not only two magnetic field detectors 7800 may be arranged along the circumference of the magnetically encoded region 7502, it is also possible to arrange three, four or more magnetic field coils. It may also be sufficient to place only a single magnetic field coil adjacent the circumference of the magnetically encoded region 7502. In this case, it is particularly possible to measure changes of the angle. Thus, a dynamic measurement may be carried out, not only a static measurement.

As shown in FIG. 79, FIG. 80, two magnetic field sensors 7800 may be provided to accurately define the rotational angle position of the axis (when using an "analog signal, one cycle pattern encoding"). The two magnetic field sensor devices 7800 have a 90° angle spacing between each other to compute the angle information correctly.

In the following, referring to FIG. 81, an incremental PCME encoded angle sensor 8100 will be described.

There are many different design options to build an incremental, non-contact rotation angle sensor. Instead of placing a non-symmetrical (or non-centric) permanent magnetic field inside the sensor host, the sensor host itself may be mechanically altered near or where the permanent magnetic encoding has taken place.

In other words, a magnetically encoded region may be formed by asymmetrically removing material from a magnetically encoded region. Such a removal may be performed, for instance, by forming indentations or recesses in a magnetized shaft, for instance by milling.

The left picture of FIG. 81 shows a magnetically encoded object 8101 having an indentation 8102 which may be generated, for instance, by milling.

The illustration on the right hand side of FIG. 81 illustrates that the sensor host indentation 8102 is provided near at the edge of the PCME magnetic encoded region. This PCME magnetic encoded region is defined by two circumferentially oriented magnetized portions 8103, 8104 having oppositely directed magnetization vectors.

The consequence of forming such indentations 8102 by removing material from the at least one magnetically encoded region, is that an asymmetrical distribution of the magnetization profile can be obtained, and the magnetically encoded region will no longer generate a rotational uniform signal as the magnetic flux will be disturbed (or the flux path will be altered) by the mechanical indentation 8102.

At every full rotation of the PCME encoded sensor host, the signal measured by a magnetic field detecting coil (not shown in FIG. 81) will change in amplitude at the location where the sensor host design is not uniform (that is to say at the location of the mechanical sensor host indentation 8102). This signal amplitude change can be used to count the sensor host revolution or to measure the sensor host rotation speed ("rotational speed pulse").

The dimension of the mechanical indentation (depth, width, shape, etc.) will define the signal amplitude change detected by the magnetic field detection devices.

Many alternatives are possible concerning the geometrical configuration of the indentation 8102. In contrast to FIG. 81, the indentation 8102 may also be provided along the entire extension of the shaft 8101, and may have a linear or spiral shape.

Alternatively, it is possible to form the magnetically encoded region by asymmetrically adding material to the magnetically encoded region. For instance, as an alternative to removing material from the circumference of the shaft 8101, magnetic material may be added (for instance attached) to the circumference. This may also alter the rotational dependence of the magnetic signal which can be detected by magnetic field coil(s).

Figure 82:
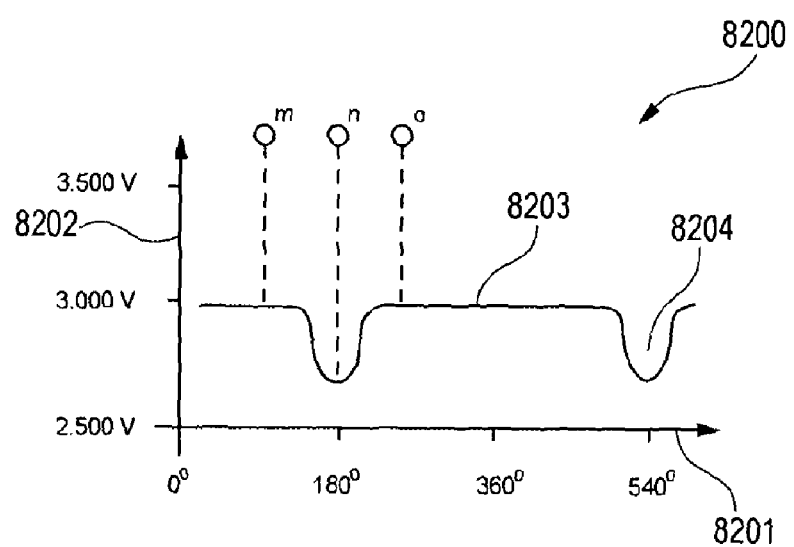
FIG. 82 illustrates a schematic diagram illustrating the magnetic field detection signal in response to an angular rotation of the object shown in FIG. 81.

In the following, referring to FIG. 82, a diagram 8200 will be described.

Along an abscissa 8201 of the diagram 8200, the rotation angle of the sensor host is plotted. Along an ordinate 8202 of the diagram 8200, the sensor signal output is indicated in Volts. An offset of 3.0 Volt can be seen from a curve 8203 indicating a torque signal.

A signal disturbance dip 8204 originating from the indentation 8102 can also be seen in the diagram 8200. The position of magnetic field coils are indicated with letters m, n, o. In other words, the diagram 8200 can be obtained by means of a sensor array having, in this case, three magnetic field coils m, n, o. By simply counting the number of signal disturbance dips 8204, the rotation angle can be detected.

Figure 83:
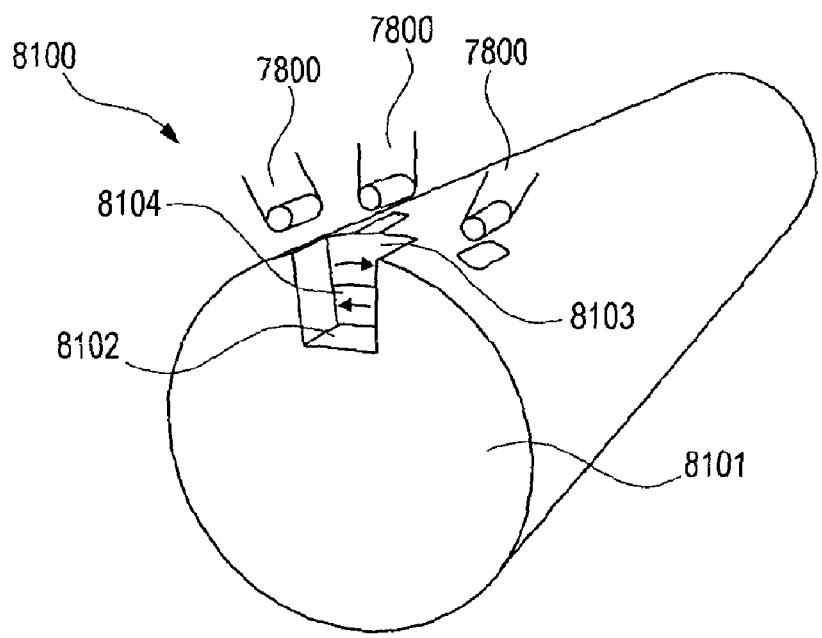
FIG. 83 shows an angle sensor device according to an exemplary embodiment of the invention.

To extract the rotation pulse signal from the torque signal amplitude, several options are available:
1. Placing an array of magnetic field detectors side by side (in, n, and o), wherein the magnetic field detector array has to cover a larger area than the physical dimension of the mechanical sensor host indentation 8102 that is causing the signal disturbance dips 8204. This solution has the benefit that it will work at any rotational speed (from standstill to maximum rounds per minute).
2. Alternatively, the torque and "rotation pulse" signal separation can be achieved by using a passive or active electronic high-pass signal filter. The high-pass signal filter cut-off frequency may be defined by the nominal sensor host revolution. The solution may require only one magnetic field detecting coil (and may thus be manufactured with low costs) but may not be able to extract the "rotation plus speed" signal at lower rounds per minute.
3. FIG. 83 shows a configuration similar to the configuration of FIG. 81, right hand side, having an array of three magnetic field detecting coils 7800 placed near the sensor host 8100 to measure torque and to detect the deformation of the sensor host 8100. The array of the magnetic field detecting coils 7800 has to cover an area that is clearly larger than the surface dimensions of the mechanical deformation (for example the indentation 8102).

Figure 84:
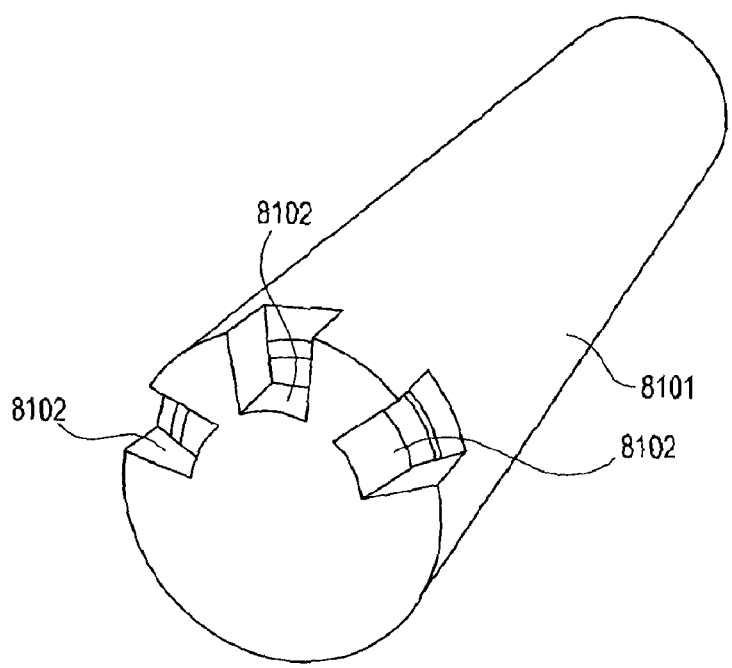
FIG. 84 shows an angle sensor device according to an exemplary embodiment of the invention.

As can be seen in FIG. 84, instead of only one indentation 8102, several mechanical alterations (for instance indentations 8102 or other deformations) can be placed, one after each other, around the sensor host 8101 surface. This will create a sequence (signal code) of signal amplitude changes whenever the sensor host 8101 will turn around. The region where the mechanical alterations or deformations 8102 are placed can also be called "code" region.

In the following, referring to FIG. 85, a diagram 8500 will be described illustrating the dependence of the sensor signal output plotted along the ordinate 8502 of diagram 8500 in dependence of the rotation angle of the sensor host as plotted along the abscissa 8501 of the diagram 8500.

Figure 85:
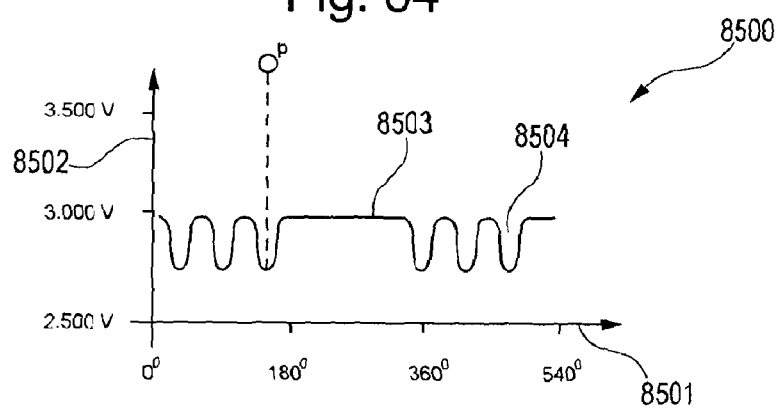
FIGS. 85 and 86 show schematic graphs illustrating the sensor signal output in response to the rotation angle of a sensor host.

In the curve shown in FIG. 85, a torque signal 8503 is plotted as detected by magnetic field detector p, and signal disturbance dips 8504 are plotted as well which are generated from the indentations 8102 of FIG. 84 when the shaft 8101 rotates.

Depending on the number of chosen sensor host surface deformations 8102 (in the example of FIG. 84 three indentations 8102), the torque sensor signal 8503 will change in amplitude whenever deformation 8102 is passing beneath the magnetic field detecting device p. Ultimately, the entire circumference of the sensor host 8101 (the "code" region) can be covered in regular or irregular shaped deformations.

Figure 86:
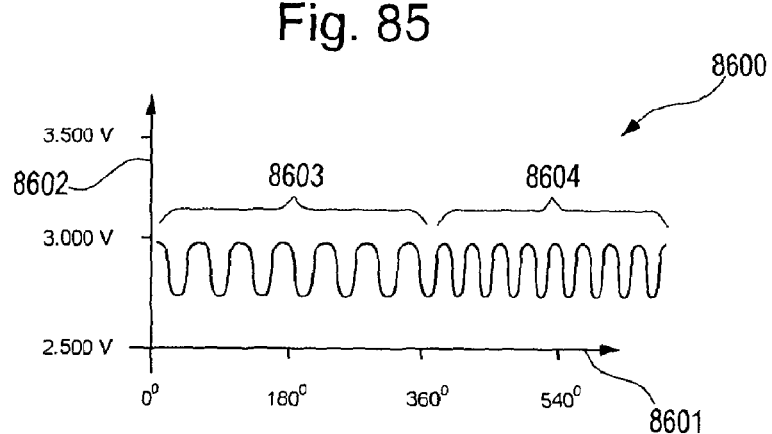

In the following, referring to FIG. 86, a diagram 8600 will be described plotting on an ordinate 8602 the sensor signal output in dependence of the rotation angle of the sensor host which is plotted along the abscissa 8601.

The diagram 8600 comprises two portions, namely a nominal rotational sensor host portion 8603 and an increased rotational sensor host speed portion 8604.

In case that regular shaped deformations 8102 are used to define the signal "code", the torque signal amplitude will be modulated with a frequency that is in relation to the speed with which the sensor host 8101 is rotating around its axis: The incremental angle sensor calculates the amplitude modulation frequency as the number of deformations 8102 around the 360° of the sensor host 8101 multiplied with the rotational speed.

In the following, referring to FIG. 87, an angle sensor device 8700 according to an exemplary embodiment of the invention will be described.

Along a part of the surface of the sensor host 7500, a magnetically encoded region 7502 is formed. In different portions of the magnetically encoded region 7502, first indentations 8701 with a particular length and thus with a first code are formed, and in a second portion of the magnetically encoded region 7502, second indentations 8702 are formed with a second extension indicative of a second code. A corresponding magnetic field detector 7800 is located adjacent the first indentations 8701, and adjacent the second indentations 8702, respectively.

By placing more than one code region 8701, 8702 at the edges of the magnetically encoded region 7501, the incremental angle sensor device 8700 can be operated as an absolute angle sensor.

There is no limit how many "code" regions are placed near or at the magnetic encoded region 7502, as long as the resulting magnetic signal modulation can be decoded properly and is of such good quality that the different codes can be distinguished from one another.

Figure 88:
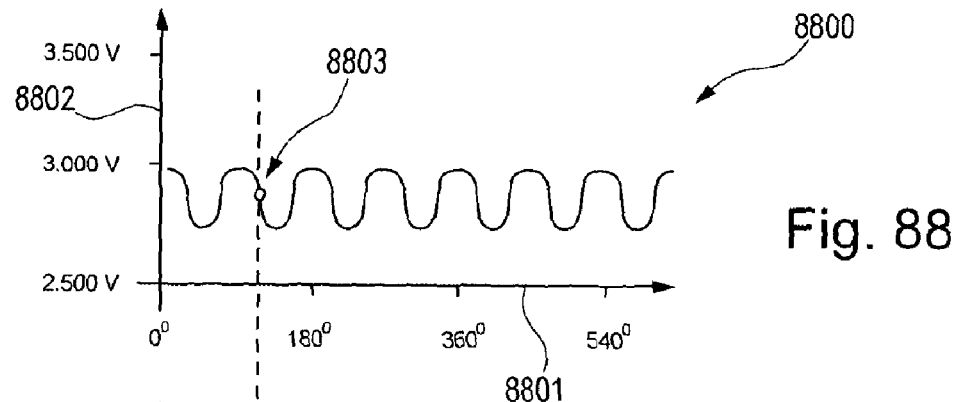
FIGS. 88 and 89 illustrate graphs showing magnetic field detection signals in dependence of a rotation angle.

In the following, referring to FIG. 88, a diagram 8800 will be described.

Along an abscissa 8801 of the diagram 8800, the rotation angle of the sensor host 8700 is plotted. Along an ordinate 8802, the sensor signal output is plotted. The diagram 8800 illustrates the detection signal received by the magnetic field detecting device 7800 located at left hand side of 87. In other words, the magnetic signal generated by the first codes or the first indentations 8701 are plotted in FIG. 88.

Figure 87:
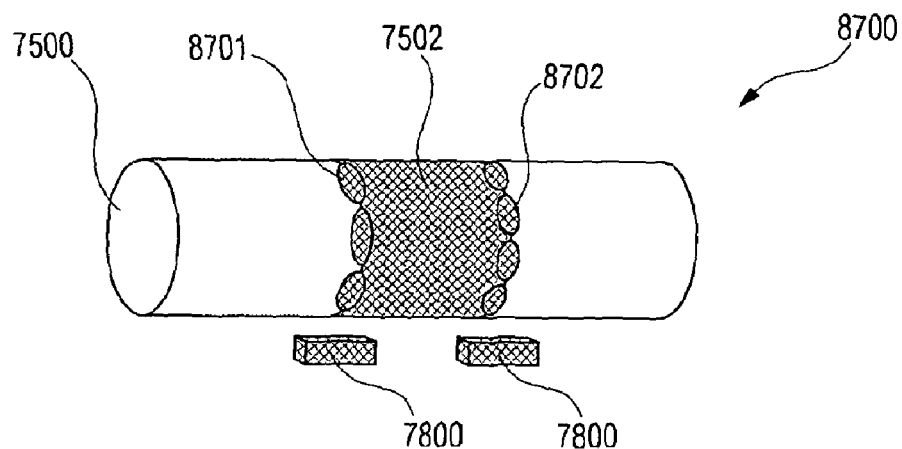
FIG. 87 illustrates an angle sensor device according to an exemplary embodiment of the invention.
Figure 89:
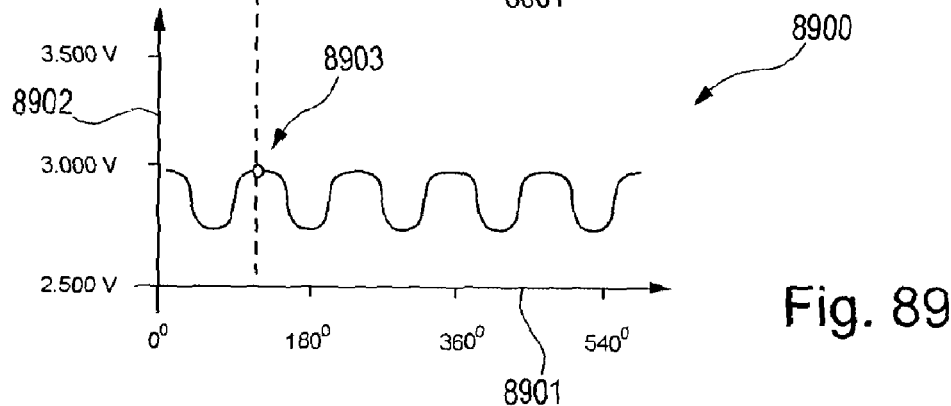

In a similar manner, FIG. 89 shows a diagram 8900 having an abscissa 8901 along which the rotation angle of the sensor host 8700 is plotted, and having an ordinate 8902, along which the sensor signal output of the magnetic field detection device 7800 on the right hand side of FIG. 87 is plotted as a curve 8903. In other words, the curve 8903 represents the second code, received due to the second indentations 8702.

The signals measured by the two magnetic field detecting elements 7800 together generate a unique pattern that is directly related to only one angular position of the sensor host. In other words, a combination of the position information of the diagrams 8800 and 8900, or of the two magnetic field detection elements 7800 shown in FIG. 87, may allow for an unambiguous determination of the absolute angular position of the angle sensor device 8700 plotted in FIG. 87.

In the following, further details of the signal detection and the signal processing will be described.

Basically, any magnetic field sensing device can be used to measure the absolute magnetic field information generated by the sensor host. This may include, but is not limited to, Hall effect sensors, magneto resistive sensors, Giant magneto resistive sensors, and inductors (e.g. coils).

As inductors have several advantages, the following description uses inductors only. Some of these advantages are that inductors are very robust, are low in cost, have a wide temperature range (for instance from −50° C. to +200° C.). They are small in design, and they are very sensitive. However, wherever an inductive magnetic field detecting device is used in this description, an alternative magnetic field detection device can be used instead as well.

Figures 90, 91:
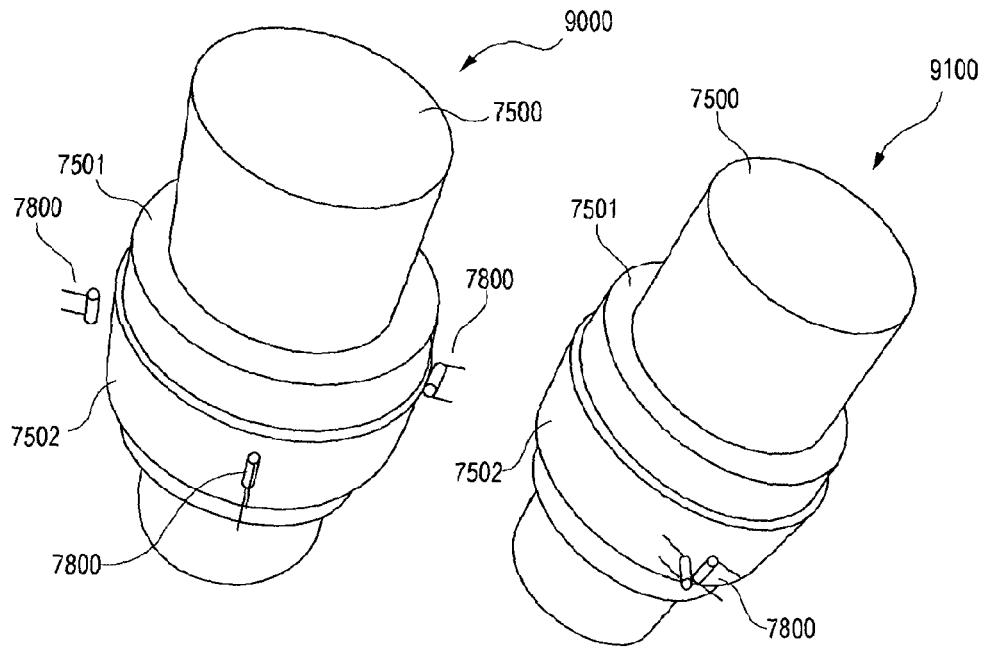
FIG. 90 illustrates an angle sensor device according to an exemplary embodiment of the invention.
FIG. 91 illustrates an angle sensor device according to an exemplary embodiment of the invention.

FIG. 90 shows an angle sensor 9000 according to an exemplary embodiment of the invention.

FIG. 91 shows an angle sensor device 9100 according to another exemplary embodiment of the invention.

The angle sensor device 9000 shows an arrangement of the magnetic field detecting coils 7800 around the magnetically encoded ring 7502 with parallel coil axis. Furthermore, the coil axis of the magnetic field detection coils 7800 of FIG. 90 are essentially parallel to the extension of the shaft 7500. Two or more magnetic field detection coils 7800 are advantageous particularly when they are placed with a 90° angle with respect to each other, in relation to the centre of the magnetically encoded ring 7502. By using a sine/cos signal processing electronics, an absolute angle information can be computed.

The angle sensor device 9100 shown in FIG. 91 shows only two magnetic field detection coils 7800 placed at one angular location near the magnetically encoded ring 7502. While one of the magnetic field detection coils 7800 of FIG. 91 is placed parallel to the axis of the ring 7502 or the extension of the shaft 7500 (in-line, or axial direction), the other magnetic field detection coil 7800 is rotated by a 90° angle and points to the magnetically encoded ring 7502 (radial direction). The required sine/cos signal information is here extracted from only one sensor location which will allow reducing the physical sensor housing design.

In the following, it will be described referring to FIG. 92 and FIG. 93 an automatic signal amplitude compensation, in a configuration having four magnetic field detecting coils 7800.

Figures 92, 93:
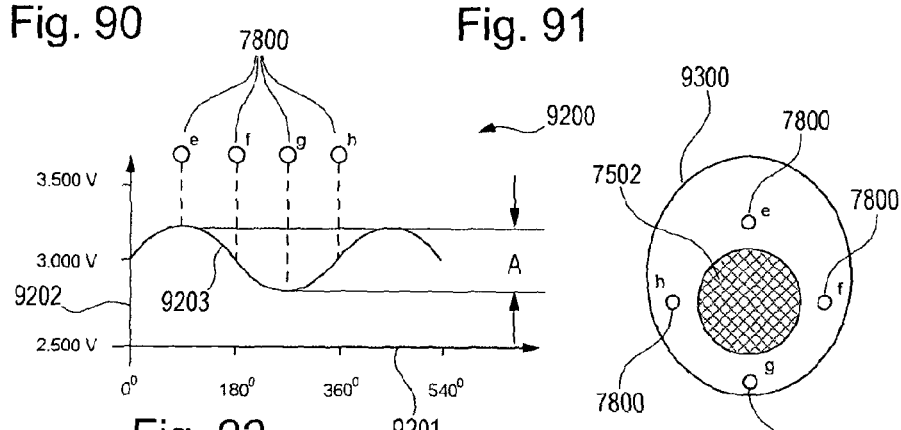
FIG. 92 shows a schematic graph showing the dependence of the sensor output signal from the angular rotation.
FIG. 93 shows an arrangement of magnet detection elements for an off-centred magnetic encoding according to an exemplary embodiment of the invention.

FIG. 92 shows a diagram 9200 having an abscissa 9201 along which the rotation angle from the sensor host is plotted. Along an ordinate 9202, a sensor signal output is plotted as detected by any of the magnetic field detecting coils 7800 shown in FIG. 93. This results in a measurement curve 9203 having a signal amplitude "A".

FIG. 93 illustrates the position of the magnetically encoded region 7502 and the asymmetric signal distribution 9300 generated by this magnetically encoded region 7502 when the magnetically encoded region 7502 as a shaft rotates. Consequently, the signal amplitude of the magnetic field detection coils 7800 has characteristic values.

As can be seen in FIG. 92, FIG. 93, by placing a magnetic field detection coil 7800 every 90° around the magnetically encoded region 7502 of the angle sensor shown in FIG. 93, it is possible to compute the actual "zero" offset voltage for the absolute angle sensor signal. The "zero" offset line z is the average value of the readings from all four magnetic field detection coils 7800, or in other words $z=(e+f+g+h)/4$.

Figure 94:
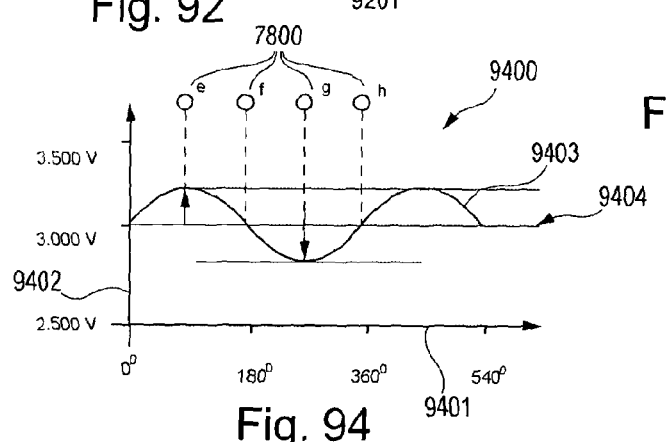
FIG. 94 shows a sensor output signal in dependence of a rotation angle.

In the following, referring to FIG. 94, a diagram 9400 will be described. Along an abscissa 9401 of the diagram 9400, the rotation angle of the sensor host shown in FIG. 93 is plotted. Along an ordinate 9402 of the diagram 9400, the sensor signal output is shown. Furthermore, a zero offset line 9404 of the absolute angle signal is plotted.

Computing the signal difference of each of the magnetic field detection coils e, f, g and h in relation to the zero offset line 9403, and then computing the relative differences to these magnetic field detection coils 7800 values will result in a signal pattern that is unique for each rotation angle position of the sensor host shown in FIG. 93.

In the following, referring to FIG. 95, a multi parameter sensor apparatus 9500 capable of determining at least two parameters of a movable object 7500 will be described.

The multi parameter sensor apparatus 9500 comprises an angle sensor device 9501 (illustrated schematically in FIG. 95) adapted for determining angular position information of the movable object 7500. Furthermore, the multi parameter sensor apparatus 9500 is capable of detecting the torque applied to the movable object 7500 (which is indicated schematically in FIG. 95 by reference numeral 9502).

A sensor host 9500 that has been magnetically processed (for example with the PCME technology described above) is capable to detect or to measure several physical parameters simultaneously. In the picture of FIG. 95, an example of such a multifunction PCME sensor is given, which is capable of simultaneously measuring torque and angle in real time.

Figure 95:
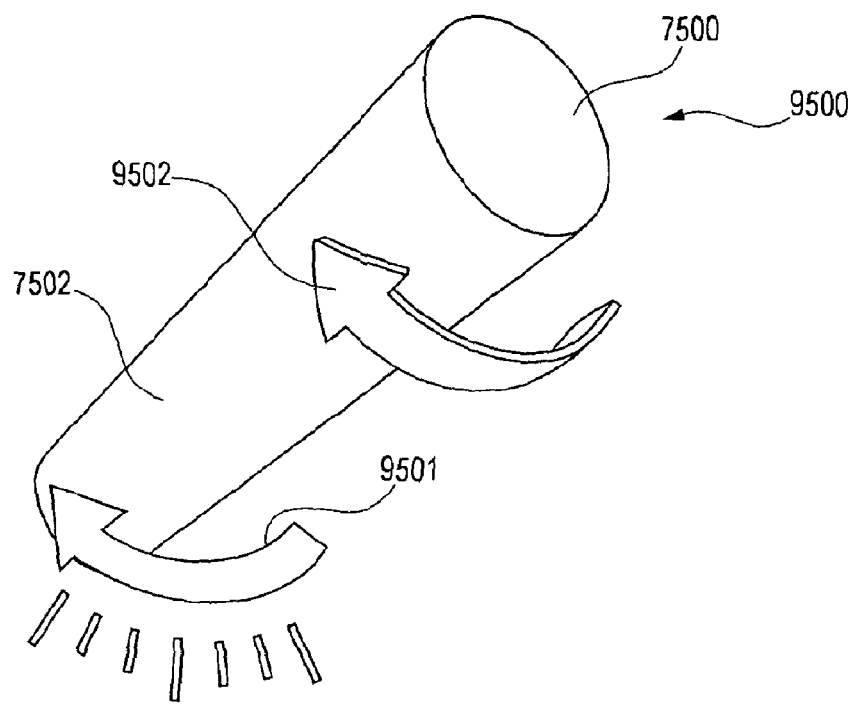
FIG. 95 shows a multi parameter sensor apparatus according to an exemplary embodiment of the invention.

Particularly, it is possible to calculate the absolute angle and torque from a rotation of the movable object 7500 based on a magnetic field detection signal captured by one of the magnetic field detecting coils (not shown in FIG. 95).

When using the "analog signal, single cycle pattern" magnetic PCME encoding, the computed "zero" offset line of the absolute angle sensor signal will change in relation to the applied torque forces.

In the following, referring to FIG. 96, a diagram 9600 will be described.

Along an abscissa 9601 of the diagram 9600, a rotational angle of the sensor host is plotted. Along an ordinate 9602 of the diagram 9600, a sensor signal output is plotted.

Figure 96:
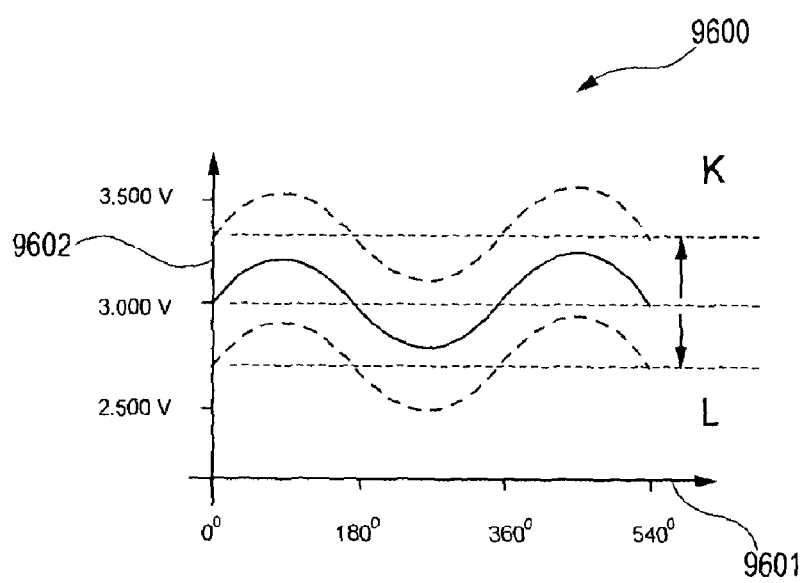
FIG. 96 shows a dependence of a sensor signal output from a rotation angle of the sensor host according to an exemplary embodiment of the invention.

In FIG. 96, three curves are shown. A curve labelled with "K", shows a signal level change when increasing torque of the multi parameter sensor apparatus 9500. A medium curve in FIG. 96 refers to the "zero" offset line of the absolute angle signal. A lower curve denoted with label "L" in FIG. 96 illustrates the signal level change when decreasing torque.

As can be seen in FIG. 96, when the applied rotational torque forces become larger, than the output signal generated by the magnetic field detection coils will increase (curve "K"). When the applied rotational torque forces become smaller, than the output signal as generated by the magnetic field detecting coil devices will decrease (curve "L"). The absolute value of the "zero" offset line of the angle sensor is equivalent to the applied rotational torque forces.

Depending on the PCME encoding process and the used signal condition electronics, separating the measurement signals into torque and angle position is possible only when using the automatic signal amplitude compensation process, as described above. In some cases it is possible that the pseudo sinus angle signal amplitude will increase and decrease in a relation to the applied torque forces.

Figure 97:
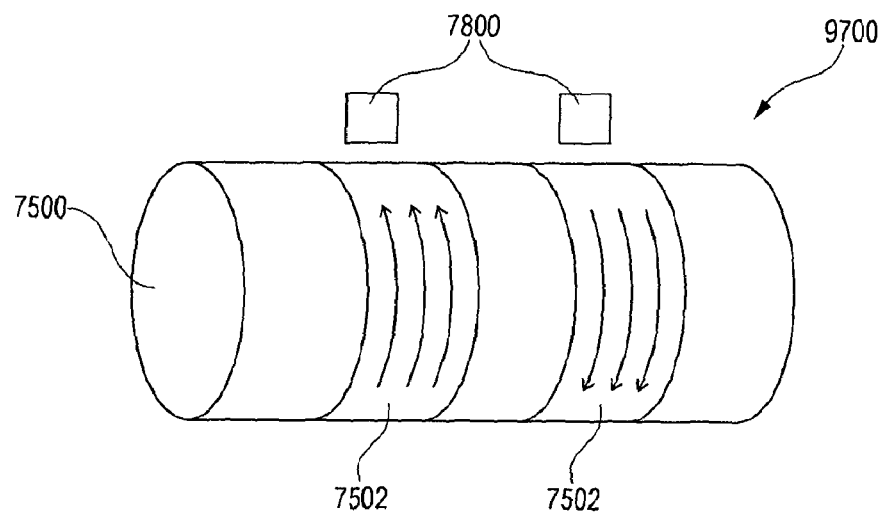
FIG. 97 illustrates an angle sensor device according to an exemplary embodiment of the invention.

In the following, referring to FIG. 97, an angle sensor device 9700 according to an exemplary embodiment of the invention will be described.

In the case of the angle sensor device 9700, two different magnetically encoded regions 7502 are provided at different portions of the shaft 7500. In the vicinity of each of the magnetically encoded regions 7502, an assigned magnetic field detection coil 7800 is located. As can be seen in FIG. 97, the magnetization directions of the magnetically encoded regions 7502 are oriented in opposite directions.

In other words, it is possible to have more than one, for instance two or three or more magnetically encoded regions located along the extension of the shaft 7500. In order to suppress disturbing influences (for instance constant influences from the earth magnetic field or disturbing influences from other magnetically active devices in the environment of the sensor), a differential measurement can be carried out.

Figure 98:
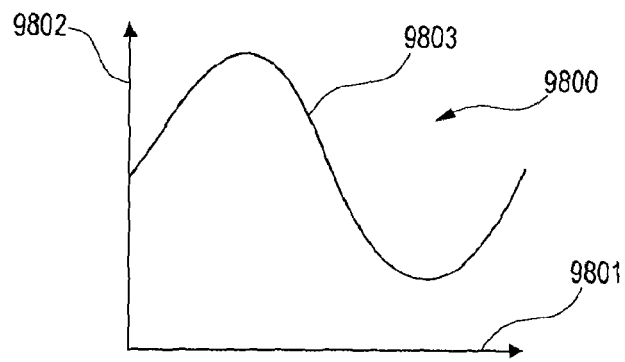
FIGS. 98 and 99 illustrate sensor signal outputs in dependence of the angular rotation of the movable object of FIG. 97.

FIG. 98 shows a diagram 9800 having an abscissa 9801 along which the rotation angle of the sensor host 9700 is plotted. Along an ordinate 9802, the sensor signal output of the left magnetic field detecting coil 7800 of FIG. 97 is plotted. As can be seen from a curve 9803, a pseudo-sine signal can be measured at this device.

Figure 99:
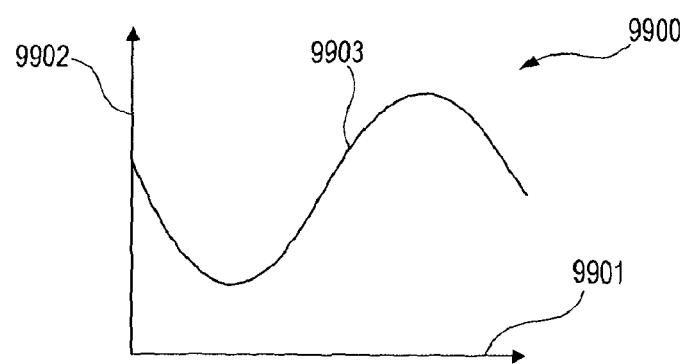

FIG. 99 shows a diagram 9900 having an abscissa 9901 along with the rotational angle of the sensor host 9700 is plotted. Along an ordinate 9902, a sensor signal output is plotted which is detected by the magnetic field detection coil 7800 shown on the right hand side of FIG. 97. As can be seen, the resulting curve 9903 is "inverse" to the curve shown in FIG. 98.

When applying a "differential region magnetic processing" to the sensor host 9700, it is easy to design an angle sensor system that can cope with non-uniform magnetic stray fields (for instance caused by electromagnetic operated actuators that are placed nearby).

However, a configuration without differential region magnetic processing may be manufactured with low space requirement and low cost.

Figure 100:
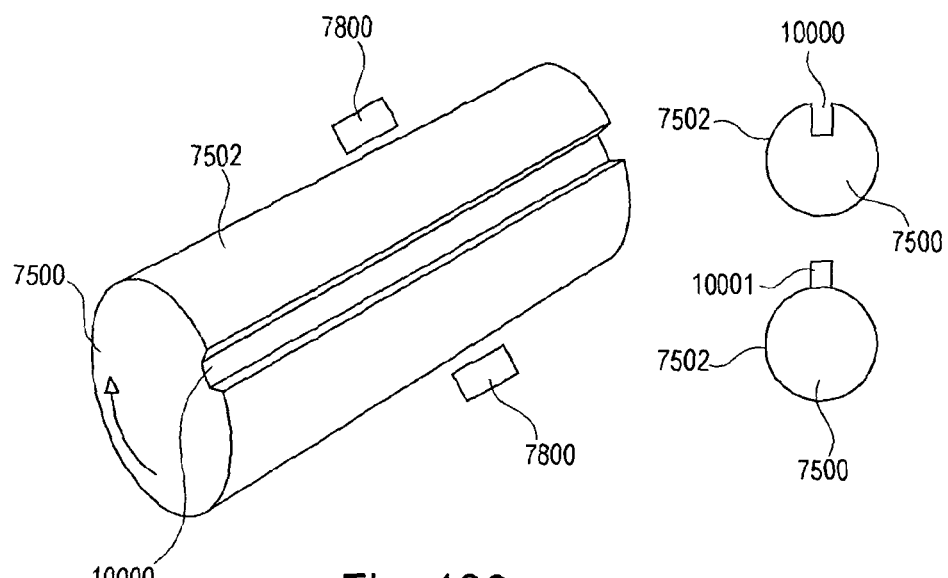
FIG. 100 illustrates a movable object having an off-centred longitudinal slit at a surface of the movable object so as to generate an asymmetrical magnetically encoding region.

In the following, referring to FIG. 100, an angle sensor device is plotted which has a groove 10000 along the extension of a shaft 7500 at the surface of which a magnetically encoded region 7502 is generated. FIG. 100 shows this angle sensor device having such a groove in a three-dimensional view and in a cross-sectional view.

Furthermore, FIG. 100 shows a cross-sectional view of a sensor host having a magnetically encoded region 7502 and a magnetic element 10001 attached to the surface of the magnetically encoded region 7502, the magnetic element 10001 being shaped in a bar like one-dimensional manner. Thus, the configuration with a groove 10000 and with the bar 10001 are complementary.

Figure 101:
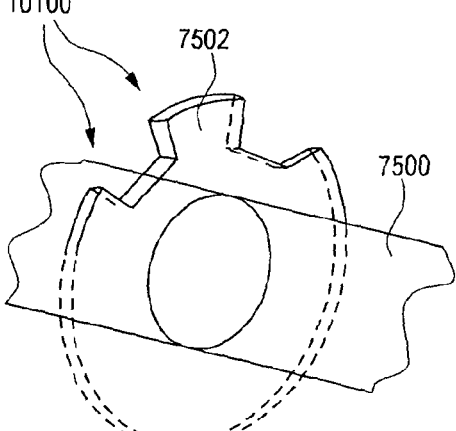
FIG. 101 illustrates an angle sensor device according to an exemplary embodiment of the invention.

FIG. 101 illustrates a shaft 7500 having a magnetically encoded region 7502 realized as some kind of ring with teeth 10100 on the surface. The teeth 10100 extend perpendicular to the extension of the shaft 7500.

Figure 102:
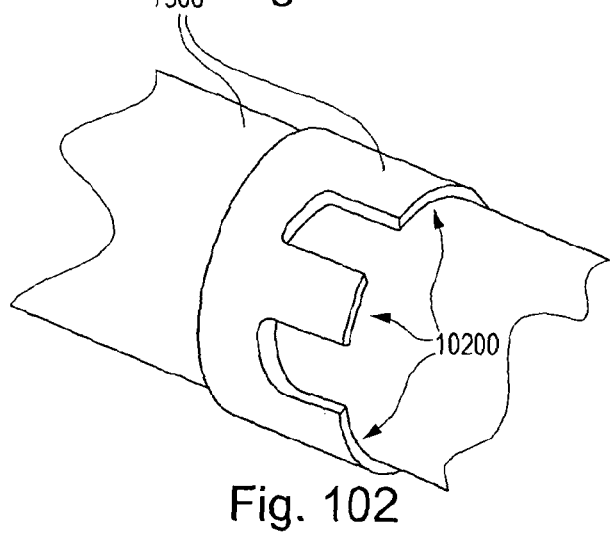
FIG. 102 illustrates an angle sensor device according to an exemplary embodiment of the invention.

FIG. 102 shows a shaft 7500 having attached thereto a ring-like magnetically encoded region 7500 having teeth 10200 extending essentially parallel to the extension of the shaft 7500.

Figure 103:
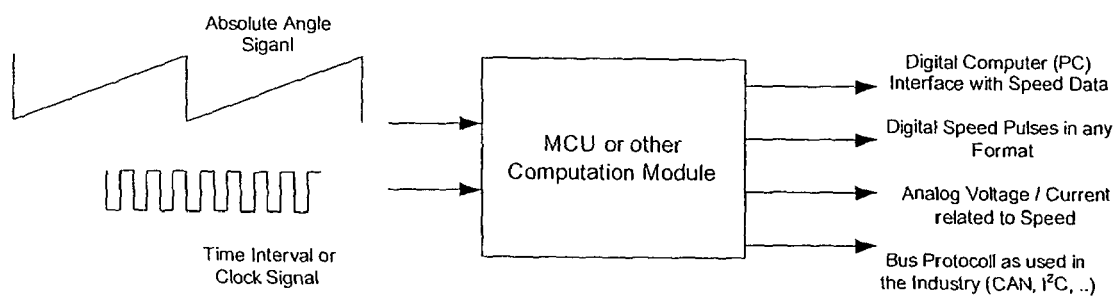
FIG. 103 illustrates possible applications of an angle sensor device according to an exemplary embodiment of the invention for determining angular speed information.

FIG. 103 illustrates possible applications of an angle sensor device according to an exemplary embodiment of the invention for determining angular speed information.

An important aspect of the present invention is "angle" sensing. It may also be beneficial to measure speed. In other words, the angle sensor technology may also be used to generate speed information. This is a straight forward process by using a micro controller. The inputs to the micro controller may be time intervals and absolute angle information. The output of the microcontroller may be speed information in digital form (text/numbers, or pulses) or an analog speed value.

Some aspects related to this application are shown in FIG. 103.

According to an embodiment of the invention, several different magnetic field coils may be used and placed around exactly one magnetic encoded region. Alternatively, it is possible to place two or more magnetic encoded regions side-by-side, whereby each magnetic encoded region may be rotated by 90 degree, for example. Instead of using the 0° and 90° principle (two magnetic encoding regions needed to calculate the angular position) one can also use a 0°, 120°, and 240° degree principle (three magnetic regions required).

It should be noted that the term "comprising" does not exclude other elements or steps and the "a" or "an" does not exclude a plurality. Also elements described in association with different embodiments may be combined.

The invention claimed is:

1. An angle sensor device for determining information of a movable object, the information including at least one of angular position information and angular speed information, comprising:
   at least one magnetically encoded region arranged on the movable object;
   at least one magnetic field detector detecting a signal generated by the at least one magnetically encoded region when the at least one magnetically encoded region moving with the movable object passes a surrounding area of the at least one magnetic field detector; and
   a unit determining the information as a function of the detected signal,
   wherein the at least one magnetically encoded region is arranged with an angularly varying magnetic field strength and similar magnetic polarity along a circumference of the moveable object and is configured to generate the signal such that the signal has one cycle of a pseudo-sinus shape when the movable object rotates by 360 degrees.

2. The angle sensor device according to claim 1, wherein the at least one magnetically encoded region is arranged in an angularly asymmetric geometric manner along a circumference of the movable object.

3. The angle sensor device according to claim 1, wherein the at least one magnetically encoded region is arranged with an angularly varying magnetic strength along a circumference of the movable object.

4. The angle sensor device according to claim 1, wherein the unit determines an absolute angular position information of the movable object based on the detected signal.

5. The angle sensor device according to claim 1, wherein the movable object is one of the group consisting of an engine shaft, a reciprocable work cylinder, and a push-pull-rod.

6. The angle sensor device according to claim 1, further comprising:
   a plurality of magnetic field detectors.

7. The angle sensor device according to claim 6, wherein the unit determines the information as a function of a simultaneous analysis of the magnetic signals detected by the plurality of magnetic field detectors.

8. The angle sensor device according to claim 1, further comprising:
   a plurality of magnetically encoded regions arranged along a circumference of the movable object.

9. The angle sensor device according to claim 1, further comprising:
   a control unit controlling a motion of the movable object as a function of the information which is provided to the control unit by the unit.

10. The angle sensor device according to claim 1, wherein the at least one magnetically encoded region is a permanent magnetic region.

11. The angle sensor device according to claim 1, wherein the at least one magnetically encoded region is a longitudinally magnetized region of the movable object.

12. The angle sensor device according to claim 1, wherein the at least one magnetically encoded region is a circumferentially magnetized region of the movable object.

13. The angle sensor device according to claim 1, wherein the at least one magnetically encoded region is manufactured in accordance with the following manufacturing steps:
   applying a first current pulse to a magnetizable element in a such manner that there is a first current flow in a first direction along a longitudinal axis of the magnetizable element, the first current pulse being such that the application of the current pulse generates a magnetically encoded region in the magnetizable element.

14. The angle sensor device according to claim 13, wherein the magnetizable element has a circumferential surface surrounding a core region of the magnetizable element, wherein the first current pulse is introduced into the magnetizable element at a first location at the circumferential surface such that there is the first current flow in the first direction in the core region of the magnetizable element, wherein the first current pulse is discharged from the magnetizable element at a second location at the circumferential surface and wherein the second location is at a distance in the first direction from the first location.

15. The angle sensor device according to claim 13, wherein the first current pulse is not applied to the magnetizable element at an end face of the magnetizable element.

16. The angle sensor device according to claim 1, wherein the at least one magnetically encoded region is a magnetic element attached to the surface of the movable object.

17. The angle sensor device according to claim 1, wherein the at least one magnetic field detector comprises at least one of the group consisting of a coil having a coil axis oriented essentially parallel to an extension of the movable object; a coil having a coil axis oriented essentially perpendicular to an extension of the movable object; a Hall-effect probe; a Giant Magnetic Resonance magnetic field sensor; and a Magnetic Resonance magnetic field sensor.

18. A multi parameter sensor apparatus for determining at least two parameters of a movable object, comprising
   an angle sensor device determining information of the movable object, the information including at least one of angular position information and angular speed information, the angle sensor device including (a) at least one magnetically encoded region arranged on the movable object, (b) at least one magnetic field detector detecting a signal generated by the at least one magnetically encoded region when the at least one magnetically encoded region moving with the movable object passes a surrounding area of the at least one magnetic field detector and (c) a unit determining the information as a function of the detected signal; and a further unit determining at least one further parameter characterizing the movable object as a function of the detected signal, wherein the at least one magnetically encoded region is arranged with an angularly varying magnetic field strength and similar magnetic polarity along a circumference of the moveable object and is configured to generate the signal such that the signal has one cycle of a pseudo-sinus shape when the movable object rotates by 360 degrees.

19. The multi parameter sensor apparatus according to claim 18, wherein the at least one further parameter is selected from the group consisting of a position of the movable object, a torque applied to the movable object, a pulling force applied to the movable object, a bending force applied to the movable object, a shear force applied to the movable object, a velocity of the movable object, and a power of the movable object.

20. A method for determining information of a movable object, the information including at least one of angular position information and angular speed information, comprising:

using at least one magnetic field detector, detecting a signal generated by at least one magnetically encoded region when the at least one magnetically encoded region moving with the movable object passes a surrounding area of the at least one magnetic field detector; and determining the information as a function of the detected signal, wherein the at least one magnetically encoded region is arranged with an angularly varying magnetic field strength and similar magnetic polarity along a circumference of the moveable object and is configured to generate the signal such that the signal has one cycle of a pseudo-sinus shape when the movable object rotates by 360 degrees.

21. An object, comprising:

at least one magnetically encoded region being arranged at least one of (a) in an angularly asymmetric geometric manner along the circumference of the object and (b) with an angularly varying magnetic strength along the circumference of the object, wherein the at least one magnetically encoded region is arranged with an angularly varying magnetic field strength and similar magnetic polarity along a circumference of the moveable object and is configured to generate the signal such that the signal has one cycle of a pseudo-sinus shape when the movable object rotates by 360 degrees.

22. A system, comprising:

a movable object; and an angle sensor device determining information of the movable object, the information including at least one of angular position information and angular speed information, the angle sensor device including (a) at least one magnetically encoded region arranged on the movable object; (b) at least one magnetic field detector detecting a signal generated by the at least one magnetically encoded region when the at least one magnetically encoded region moving with the movable object passes a surrounding area of the at least one magnetic field detector; and (c) a unit determining the information as a function of the detected signal, wherein the at least one magnetically encoded region is arranged with an angularly varying magnetic field strength and similar magnetic polarity along a circumference of the moveable object and is configured to generate the signal such that the signal has one cycle of a pseudo-sinus shape when the movable object rotates by 360 degrees.

23. The system according to claim 22, wherein the movable object is at least one of a group consisting of a round shaft, a tube, a disk, a ring, and a none-round object.

* * * * *